United States Patent [19]

Saulpaugh et al.

[11] Patent Number: 5,590,334
[45] Date of Patent: Dec. 31, 1996

[54] OBJECT ORIENTED MESSAGE PASSING SYSTEM AND METHOD

[75] Inventors: Thomas E. Saulpaugh, San Jose; Bill M. Bruffey, Cupertino; Russell T. Williams, San Jose, all of Calif.

[73] Assignee: Apple Computer, Inc, Cupertino, Calif.

[21] Appl. No.: 618,404

[22] Filed: Mar. 19, 1996

Related U.S. Application Data

[63] Continuation of Ser. No. 220,043, Mar. 30, 1994, abandoned.

[51] Int. Cl.$^6$ ........................................ G06F 13/14
[52] U.S. Cl. ................... 395/683; 395/600; 395/200.1; 395/733
[58] Field of Search ..................... 395/200, 700, 395/775, 600, 200.1; 364/DIG. 1, 228.5, 228.8

[56] References Cited

U.S. PATENT DOCUMENTS

| | | | |
|---|---|---|---|
| 5,142,683 | 8/1992 | Burkhardt et al. | 395/725 |
| 5,230,051 | 7/1993 | Quan | 395/700 |
| 5,265,206 | 11/1993 | Shackelford et al. | 395/200 |
| 5,305,461 | 4/1994 | Feigenbaum et al. | 395/775 |
| 5,315,709 | 5/1994 | Alston, Jr. et al. | 395/600 |
| 5,317,746 | 5/1994 | Watanabe | 395/700 |
| 5,329,619 | 7/1994 | Pagé et al. | 395/200 |
| 5,333,269 | 7/1994 | Calvignac et al. | 395/200 |
| 5,371,850 | 12/1994 | Belsan et al. | 395/200 |

FOREIGN PATENT DOCUMENTS

| | | | |
|---|---|---|---|
| 0425420 | 5/1991 | European Pat. Off. | |
| 0483036 | 4/1992 | European Pat. Off. | 9/44 |

OTHER PUBLICATIONS

Tripathi, A. et al. "Type Management System In The Nexus Distributed Programming Environment," 5 Oct. 1988, pp. 170–177.

Hong–Tai Chou et al. "Versions and Change Notification in an Object–Oriented Database System," 12 Jun. 1988, pp. 275–281.

D. V. Pitts et al. "Object Memory and Storage Management in the Clouds Kernel," 13 Jun. 1988, pp. 10–17.

D. C. Robinson et al. "Domain–Based Access Control for Distributed Computing Systems" in *Software Engineering Journal*, Sep. 1988, pp. 161–170, vol. 3, No. 5.

U. Ramachandran et al. "A Measurement–Based Study of Hardware Support for Object Invocation" in *Software Practice & Experience*, Sep. 1989, pp. 809–828, vol. 19, No. 9.

M. Ancona. "Persistent Heaps," 21 Mar. 1990, pp. 324–331.

G Pathak et al. "Object eXchange Service for an Object–Oriented Database System," 6 Feb. 1989, pp. 27–34.

*Primary Examiner*—Kevin A. Kriess
*Assistant Examiner*—Majid A. Banankhah
*Attorney, Agent, or Firm*—Carr, DeFilippo & Ferrell

[57] ABSTRACT

An object oriented message passing system for transferring messages between a client task and a server task comprises an object database, an object management unit, a message transaction unit, and a locking unit. The object management unit creates a port object and one or more associated message objects. The message transaction unit matches a send message request issued by a client task with an acceptance function or with a receive message request issued by a server task. In response to a send message request, the message transaction unit creates a send message control block. In response to a receive message request, the message transaction unit creates a delivery message control block if the receive message request matches the send message control block, or creates a receive message control block if the receive message request does not match the send message control block. The locking unit locks a message object such that send message requests directed to the message object are not eligible to be matched to receive message requests until the message object is unlocked.

An object oriented message passing method comprises the steps of: creating a port object; creating a message object associated with the port object; generating a unique message ID in response to a message transaction initiated by a send message request; creating a send message control block; and matching the send message control block to a corresponding receive message request.

15 Claims, 23 Drawing Sheets

| |
|---|
| Message Object ID |
| Port Object ID |
| Next and Previous Pending Send Message List Entries |
| Client Task ID |
| Message Address |
| Message Length |
| Message Type |
| Message ID |
| Send Options |
| Matching Receive MCB |
| Server Task ID |
| Delivery Status |
| Message Object Lock State |
| Reply Buffer Address |
| Reply Buffer Size |
| Client Task Blocking State |
| Maximum Time Interval |

| |
|---|
| Message Object ID |
| Port Object ID |
| Next and Previous Pending Send Message List Entries |
| Client Task ID |
| Message Address |
| Message Length |
| Message Type |
| Message ID |
| Send Options |
| Matching Receive MCB |
| Server Task ID |
| Delivery Status |
| Message Object Lock State |
| Reply Buffer Address |
| Reply Buffer Size |
| Event Notification Information |

| Port Object ID |
|---|
| Next and Previous Pending Receive Message List Entries |
| Server Task ID |
| Message Buffer Address |
| Message Buffer Size |
| Message Type |
| Send MCB |
| Receive Message ID |
| Event Notification Information |

OBJECT ORIENTED MESSAGE PASSING SYSTEM AND METHOD

RELATED APPLICATIONS

This is a continuation of application Ser. No. 08/220,043 filed on Mar. 30, 1994 now abandoned.

BACKGROUND OF THE INVENTION

1. Field of the Invention

The present invention relates generally to systems and methods for intra-computer communication, and more particularly to systems and methods for message-based client-server communication. Still more particularly, the present invention is an object oriented message passing system and method.

2. Description of the Background Art

In intra-computer communications, a client task requires a service provided by a server task. For example, a client task may require window creation or file deletion services. The particular service that the client task requires is performed by an appropriate server task, such as a window manager or a file system. A message is the unit of communication interchange between a client and a server. Thus, in order to inform a server that a particular service is required, the client task sends or issues an appropriate message. Upon receiving an issued message, the server task performs the required actions. Message passing systems and methods determine the manner in which a message that has been issued by a client task is delivered to a server task.

In the prior art, message passing systems and methods have relied upon a task-based message passing model, a port-based message passing model, or a port-set-based message passing model. Referring now to FIG. 1, a block diagram of a task-based message passing model is shown. In the task-based message passing model, when a client task requires a particular service, the client task sends a message directly to a server task that performs types of services related to the particular service required. Because multiple client tasks may require a service provided by the same server task, each server task present must support message queuing and message dispatch, both of which introduce an undesirable level of server task complexity. Moreover, because server tasks must support message queuing and message dispatch, memory beyond that required to implement a set of services must be available to each server task. An additional drawback associated with the task-based message passing model is that a client task and a corresponding server task are bound together in an inflexible manner, with each server task being dedicated to only one type of service. The inflexible binding found in the task-based message passing model also introduces an undesirable level of complexity when the behavior of the client task or the server task is to be modified or evolved.

Referring now to FIG. 2A, a block diagram of a port-based message passing model is shown. In the port-based message passing model, a message port represents a type of service available to a client task. Client tasks send messages to message ports rather than directly to server tasks. Messages sent to a given message port are queued within the message port by the operating system. Thus, to a server task, each message port represents a message queue. Multiple server tasks can compete to receive and process messages from any message port, thereby decoupling client tasks from server tasks. Client tasks commonly require many different types of services; hence, multiple message ports are required. Each message port requires a significant amount of memory to implement. Some prior art operating systems require that a unique port be present for each client task present.

Within a computer system, a message passing system generally resides within an operating system, which in turn resides within the computer system's memory. The total amount of memory available in the computer system is limited, and the memory must therefore be treated as a shared resource. It is thus highly desirable to have an operating system that occupies as little memory as possible. Message passing systems and methods that are based upon the port-based message passing model are undesirable because the memory required to implement each port significantly adds to the operating system's memory requirements. In personal computer systems, less memory is typically available than in other computer systems. Hence, message passing systems and methods that rely upon the port-based message passing model are particularly undesirable in personal computer systems.

Commonly, client tasks and server tasks function in different address spaces. In prior art message passing systems and methods that rely upon the port-based message passing model, when a client task and a server task operate in different address spaces, the message passing system or method must perform a mapping between address spaces prior to transferring a message from the client task to the server task. After the mapping between address spaces has been performed, the server task performs the required service. Often, particular services, such as input/output (I/O) operations, must be performed as rapidly as possible. The mapping between address spaces performed by prior art message passing systems and methods that rely upon the port-based message passing model undesirably increases the amount of time required to complete the service. Thus, prior art systems and methods that rely upon the port-based message passing model are undesirable in time-critical situations when client tasks and server tasks function in different address spaces.

Referring now to FIG. 2B, a block diagram of a port-set-based message passing model is shown. The port-set-based message passing model is a variant of the port-based message passing model described above. In the port-set-based message passing model, one or more message ports are associated to form a common port set. Each port set represents a particular type of service, and each individual message port represents a particular resource that can utilize the service associated with the port set to which it belongs. Client tasks therefore view individual message ports as resources to which messages can be sent. The additional level of structural granularity provided by the port-set-based message passing model significantly simplifies message decoding and message prioritization operations that must be performed by server tasks. As in the case of the port-based message passing model, however, each message port requires a significant amount of memory to implement. Therefore, message passing systems and methods that rely upon the port-set-based message passing model require even more memory than those that rely upon the port-based message passing model. Prior art message passing systems and methods that rely upon the port-set-based message passing model also suffer from the address space translation drawbacks described above in relation to the port-based message passing model.

What is needed is a means for message passing that provides a high level of structural granularity, that minimizes memory requirements, and that can reduce the time required to perform time-critical operations when client tasks and server tasks function in different address spaces.

SUMMARY OF THE INVENTION

The present invention is an object oriented message passing system and method. The system of the present invention comprises an object oriented message passing unit. The object oriented message passing unit creates and maintains a set of message objects and one or more port objects. Each message object is associated with a particular port object, and each message object represents a resource that corresponds to a service provided by a server task. Each port object represents a message receptacle from which a server task can receive messages. Message objects require significantly less memory to implement than port objects. Through the use of message objects and port objects, the present invention provides an object-oriented message passing model that exhibits a high level of structural granularity and that requires significantly less memory than any message passing model supported in the prior art.

The object oriented message passing unit associates an acceptance function with a port object upon request, where the acceptance function provides a means for performing one or more services within the context and address space of the client task. Acceptance functions significantly reduce the amount of time required to complete time-critical services by eliminating the need for mapping between address spaces and context switching.

A client task sends a message to a message object by issuing a send message request that includes a reference to a message object, a reference to a message, and a message type. The message referenced in the send message request itself indicates a required service. A server task receives a message from a port object by issuing a receive message request that includes a reference to a port object and a message type. In response to a send message request, the object oriented message passing unit creates a corresponding send message control block (MCB), where the send MCB includes the reference to the message. After creating the send MCB, the object oriented message passing unit first attempts to match the send message request with an acceptance function. If a matching acceptance function is present, the object oriented message passing unit ensures that the message referenced in the send MCB is transferred to the acceptance function. The acceptance function then performs the required service within the context and address space of the client task. If no matching acceptance function is present, the object oriented message passing unit matches the send message request to a receive message request. The object oriented message passing unit ensures that the message referenced in the send MCB is transferred to the server task that issued the receive message request, and provides any required mapping between address spaces. After the server task has received the message, the server task performs the required service.

Once an acceptance function or a server task has performed a required service, the acceptance function or the server task, respectively, preferably issues a reply to the message. The issuance of a send message request, followed by the matching of a send message request to an acceptance function or to a receive message request, followed by the issuance of a reply is referred to herein as a message transaction. In response to a reply, the object oriented message passing unit performs reply operations that deliver status information and possibly data to the client task that initiated the message transaction.

The object oriented message passing unit locks and unlocks message objects upon request. After a message object is locked, send message requests directed to the message object are not eligible to be matched to an acceptance function or to a receive message request until the message object is unlocked. Message object locking and unlocking provide a means to guarantee that a parameter value associated with a given message object remains unchanged while a message transaction is in progress.

The method of the present invention comprises the steps of: creating a port object; creating a message object associated with the port object; optionally associating an acceptance function with the port object; matching a send message request directed to the message object with the acceptance function or with a matching receive message request; matching a receive message request directed to the port object with a send message request; and performing reply operations following a server task's reply to a message.

BRIEF DESCRIPTION OF THE DRAWINGS

FIG. 8A is a block diagram of a synchronous send message control block in the present invention;

FIG. 8B is a block diagram of an asynchronous send message control block in the present invention;

FIG. 9B is a block diagram of an asynchronous receive message control block in the present invention;

DETAILED DESCRIPTION OF THE PREFERRED EMBODIMENTS

Figure 1:
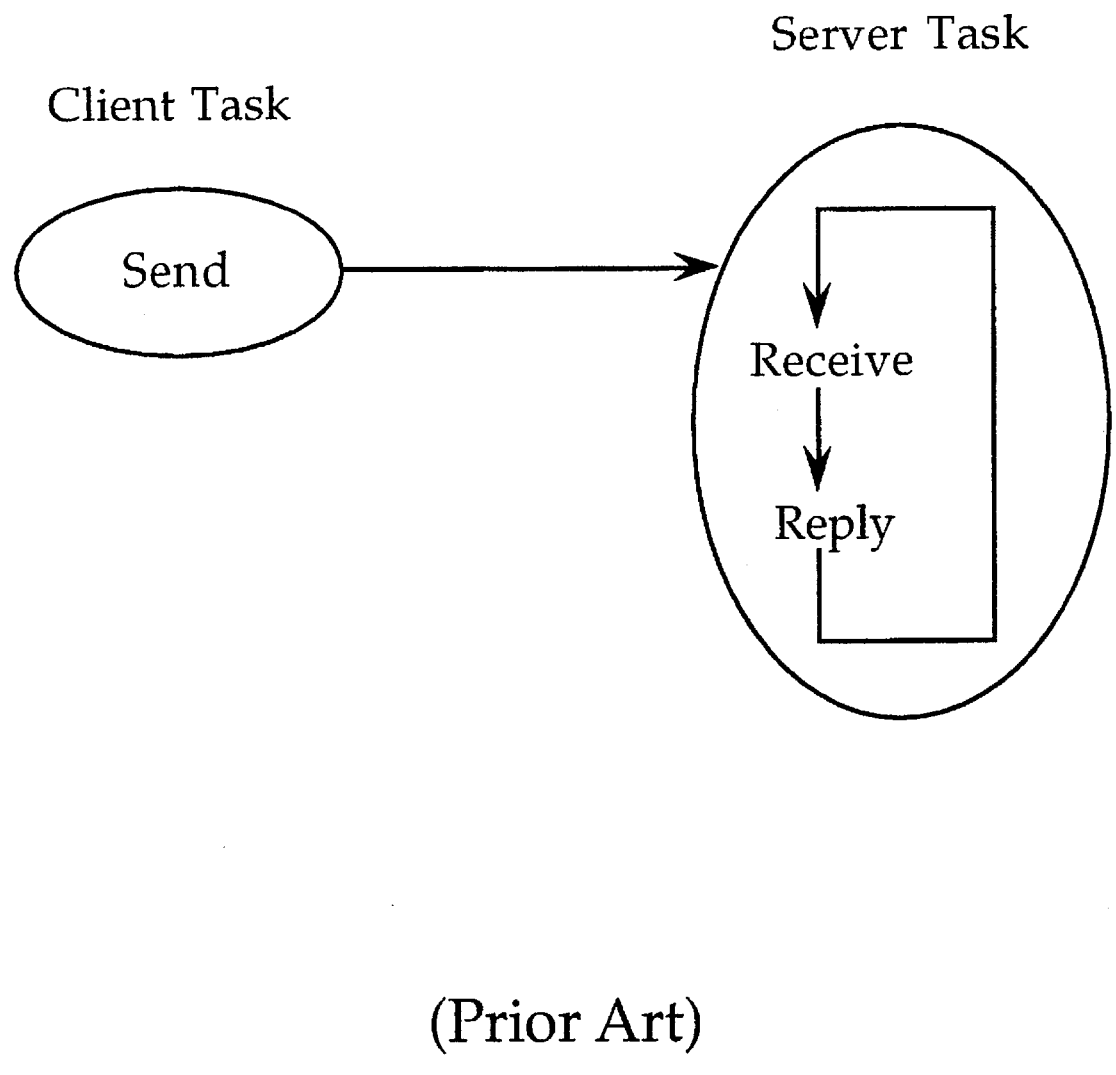
FIG. 1 is a block diagram of a task-based message passing model of the prior art.
Figure 2A:
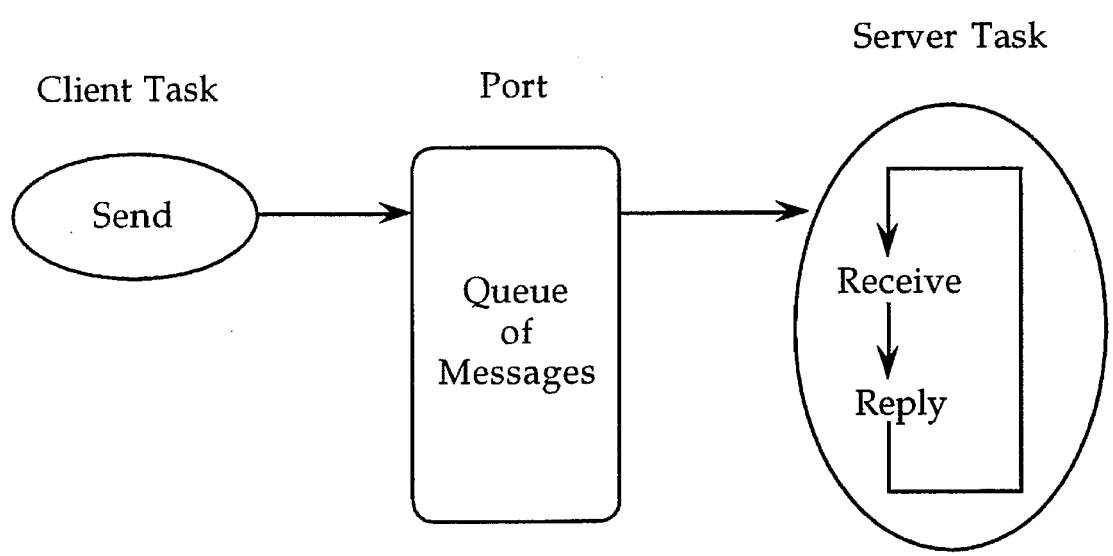
FIG. 2A is a block diagram of a port-based message passing model of the prior art.
Figure 2B:
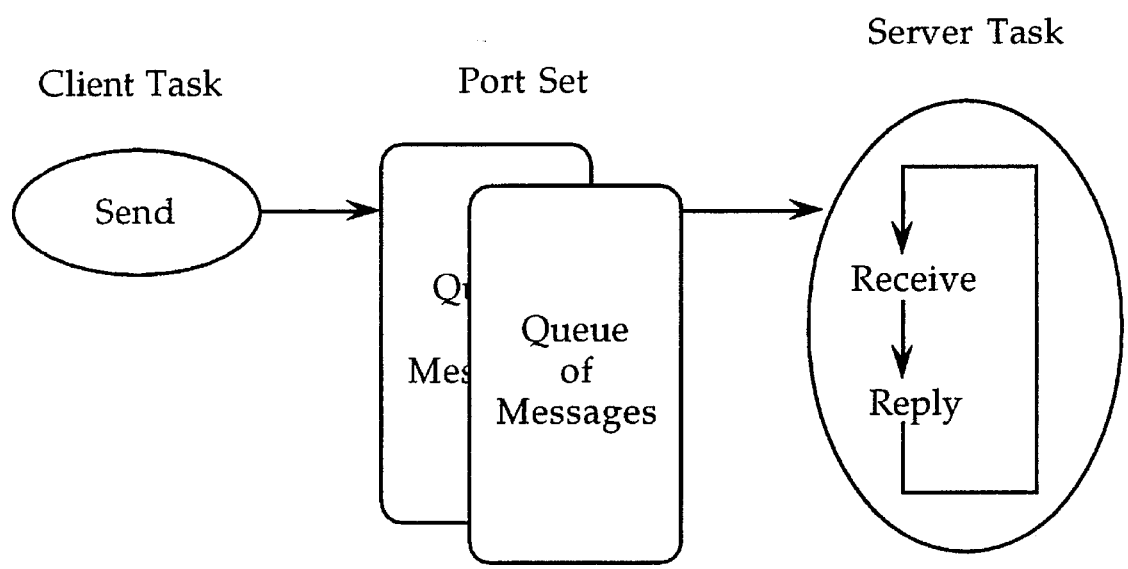
FIG. 2B is a block diagram of a port-set-based message passing model of the prior art.
Figure 3:
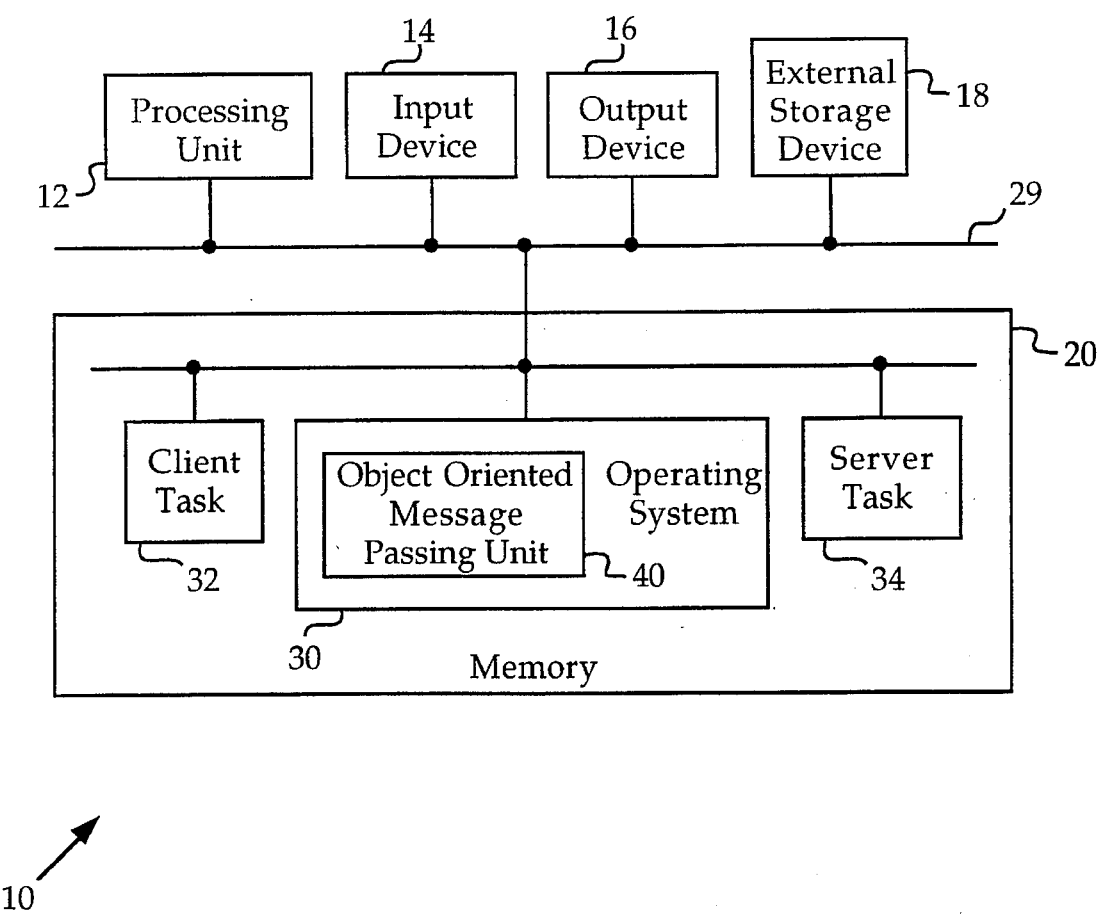
FIG. 3 is a block diagram of a preferred embodiment of the object oriented message passing system constructed in accordance with the present invention.

Referring now to FIG. 3, a block diagram of a preferred embodiment of an object oriented message passing system 10 constructed in accordance with the present invention is shown. The system 10 comprises a processing unit 12, an input device 14, an output device 16, an external storage device 18, and a memory 20 wherein an operating system 30, a client task 32, and a server task 34 reside. In the preferred embodiment, the operating system 30 is a microkernel operating system 30 capable of maintaining multiple address spaces. An object oriented message passing unit 40 resides within the operating system 30. Each element of the system 10 has an input and an output coupled to a common system bus 29. In an exemplary embodiment, the system 10 of the present invention is an Apple Macintosh computer system made by Apple Computer, Inc., of Cupertino, Calif., and having a Motorola MC68030 microprocessor and 8 Mbytes of Random Access Memory (RAM) wherein a microkernel operating system 30 that includes the object oriented message passing unit 40 resides.

In the present invention, a client task 32 is preferably a set of program instructions that requires a given service, for example, the creation of a window or the deletion of a file. The provider of a required service is referred to herein as a server task 34. Preferably, each server task 34 is also a set of program instructions. In the preferred embodiment, a given server task 34 can function as a client task 32 when the given server task 34 itself requires a particular service that is performed by another server task 34. The microkernel operating system 30 preferably maintains a task context for each client task 32 and each server task 34 in a conventional manner, where the task context is a set of data structures and information specific to the client or server task 34, 34 with which it is associated. The microkernel operating system 30 also preferably associates with each client task 32 and with each server task 34 an address space specifying a set of memory addresses accessible to the client task 32 and server task 34, respectively. Each address space preferably includes a microkernel-accessible address area that is common to all address spaces. A complete description of an exemplary microkernel operating system 30 and the functionality provided by the present invention is given in Appendix A.

Figure 4:
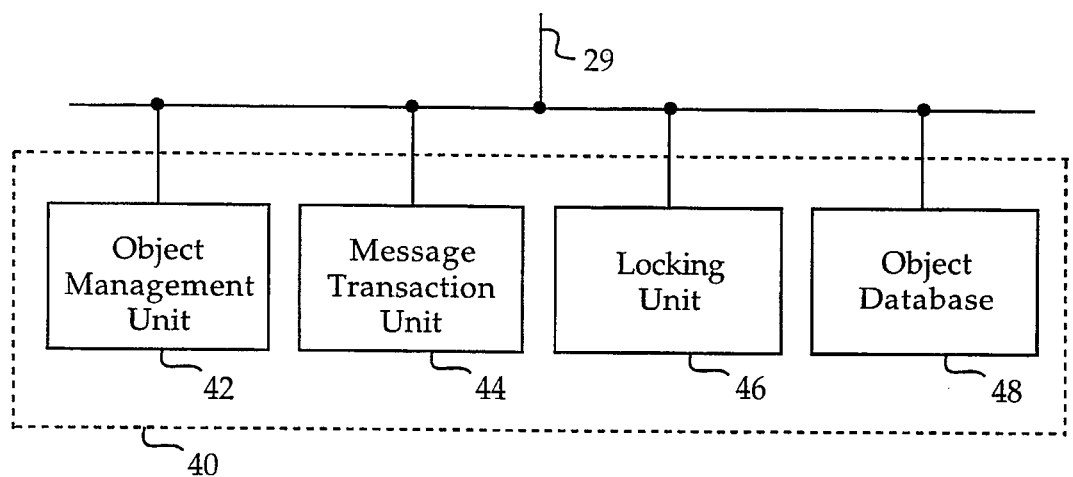
FIG. 4 is a block diagram of a preferred embodiment of an object oriented message passing unit in the system of the present invention.

The object oriented message passing unit 40 facilitates communication between client tasks 32 and server tasks 34. Referring now to FIG. 4, a block diagram of a preferred embodiment of the object oriented message passing unit 40 of the present invention is shown. The object oriented message passing unit 40 comprises an object management unit 42, a message transaction unit 44, a locking unit 46, and an object database 48. Each element of the object oriented message passing unit 40 has an input and an output coupled to the common system bus 29. In the preferred embodiment, the object oriented message passing unit 40 comprises computer program steps that are selectively executed by the processing unit 12.

Figure 5:
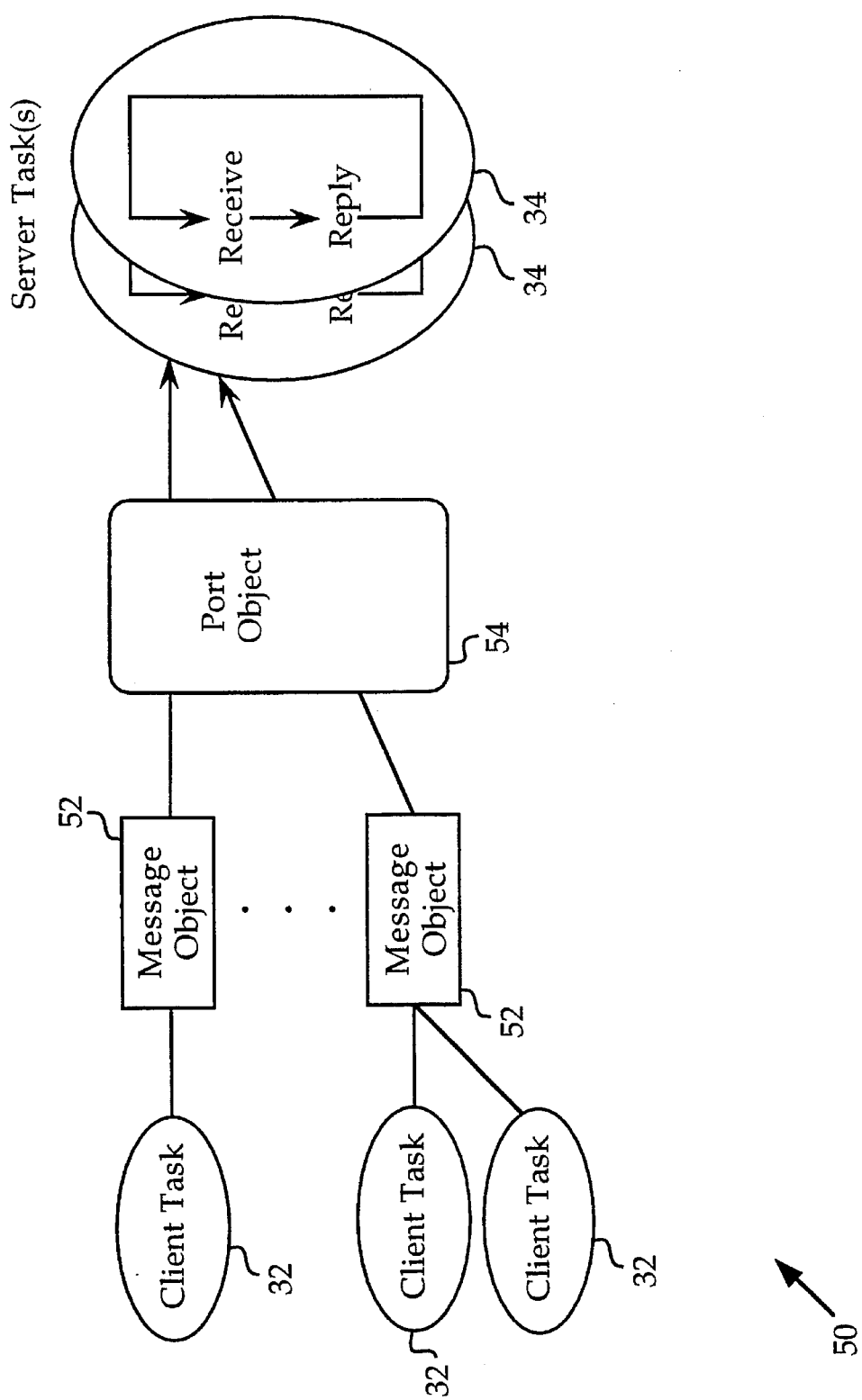
FIG. 5 is a block diagram of an object oriented message passing model provided by the system of the present invention.

The object management unit 42 creates and maintains data structures in the object database 48 that provide a client task communication interface between client tasks 32 and the object oriented message passing unit 40, and that provide a server task communication interface between server tasks 34 and the object oriented message passing unit 40. Through the client task communication interface and the server task communication interface, the object management unit 42 provides an object oriented message passing model 50. Referring now to FIG. 5, a block diagram of a preferred object oriented message passing model 50 provided by the present invention is shown. In the preferred object oriented message passing model 50, one or more message objects 52 form the client task communication interface, and one or more port objects 54 form the server task communication interface. Each message object 52 is associated with at least one client task 32. The set of client tasks 32 associated with a given message object 52 are referred to herein as a client team 33. Each message object 52 represents the behavior of a resource that is under the control of a given server task 34, and preferably reflects how client tasks 32 use a particular service provided by the server task 34. To invoke the behavior associated with a given message object 52, a client task 32 sends a message to the message object 52 by issuing a send message request, where each send message request specifies a message and a message type. The send message requests will be described in more detail below.

In the preferred object-oriented message passing model 50, each port object 54 serves as a receptacle for messages directed from client tasks 32 to message objects 52 that are associated with the port object 54. Server tasks 34 receive messages from a port object 54 by issuing receive message requests as will be described in more detail below. After receiving a given message, a server task 34 implements the behavior associated with the message object 52 to which the message was sent, according to details supplied in the message itself. The server task 34 then issues a reply to the given message that the client task 32 sent, where the reply provides the client task 32 with status information and possibly data. Herein, the sending of a given message by a client task, followed by a server task's receipt of the given message, followed by the server task's reply to the given message is referred to as a message transaction.

Figure 6:
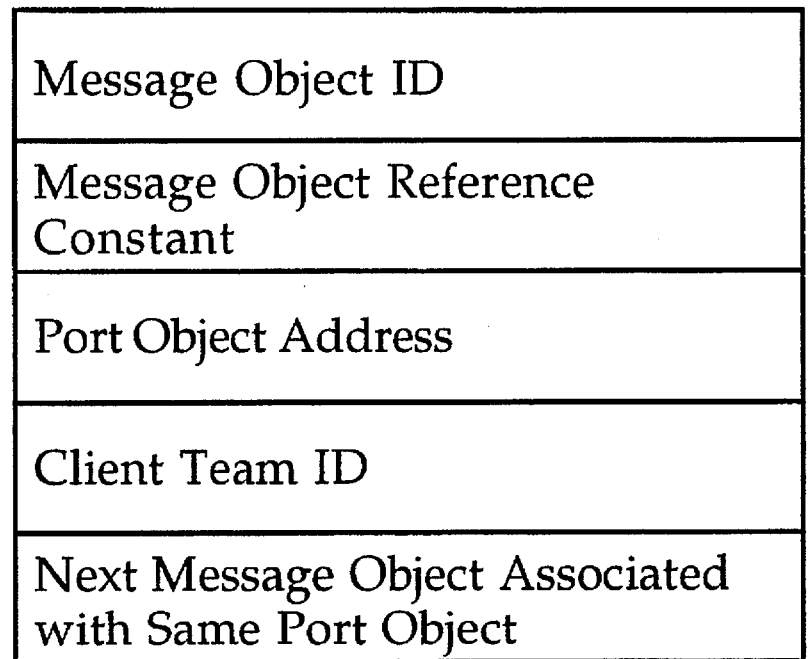
FIG. 6 is a block diagram of a preferred embodiment of a message object.

Referring now to FIG. 6, a block diagram of a preferred embodiment of a message object 52 is shown. The object management unit 42 creates a message object 52 and generates a unique message object identification (ID) in response to a server task's issuance of a message object creation request. The message object creation request preferably includes a reference constant specifying an initial state of the message object 52; a reference to a given port object 54 with which the message object 52 is to be associated; and a client team ID specifying a set of client tasks 32 with which the message object 52 is to be associated. Within each message object 52, a first data field stores the message object ID generated by the object management unit 42 that uniquely identifies the message object 52; a second data field stores the reference constant supplied by the server task, where the reference constant corresponds to the initial state of the message object 52; a third data field references the given port object 54 indicated in the message object creation request; a fourth data field specifies the client team ID included in the message object creation request; and a fifth data field references a next message object 52 associated with the given port object 54. The object management unit 42 does not assign a value to the fifth data field until a next message object 52 has been created.

Figure 7:
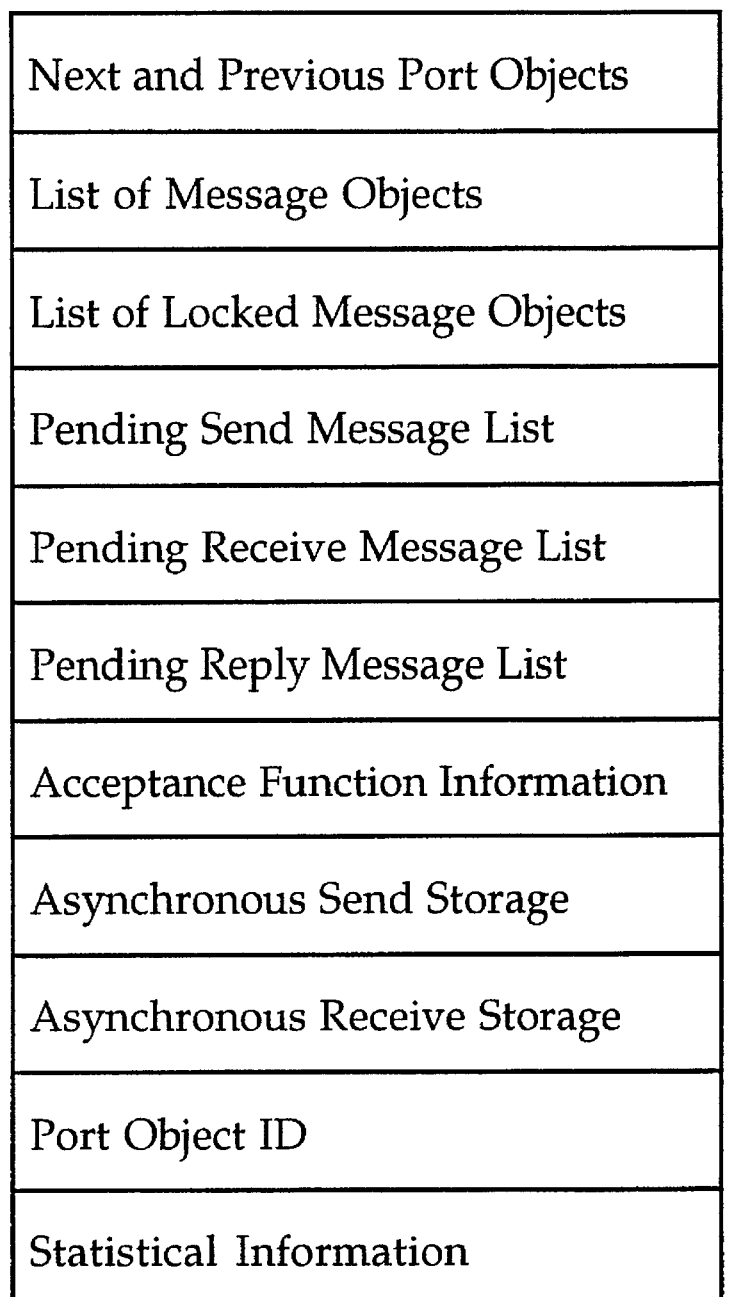
FIG. 7 is a block diagram of a preferred embodiment of a port object.

Referring now to FIG. 7, a block diagram of a preferred embodiment of a port object 54 is shown. The object management unit 42 creates a port object 54 and generates a unique port object ID in response to a port object creation request from a server task 34. In the port object 54, a first data field specifies a next port object and a previous port object. The object management unit 42 therefore links port objects 52 together via their respective first data fields. A second data field in the port object 54 provides a list of those message objects 52 that are associated with the port object 54. When the object management unit 42 creates a new message object 52, the object management unit 42 adds the corresponding new message object ID to the list in the second data field of the port object 54 with which the newly created message object 52 is associated. A third data field in the port object 54 provides a list of each associated message object 52 that has been "locked" in response to a lock request. When a given message object 52 is locked, any send message requests issued by client tasks 32 and directed to the given message object 52 are not available to be received by a server task 34 until unlocking operations have been performed. Message object locking and unlocking operations are performed by the locking unit 46 and will be described in detail below.

In the port object 54, a fourth data field is used to store a pending send message list that specifies those message that client tasks 32 have sent to a message object 52 associated with the port object 54, but that have not yet been received by a server task 34. A fifth data field in the port object 54 is used to store a pending receive message list that specifies those receive message requests that have been issued to the port object 54 by server tasks 34, but that have not yet been matched to a corresponding message sent by a client task 32. A sixth data field in the port object 54 is used to store a pending reply message list that specifies each message that server tasks 34 have received but for which a reply has not yet been issued. When the object management unit 42 creates the port object 54, the fourth, fifth, and sixth data fields are empty. As will be described below, the lists stored in the fourth, fifth, and sixth data fields are maintained by the message transaction unit 44.

A seventh data field in the port object 54 optionally specifies an acceptance function. The acceptance function comprises a set of instructions that directly implements a subset of services provided by a server task 34 within the task context of a client task 32. The acceptance function uses the microkernel-accessible address area that is common to the address space of the client task 32, and therefore effectively functions within the address space of the client task 32. Acceptance functions thus eliminate the need for context switching and mapping between address spaces. Performance of a given service via an acceptance function therefore requires much less computational time than performance of the same service via a server task 34. Acceptance functions provide a means for minimizing the amount of time required to perform time-critical operations. The seventh data field in the port object 54 also specifies a set of message types for which the acceptance function is capable of providing a service. Preferably, the seventh data field is empty when the object management unit 42 first creates the port object 54. The object management unit 42 stores or registers a reference to an acceptance function and the set of message types in response to a server task registration request that identifies a particular acceptance function and the set of message types.

In an exemplary situation in which acceptance functions might be used beneficially, disk input/output (I/O) operations may require services provided by a first server task 34 associated with a file system. The first server task 34 may selectively require particular services provided by a second server task 34 associated with a disk driver, which may in turn selectively require particular services provided by a third server task 34 associated with a small computer systems interface (SCSI) manager. If the second server task 34 and the third server task 34 issue appropriate registration requests, the object management unit 42 will register an acceptance function for the second server task 34 and an acceptance function for the third server task 34, respectively. Those disk I/O operations that require the particular services corresponding to the acceptance functions registered will occur within the task context and within the address space of the first server task 34, eliminating the need for mapping between address spaces and context switching. This in turn will greatly reduce the time required to perform these disk I/O operations.

In the preferred embodiment, client tasks 32 can send messages synchronously or asynchronously. In a like manner, server tasks can issue message receive requests synchronously or asynchronously. Synchronous and asynchronous operations will be described in more detail below. An eighth data field in the port object 54 specifies an amount of storage available for messages sent asynchronously, and a ninth data field in the port object 54 specifies an amount of storage available for asynchronous message receive requests.

A tenth data field in the port object 54 is used to store the unique port object ID generated by the object management unit 42. Finally, an eleventh data field in the port object 54 is used to store statistical information such as the total number of messages sent to message objects 52 associated with the port object 54 since the port object's creation. In the preferred embodiment, each message object 52 is associated with a particular port object 54. Therefore, a port object 54 must be created in the preferred embodiment before a corresponding message object 52 is created.

In addition to creating message objects 52 and port objects 54, the object management unit 42 provides to a server task 34 information associated with a given message object 52 in response to a message object examination request. The information provided includes the client team ID specified in the given message object, a port object ID specifying the port object 54 with which the given message object 52 is associated, and the current value of the message object's reference constant. The object management unit 42 extracts the client team ID and the current value of the reference constant from the message object 52 itself, and uses the port object address within the message object 52 to retrieve the port object ID from the port object 54 with which the message object 52 is associated. The object management unit 42 also modifies the above information in response to a message object modification request, and deletes a given message object 52 in response to a client team termination message. In a manner analogous to the operations provided for message objects 52, the object management unit 42 provides information related to a port object 54 in response to a port object examination request from a server task 34, modifies data fields within the port object 54 in response to a port object modification request, and deletes port objects 52 in response to a port object deletion request.

In the preferred embodiment, the object management unit 42 can associate multiple message objects 52 with a single port object 54. The memory storage requirements for each message object 52 are significantly less than the memory storage requirements for each port object 54. In an exemplary embodiment, each port object 54 occupies 128 bytes within the memory 20, while each message object occupies as little as 24 bytes. In the present invention, because a given server task 34 can register an acceptance function that is to provide one or more services, the given server task 34 is simpler and requires less memory to implement. Moreover, because an acceptance function executes within the task context of a client task 32, no additional memory is required for context switching when an acceptance function performs a service. Thus, the object oriented message passing model 50 provided by the present invention requires significantly less memory space than that required by any message passing model provided by prior art message passing systems, while providing a higher level of structural granularity for a given amount of available memory.

The message transaction unit 44 performs the operations required to carry out message transactions. In particular, the message transaction unit 44 performs the operations required to support the sending of messages to message objects 52 from client tasks 32, the issuance of receive message requests by server tasks 34, the matching of messages sent to issued receive message requests, the selective delivery of a message to an acceptance function or to a server task 34 to perform a service indicated by a message, and the transfer of replies from acceptance functions and server tasks 34 to client tasks 32.

The message transaction unit 44 requires that client tasks 32 send messages to message objects 52 by issuing send message requests. In the preferred embodiment, each send message request is either 1) a synchronous send message request; 2) a synchronous send-and-receive message request; 3) an asynchronous send message request; or 4) an asynchronous send-and-receive message request. As will be described in detail below, in response to either type of synchronous send message request, the message transaction unit 44 blocks the client task 32 until the message transaction has completed, thereby preventing the client task 32 from performing other operations while the message transaction is in progress. In contrast, the message transaction unit 44 allows the client task 32 to continue other operations in response to either type of asynchronous send message request. Each type of send message request preferably specifies a message object ID; a reference to a starting memory location at which a message begins; message length information; a message type that provides a categorization of the message; send options that indicate whether the message is to be delivered to an acceptance function or to a server task 34 by reference or by value; and a flag to indicate whether the message object 52 to which the send message request is directed is to be locked in response to the send message request and subsequently unlocked after an acceptance function or a server task 34 has replied to the message. Both synchronous and asynchronous send-and-receive message requests additionally specify a reply buffer address at which a server task can store a reply message or data, and a reply buffer size. In the preferred embodiment, the message type is a 32-bit number.

Each type of synchronous send message request also specifies a maximum time interval that the client task 32 can remain idle while the message transaction occurs. In addition to the information common to every send message request, each type of asynchronous send message request additionally specifies an address at which the message transaction unit 44 can store a message ID signal corresponding to the asynchronous send message request, and event notification information that indicates how the message transaction unit 44 is to notify the client task 32 when the message transaction is complete. In the description that follows, the message ID signal is simply referred to as the message ID.

In response to a given client task's issuance of a send message request, the message transaction unit 44 creates a send message control block (MCB) according to whether the send message request is synchronous or asynchronous. In response to a synchronous send message request or a synchronous send-and-receive message request, the message transaction unit 44 creates a synchronous send MCB 60. Referring now to FIG. 8A, a block diagram of a preferred embodiment of a synchronous send MCB 60 is shown. The synchronous send MCB 60 is a data structure including a first data field specifying the message object ID corresponding to the message object 52 to which the synchronous send message is directed; a second data field providing the port object ID identifying the port object 54 with which the message object 52 specified in the first data field is associated; a third data field providing a reference to a next and to a previous entry in the port object's pending send message list; a fourth data field specifying the client task ID corresponding to the client task 32 that issued the synchronous send message request; a fifth data field providing the starting address in the memory 20 at which an associated message is stored; a sixth data field providing the length of the message; a seventh data field indicating the message type specified in the synchronous send message request; an eighth data field wherein the message ID is stored; a ninth data field specifying the send options indicated in the synchronous send message request; a tenth data field that the message transaction unit 44 uses to reference an MCB corresponding to a matching receive message request; an eleventh data field in which the message transaction unit 44 stores a server task ID after delivering the message to a server task 34; a twelfth data field indicating whether the message corresponding to the synchronous send message request has been delivered to a server task; a thirteenth data field indicating whether the message object 52 identified in the synchronous send request is locked; a fourteenth data field specifying the address of a reply buffer in the event that the send message request is a synchronous send-and-receive message request; a fifteenth data field providing a reply buffer size in the event that the send message request is a synchronous send-and-receive message request; a sixteenth data field indicating whether the sending client task 32 has been blocked as a result of a blocking request; and a seventeenth data field specifying the maximum time interval that the sending client task 32 can remain idle during the message transaction. The message transaction unit 44 stores the synchronous send MCB 60 in the object database 48.

If the send message request is an asynchronous send message request or an asynchronous send-and-receive message request, the message transaction unit 44 creates an asynchronous send MCB 62 rather than a synchronous send MCB 60. Referring now to FIG. 8B, a block diagram of an asynchronous send MCB 62 is shown. The asynchronous send MCB 62 is a data structure including a first through a fifteenth data field, each of which specifies information analogous to that specified in the first through fifteenth data fields in the synchronous send MCB 60 described above. In addition, the asynchronous send MCB 62 includes a sixteenth data field wherein the message transaction unit 44 stores the event notification information specified in the asynchronous send message request or asynchronous send-and-receive message request. As in the case of the synchronous send MCB 60, the message transaction unit 44 stores the asynchronous send MCB 62 in the object database 48.

The message transaction unit 44 requires that a server task 34 issue a receive message request to receive a message from a given port object 54. Receive message requests are either synchronous receive message requests, or asynchronous receive message requests. Each type of receive message request specifies a port object 54; a message type indicating a category of message the server task 34 is to receive; a reference to a memory location at which a message buffer begins; and a message buffer size. In the preferred embodiment, the message type is a 32-bit number. A synchronous receive message request further includes a maximum time interval the issuing server task 34 can remain idle prior to the delivery of a message by the message transaction unit 44. In addition to the information common to both synchronous and asynchronous receive message requests, an asynchronous receive message request further specifies a message address at which a receive ID corresponding to the asynchronous receive message request can be stored; and event notification information that the message transaction unit 44 uses to notify the issuing server task 34 that a message corresponding to the asynchronous receive message request has been delivered.

Figure 9A:
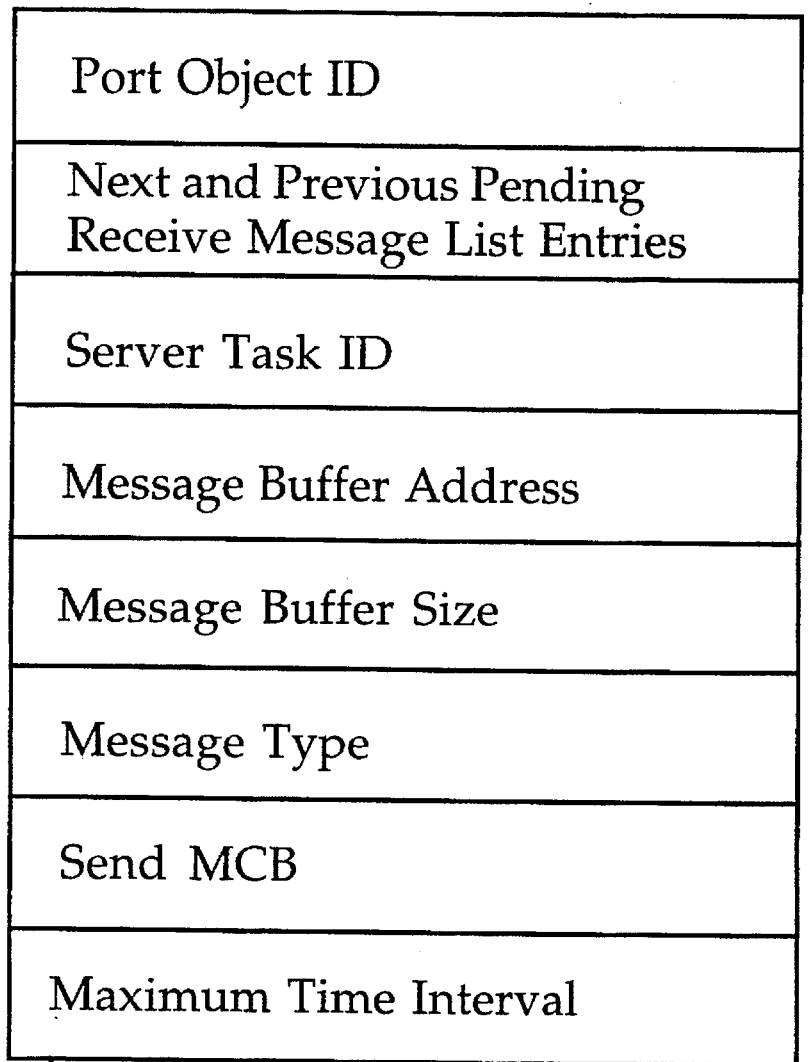
FIG. 9A is a block diagram of a synchronous receive message control block in the present invention.

In response to a receive message request, the message transaction unit 44 creates a receive MCB if no send MCB having a message type that matches the message type given in the receive message request is present. In other words, the message transaction unit 44 creates a receive MCB if the receive message request cannot be immediately matched to a previously-issued send message request. The receive MCB created by the message transaction unit is either a synchronous or an asynchronous receive MCB 70, 72, according to whether the receive message request is a synchronous or an asynchronous receive message request, respectively. Referring now to FIG. 9A, a block diagram of a preferred embodiment of a synchronous receive MCB 70 is shown. The synchronous receive MCB 70 is a data structure including a first data field specifying the port object ID corresponding to the port object 54 to which the synchronous receive message request is directed; a second data field referencing a next and a previous entry in the pending receive message list of the port object 54 indicated in the first data field; a third data field wherein the message transaction unit 44 stores a server task ID corresponding to the server task 34 that issued the request; a fourth data field specifying the message buffer address included in the synchronous receive message request; a fifth data field specifying the message buffer size contained in the synchronous receive message request; a sixth data field providing the message type included in the synchronous receive message request; a seventh data field that the message transaction unit 44 uses to reference an MCB corresponding to a send message request that matches the synchronous receive message request according to message type; and an eighth data field wherein the message transaction unit 44 stores the maximum time interval the issuing server task 34 can remain idle as specified in the synchronous receive message request. The message transaction unit 44 stores the synchronous receive MCB 70 in the object database 48.

Referring now to FIG. 9B, a block diagram of a preferred embodiment of an asynchronous receive MCB 72 is shown. The asynchronous receive MCB 72 is a data structure including a first through a seventh data field that specify information analogous to that detailed for the synchronous receive MCB 70. The asynchronous receive MCB 72 also includes an eighth data field wherein the message transaction unit 44 stores the receive ID, and a ninth data field wherein the message transaction unit 44 stores the event notification information specified in the asynchronous receive message request. As in the case of each synchronous receive MCB 70, the message transaction unit 44 stores each asynchronous receive MCB 72 in the object database 48.

In the preferred embodiment, each MCB described above 60, 62, 70, 72 is implemented as a general MCB structure (not shown) plus one or more data fields that supply request-specific information. The general MCB structure includes data fields for specifying a port object 54; a client or server task 32, 34; references to other corresponding MCB structures; and state information specifying whether the general MCB structure corresponds to a synchronous or asynchronous request and whether the general MCB structure corresponds to a send or receive request. Those skilled in the art will be able to determine the specific additional data fields necessary to implement a synchronous MCB 60, an asynchronous send MCB 62, a synchronous receive MCB 70, and an asynchronous receive MCB 72 according to the descriptions provided above.

The message transaction unit 44 selectively matches a receive message request with a send message request, and selectively matches a send message request either with an acceptance function or a receive message request. Matching occurs according to the message types specified in a send message request and a receive message request, or according to the message type specified in a send message request and the set of message types associated with an acceptance function. In the preferred embodiment, the message transaction unit 44 performs a logical AND operation to determine whether message types match.

In response to a given send message request, the message transaction unit 44 may determine that the send message request can be immediately serviced by a matching acceptance function or that the send message request can be immediately serviced by a matching pending receive message request. The message transaction unit 44 may also determine that the send message request cannot be immediately serviced and must therefore become a pending send message request. The message transaction unit 44 categorizes the send message request as pending by inserting a reference to the corresponding send MCB into the pending send message list of the port object 54 identified in the send MCB. The message transaction unit 44 preferably maintains the pending send message list of the port object 54 as a doubly-linked list in first-in first-out (FIFO) order.

In response to a given receive message request, the message transaction unit 44 may determine that the receive message request can be immediately matched to a pending send message request; or that the receive message request cannot be immediately matched to a send message request and must therefore become a pending receive message request. The message transaction unit 44 categorizes a receive message request as pending by creating a receive MCB and by inserting a reference to the corresponding receive MCB in the pending receive message list of the port object 54 identified in the receive MCB. As with the pending send message list, the message transaction unit 44 preferably maintains the pending receive message list as a doubly-linked list in FIFO order. When the message transaction unit 44 categorizes a synchronous receive message request as pending, the message transaction unit 44 also blocks the execution of the server task 34 that issued the synchronous receive message request until a matching send message request arrives.

The detailed operations that are performed by the message transaction unit 44 in response to send message requests and receive message requests are now considered. The detailed operations are also discussed as individual method steps in FIGS. 11 through 16.

Send Message Requests

In response to a send message request, the message transaction unit 44 initially decodes the message object ID specified in the send message request. If the message object ID is invalid, the message transaction unit 44 issues an invalid ID error to the client task 32 that issued the send message request, and does not further consider the send message request. If the send message request specifies a valid message object ID, the message transaction unit 44 next obtains the address of the port object 54 with which the message object 52 is associated from the message object's fourth data field. By inspecting the list of locked message objects within the port object 54 specified at the port object address obtained, the message transaction unit 44 next determines whether the send message request is directed to a locked message object 52. If the message object 52 is locked, the message transaction unit 44 blocks the client task 32 that issued the send request until the message object 52 is unlocked by preventing the client task 32 from performing further operations. If the message object 52 is not locked, or after the message object 52 is unlocked, the message transaction unit 44 inspects the send message request and determines if the message object 52 is to be locked in response to this send message request. If the message object 52 is to be locked, the message transaction unit 44 issues a lock request to the locking unit 46, which performs the required locking as will be described in detail below.

After any required message object locking has been performed, the message transaction unit 44 generates a unique message ID signal, referred to herein as the message ID, to correspond to the message transaction initiated by the send message request. The message transaction unit 44 then creates a synchronous send MCB 60 or an asynchronous send MCB 62 according to whether the send message request is synchronous or asynchronous, respectively. The message transaction unit 44 associates the send MCB with the message ID, such that the send MCB can be uniquely identified and located by the message ID. When the message transaction unit 44 creates the send MCB, the message transaction unit 44 preferably indicates via the fourteenth data field in the send MCB whether the message object 52 to which the send message request is directed has been locked in response to the send message request. After the send MCB has been created, the message transaction unit 44 determines whether an acceptance function has been registered in the port object 54 associated with the message object 52 to which the send message request was directed. Preferably, the message transaction unit 44 determines whether an acceptance function has been registered by inspecting the port object's seventh data field. The message transaction unit 44 then compares the message type indicated in the send message request with the each message type within the set of message types specified in the port object's seventh data field, thereby determining whether the acceptance function is applicable to the send message request. In the preferred embodiment, each comparison is made through a logical AND operation. If a message type match occurs, the message transaction unit 44 creates a delivery MCB 80 using information specified in the send MCB.

Figure 10:
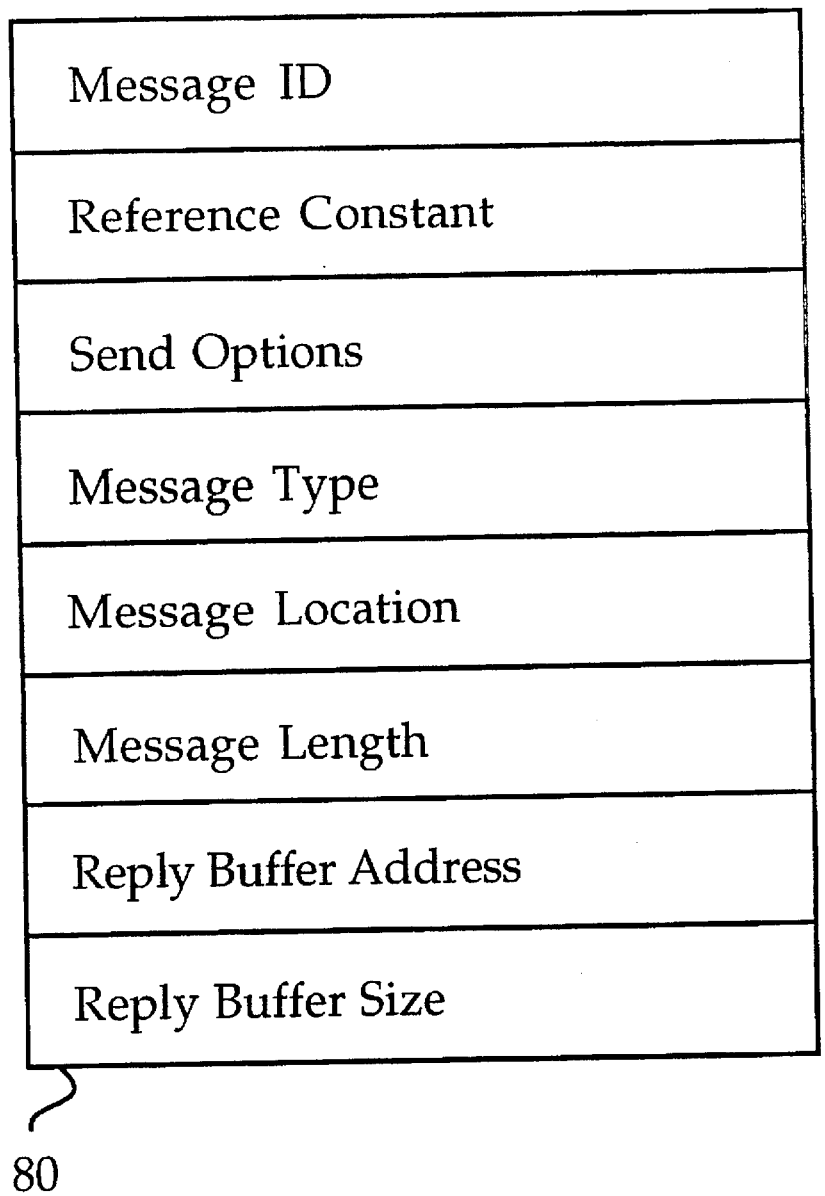
FIG. 10 is a block diagram of a delivery message control block in the present invention.

Referring now to FIG. 10, a block diagram of a preferred embodiment of a delivery MCB 80 is shown. The delivery MCB 80 is created from a subset of the data fields within the send MCB. The delivery MCB 80 includes a first data field in which the message ID specified in the send MCB is stored; a second data field specifying the reference constant of the message object 52 specified in the send MCB; a third data field in which the send options specified in the send MCB are stored; a fourth data field providing the message type given in the send MCB; a fifth data field in which the message location specified in the send MCB is stored; a sixth data field in which the message length specified in the send MCB is stored; a seventh data field in which any reply buffer address specified in the send MCB is stored; and an eighth data field in which any reply buffer size specified in the send MCB is stored. Preferably, when a matching acceptance function is present, the message transaction unit 44 creates and stores the delivery MCB 80 in the microkernel-accessible address area within the client task's address space. After creating the delivery MCB 80, the message transaction unit 44 transfers the location of the delivery MCB 80 to the acceptance function. The acceptance function subsequently obtains the message specified within the delivery MCB 80 and performs the service indicated by the message. The acceptance function executes within the task context and address space of the client task 32 that issued the send message request. In the preferred embodiment, the acceptance function can return a notification to the message transaction unit 44 indicating that the required service is in progress and that a reply will be issued upon completion of the service. If an acceptance function completes a service without explicitly issuing a reply, the message transaction unit 44 automatically issues a reply on behalf of the acceptance function, thereby providing the client task 32 that issued the send message request with status information and possibly data.

The message transaction unit 44 next sets the delivery status specified in the send MCB to indicate that the message has been delivered. The message transaction unit 44 then inserts a reference to the send MCB at the end of the port object's pending reply message list. The pending reply message list indicates those messages that have been received either by an acceptance function or a server task 34 but that have not been issued a reply. In the preferred embodiment, the message transaction unit 44 maintains the pending reply message list as a doubly-linked list arranged in FIFO order.

After inserting the reference to the send MCB in the pending reply message list, the message transaction unit 44 returns the message ID to the client task 32 that issued the send message request if the send MCB is an asynchronous send MCB 62. If the send MCB is a synchronous send MCB 60, the message transaction unit 44 blocks the operation of the client task 32 until the acceptance function either issues a reply to the message specified in the delivery MCB 80 or completes the required service without issuing a reply. If the maximum time interval is exceeded while the client task 32 is blocked, the message transaction unit 44 returns a timeout status to the client task 32 and informs the acceptance function that the message is to be canceled. Once the acceptance function has issued a reply or has completed the required service, the message transaction unit 44 performs reply operations as will be detailed below.

If the message transaction unit 44 determines that an acceptance function capable of servicing the send message request is not present, the message transaction unit 44 subsequently determines whether a receive MCB having a message type that matches that specified in the send message request is referenced in the port object's pending receive message list. If a matching receive MCB exists, the message transaction unit 44 inserts a reference to the matching receive MCB in the tenth data field in the send MCB. In a like manner, the message transaction unit 44 inserts a reference to the send MCB in the seventh data field of the matching receive MCB. Next, the message transaction unit 44 creates a delivery MCB 80 at the message buffer address specified in the receive MCB. The message transaction unit 44 then inserts a reference to the send MCB into the pending reply message list within the port object 54 specified in the send MCB. Next, the message transaction unit 44 determines whether the receive MCB is a synchronous receive MCB 70 or an asynchronous receive MCB 72. If the receive MCB is a synchronous receive MCB 70, the message transaction unit 44 unblocks the server task 34 that issued the synchronous receive message request. The message transaction unit 44 then deletes the synchronous receive MCB 70.

If the message transaction unit 44 determines that the receive MCB is an asynchronous receive MCB 72, the message transaction unit 44 transfers the message referenced in the send MCB to a region within the message buffer referenced by the asynchronous receive MCB 72. The message transaction unit 44 supports the transfer of messages by reference or by value, and also performs any required mapping between address spaces. In the preferred embodiment, the message transaction unit 44 transfers the message by calling a message delivery function. Next, the message transaction unit 44 notifies the server task 34 that issued the asynchronous receive message request according to the event notification information provided in the asynchronous receive MCB 72. Following the notification of the server task 34, the message transaction unit 44 deletes the asynchronous receive MCB 72.

After the deletion of the synchronous receive MCB 70 or the asynchronous receive MCB 72, the message transaction unit 44 returns the message ID to the client task 32 that issued the send message request if the send MCB is an asynchronous send MCB 62. If the send MCB is a synchronous send MCB 60, the message transaction unit 44 blocks the operation of the client task 32 by preventing the client task 32 from performing further operations.

If the message transaction unit 44 determines that no matching acceptance function and no matching receive MCB exists for the send message request, the message transaction unit 44 inserts a reference to the send MCB in the pending send message list of the port object 54 specified by the send message request. The pending message send list thus specifies each send message request that has not yet been matched to a corresponding receive message request. Following the insertion of the reference to the send MCB into the pending send message list, the message transaction unit 44 returns the message ID to the client task 32 that issued the send message request if the send MCB is an asynchronous send MCB 62. If the send MCB is a synchronous send MCB 60, the message transaction unit 44 blocks the client task 32 by preventing the client task 32 from performing further operations.

Receive Message Requests

In response to a receive message request, the message transaction unit 44 first decodes the port object ID specified in the receive message request. Next, the message transaction unit 44 determines whether the port object ID identifies an existing port object 54. If the port object ID does not identify an existing port object 54, the message transaction unit 44 returns an invalid ID error to the server task 34 that issued the receive message request, and does not consider the receive message request further. If the port object ID identifies an existing port object 54, the message transaction unit 44 determines whether a send MCB having a message type matching that specified in the receive message request is present in the port object's pending send message list. If no matching send MCB is present, the message transaction unit 44 next creates an appropriate type of receive MCB as described above to correspond to the receive message request. The message transaction unit 44 also inserts a reference to the receive MCB in the port object's pending receive message list. If the receive MCB created is an asynchronous receive MCB 72, the message transaction unit 44 does not perform additional operations. If the receive MCB created is a synchronous receive MCB 70, the message transaction unit 44 blocks the server task 34 that issued the synchronous receive message request until a matching send message request arrives. If the maximum time interval specified in the synchronous receive message request is exceeded while the server task 34 is blocked, the message transaction unit 44 returns a timeout status to the server task 34, and cancels the synchronous receive message request by deleting the synchronous receive MCB 70 created.

When a matching send message request arrives, the message transaction unit 44 creates the appropriate type of send MCB, and then inserts a reference to the matching send MCB in the receive MCB's seventh data field, and inserts a reference to the receive MCB in the tenth data field of the matching send MCB. The message transaction unit 44 then inserts a reference to the send MCB in the pending reply message list in the port object 54. After inserting the reference to the send MCB in the pending reply message list, the message transaction unit 44 creates a delivery MCB at the message buffer address specified in the receive MCB. If the receive MCB is an asynchronous receive MCB 72, the message transaction unit 44 notifies the server task 34 that issued the asynchronous receive message request according to the event notification specified in the asynchronous receive MCB 72. The message transaction unit 44 then delivers the message referenced in the send MCB to the server task 34 within the message buffer indicated in the asynchronous receive MCB 72, according to the send options specified in the matching send MCB. In the preferred embodiment, the message transaction unit 44 supports the delivery of messages by reference or by value, and performs any required mapping between the client task's address space and the server task's address space. To deliver the message, the message transaction unit 44 preferably calls a message delivery function. Following the delivery of the message, the message transaction unit 44 deletes the receive MCB that had been created and removes the reference to the receive MCB from the pending receive message list.

If the receive MCB created is a synchronous receive MCB 70, the message transaction unit 44 unblocks the server task 34 rather than notifying the server task 34 as described above. After unblocking the server task 34, the message transaction unit 44 performs the same message delivery and receive MCB deletion operations as described above.

If the message transaction unit 44 determines that a matching send MCB is present in the pending send message list immediately after determining that the port object ID is valid, the message transaction unit 44 does not create a receive MCB. Rather, the message transaction unit 44 inserts a reference to the matching send MCB in the pending send message list, and then creates a delivery MCB as described above. If the receive message request is an asynchronous receive message request, the message transaction unit 44 next notifies the server task 34 according to the event notification information specified in the matching send MCB. If the receive message request is a synchronous rather than an asynchronous receive message request, the message transaction unit 44 does not have to perform an unblocking operation as described above because the server task 34 had not been blocked. Regardless of the type of receive message request, the message transaction unit 44 next delivers the message referenced in the send MCB to the message buffer specified in the receive message request, according to the send options specified in the send MCB.

After a server task 34 has performed the service indicated by a message, the server task 34 issues a reply to the message. After an acceptance function has performed a service indicated by a message, the acceptance function may explicitly issue a reply to the message. If the acceptance function does not explicitly issue a reply, the message transaction unit 44 automatically issues a reply on behalf of the acceptance function after execution of the acceptance function has completed. In the preferred embodiment, a reply includes the message ID and status information. The reply may also include a reference to a reply buffer. In response to a reply, or when issuing a reply on behalf of an acceptance function, the message transaction unit 44 decodes the message ID specified in the reply to locate the appropriate send MCB. Next, the message transaction unit 44 delivers the status information to the client task 32 specified in the send MCB. If a reply buffer is indicated in the reply, the message transaction unit 44 delivers a copy of the contents of the reply buffer to the client task 32. The message transaction unit 44 then issues an unlock request to the locking unit 46 if the fourteenth data field in the send MCB indicates that the message object 52 had been locked in response to the client task's send message request. Message object unlocking will be described in detail below. Next, the message transaction unit 44 deletes the message ID, and finally deletes the send MCB. The message transaction that had been associated with the message ID is now complete.

Preferably, server tasks 34 issue receive message requests on a periodic basis, or immediately following the performance of a service. This ensures that server tasks 34 do not remain idle and also guarantees that each send message request issued by a client task 32 will be serviced by a server task 34. In the preferred embodiment of the present invention, in response to a receive-and-reply message request issued by a server task 34, the message transaction unit 44 performs reply operations associated with the reply portion of the receive-and-reply message request, and immediately thereafter responds to the receive portion of the receive-and-reply message request. Preferably, the receive-and-reply message request includes the information separately specified above for receive message requests and for reply operations. The message transaction unit 44 functions according to the above descriptions when performing the reply operations and when responding to the receive portion specified in the receive-and-reply request. Because the message transaction unit 44 supports receive-and-reply message requests, the message transaction unit 44 ensures that each server task 34 is utilized as efficiently as possible.

The locking unit 46 performs message object locking and unlocking operations. Send message requests directed to a particular message object 52 after the message object 52 has been locked are not eligible to be matched to an acceptance function or to a receive MCB until unlocking operations have been performed. The locking unit 46 performs locking operations in response to a lock request. In the preferred embodiment, lock requests can be issued by a server task 34, or by the message transaction unit 44 on behalf of a client task 32 as a result of a send message request. Preferably, each lock request specifies the message object ID of a message object 52 targeted for locking.

In response to a lock message object request, the locking unit 46 determines if the message object ID specified is valid. If the message object ID is not valid, the locking unit 42 returns an invalid ID error to the issuer of the lock message object request, and does not consider the request further. If the message object ID is valid, the locking unit 46 determines if the targeted message object 52 is already locked by inspecting the list of locked message objects within the port object 54 with which the targeted message object 52 is associated. In the preferred embodiment of the present invention, each element in the list of locked message objects is a lock structure that specifies a message object ID and a semaphore. If the targeted message object 52 is referenced in the list of locked message objects, the targeted message object 52 is already locked. Preferably, the semaphore provides a lock wait list that sequentially indicates each task that is waiting to lock the targeted message object 52 in FIFO order.

If the locking unit 46 determines that the targeted message object 52 is already locked, the locking unit 46 adds the ID of the client task 32 or server task 34 responsible for initiating the lock request to the end of the lock wait list. The locking unit 46 then waits until the currently-considered client task ID or server task ID is at the front of the lock wait list and a corresponding unlocking request directed to the targeted message object 52 has been received. The locking unit 46 then performs unlocking operations as will be described below.

If the message object 52 is not already locked, the locking unit 46 inspects the pending reply message list within the port object 54 to determine how many send message control blocks currently referenced specify the targeted message object 52. If no send MCB referenced specifies the targeted message object 52, the locking unit 46 inserts a new lock structure containing the targeted message object ID into the list of locked message objects, thereby locking the targeted message object 52. Once the targeted message object 52 is locked, the client task 32 or the server task 34 associated with the locked message object 52 is referred to herein as the "owner" of the targeted message object's lock. After locking the targeted message object 52, the locking unit 46 returns control to the issuer of the lock request.

If one or more send message control blocks currently referenced in the pending reply message list specify the targeted message object 52, the locking unit waits until the reference to each such send MCB has been removed from the pending reply message list due to a reply or a message cancellation. After the reference to each send MCB that specifies the targeted message object 52 has been removed from the pending reply message list, the locking unit 46 inserts a new lock structure containing the targeted message object ID into the list of locked message objects, thereby locking the targeted message object 52. After locking the targeted message object 52, the locking unit 46 returns control to the issuer of the lock request. While the reference to each send MCB that specifies the targeted message object 52 is being removed from the pending reply message list, the targeted message object 52 is referred to herein as being in a "locking" state.

Preferably, an unlock request specifies the message object ID of a targeted message object 52. In the preferred embodiment, an unlock request can be issued by a server task 34, or by the message transaction unit 44 during reply operations as described above. In response to an unlock request, the locking unit 46 determines whether the message object ID is valid. If the message object ID is not valid, the locking unit 46 returns an invalid ID error to the issuer of the unlock request, and does not consider the unlock request further. If the message object ID is valid, the locking unit 46 determines whether the targeted message object 52 is currently locked. If the targeted message object 52 is not currently locked, the locking unit 46 returns a lock state error to the server task 34, and does not consider the unlock request further.

In the event that the targeted message object 52 is currently locked, the locking unit 46 determines whether another client task 32 or server task 34 is waiting to lock the targeted message object 52 by inspecting the lock wait list provided by the semaphore. If another client task 32 or server task 34 is waiting to lock the targeted message object 52, the locking unit 46 removes the corresponding client task ID or server task ID, respectively, from the top of the lock wait list, and returns control to the issuer of the lock request. In this manner, the locking unit 46 transfers "ownership" of the targeted message object's lock to the next successive client task 32 or server task 34 indicated in the semaphore without altering the list of locked message objects.

If the locking unit 46 determines that no other client task 32 or server task 34 is waiting to lock the targeted message object 52, the locking unit 46 unlocks the targeted message object 52 by removing the corresponding lock structure from the list of locked objects within the port object 54 associated with the targeted message object 52. After unlocking the targeted message object 52, the locking unit 46 returns control to the issuer of the unlock request.

Because the present invention provides for message object locking and unlocking, the value of the reference constant associated with a message object 52 can be guaranteed to remain unchanged throughout a message transaction if the message object 52 is locked at the outset of the message transaction. The use of a message object's reference constant in this manner is particularly useful when the reference constant directly references a particular memory address. In an exemplary situation, a message object's reference constant could be used to specify an address at which a file control block for a given data file is stored. Those skilled in the art will recognize that in the exemplary situation, the use of message object locking in response to a send message request ensures that a file deletion operation will not invalidate a previously pending file read operation because the address of the file control block remains valid throughout the message transaction associated with the file read operation.

Figure 11A:
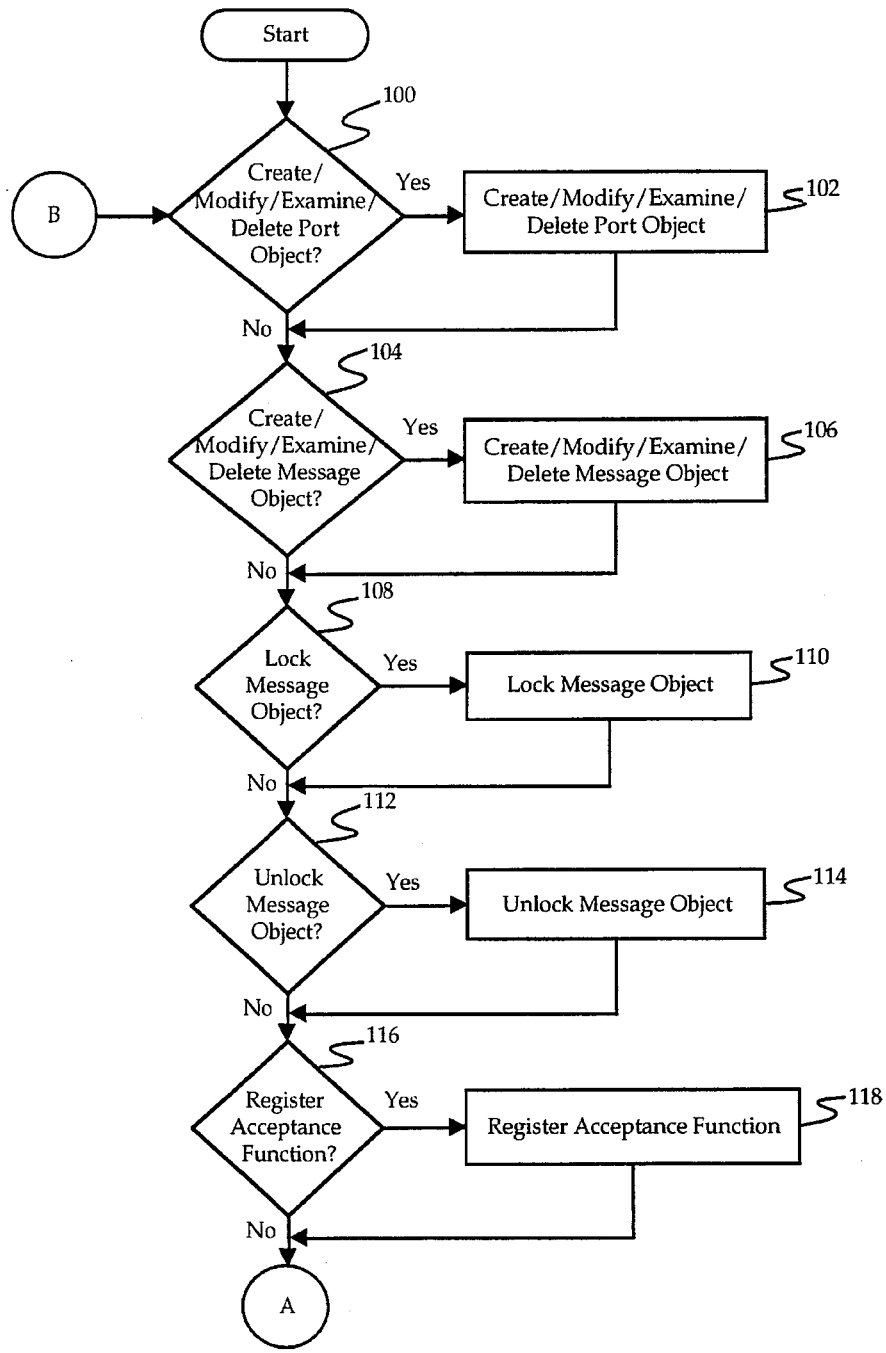
FIGS. 11A and 11B are a flowchart of a preferred object oriented message passing method in accordance with the present invention.
Figure 11B:
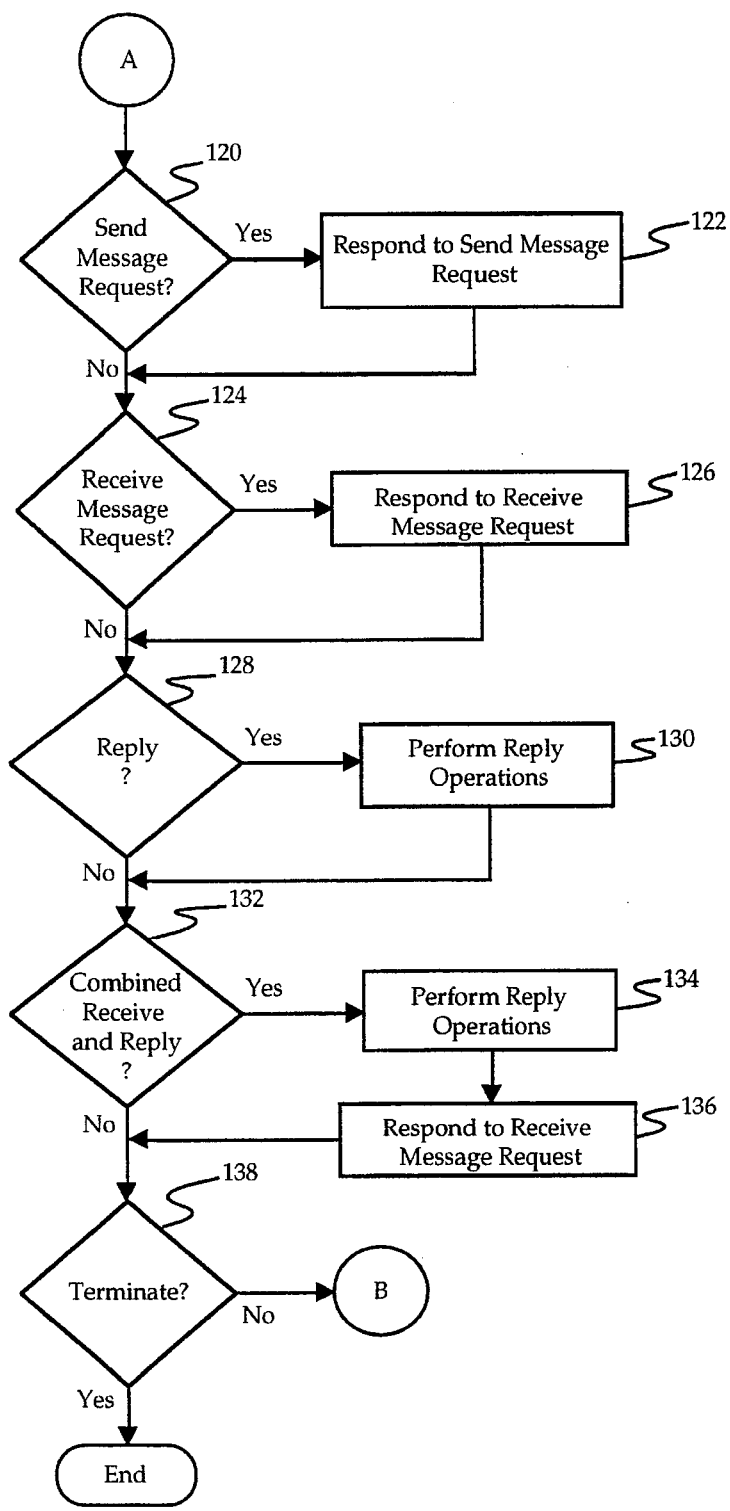

Referring now to FIG. 11, a flowchart of a preferred object oriented message passing method in accordance with the present invention is shown. The preferred method passing method begins in step 100 with the object management unit 42 determining whether a port object 54 is to be created, modified, examined, or deleted in response to a corresponding server task request. If a port object 54 is to be created, modified, examined, or deleted, the object management unit 42 performs the appropriate operation indicated by the server task request in step 102. After step 102 or after step 100, the object management unit 42 determines in step 104 whether a message object 52 is to be created, modified, examined, or deleted in response to a corresponding server task request. If so, the object management unit 42 performs the action indicated by the server task request in step 106. Following step 106 or step 104, the locking unit 46 determines in step 108 whether a message object 52 is to be locked in response to a server task lock request. If so, the locking unit 46 performs the locking operations indicated in the server task request in step 110. If in step 108 the locking unit 46 determines that no message object 52 is to be locked, or after step 110, the locking unit 46 next determines in step 112 whether a message object 52 is to be unlocked in response to a server task unlock request. If so, the locking unit 46 performs the unlocking operations in response to the unlock request in step 114. If no message object unlocking is required in step 112, or following step 114, the object management unit 42 determines in step 116 whether an acceptance function is to be registered for a port object 54 in response to a server task request. If an acceptance function is to be registered, the object management unit 42 registers the acceptance function with the port object 54 specified in the server task request in step 118.

Following step 118, or after step 116 if the object management unit 42 determines that no acceptance function is to be registered, the message transaction unit 44 determines in step 120 whether a client task 32 has issued a send message request. If so, the message transaction unit 44 responds to the send message request in step 122. After step 122, or after step 120 if no send message request has been issued, the message transaction unit 44 determines in step 124 whether a server task has issued a receive message request. If a server task 34 has issued a receive message request, the message transaction unit 44 responds to the receive message request in step 126. If in step 124 the message transaction unit 44 determines that no receive message request has been issued, or after step 126, the message transaction unit 44 determines in step 128 whether a reply has been issued. If so, the message transaction unit performs reply operations in step 130. Following step 130, or following step 128 if no reply has been issued, the message transaction unit 44 determines whether a server task 34 has issued a combined receive-and-reply message request in step 132. If so, the message transaction unit 44 performs the reply operations indicated in the receive-and-reply message request in step 134, after which the message transaction unit 44 responds to the receive portion of the receive-and-reply message request in step 136. After step 136, or after step 132 if step 134 is not performed, the message transaction unit 44 determines whether operation is to terminate. If operation is to continue, the preferred method proceeds to step 100. Otherwise, the preferred method ends.

Figure 12A:
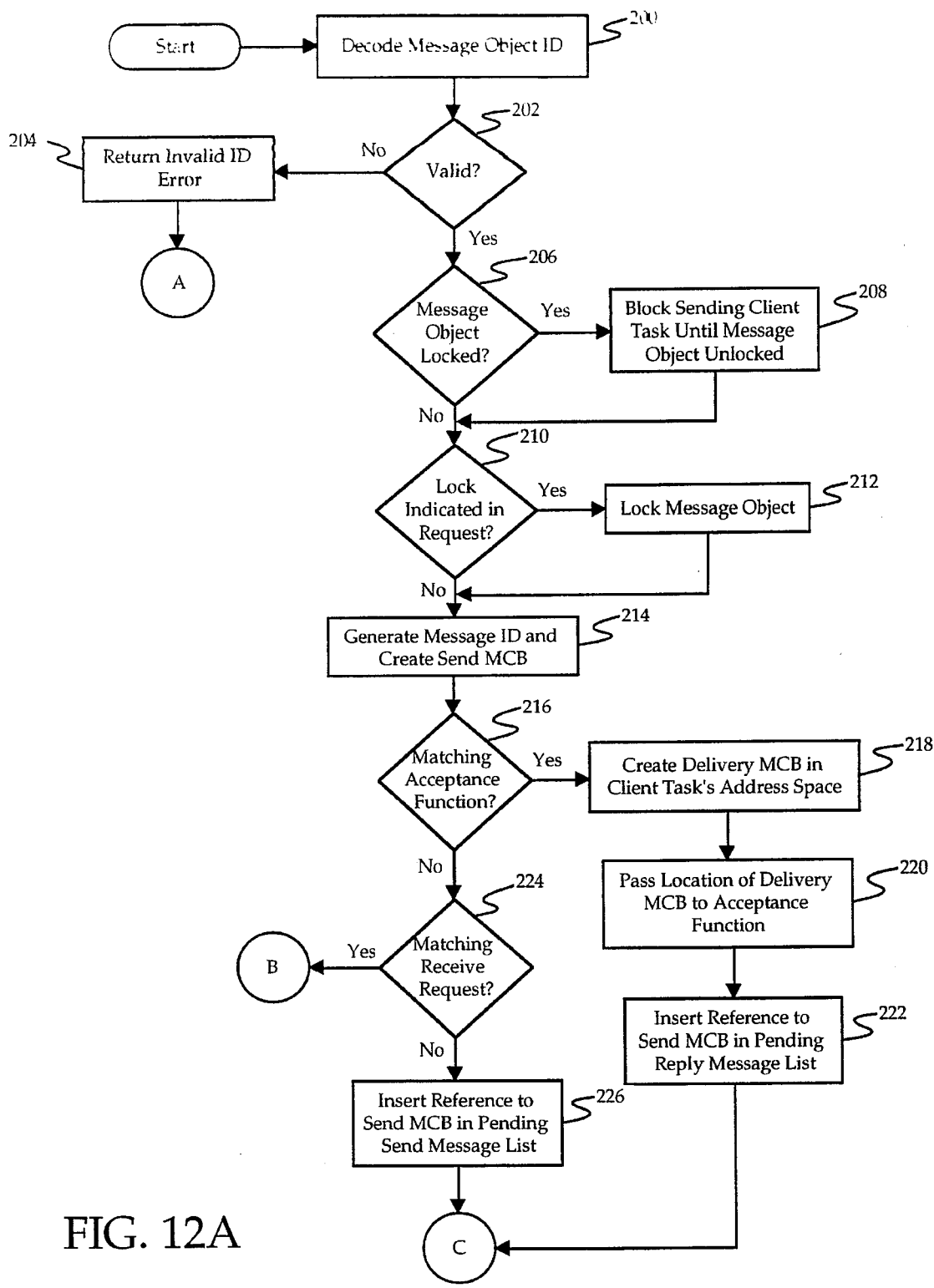
FIGS. 12A, 12B, and 12C are a flowchart of a preferred method for responding to a send message request in the present invention.
Figure 12B:
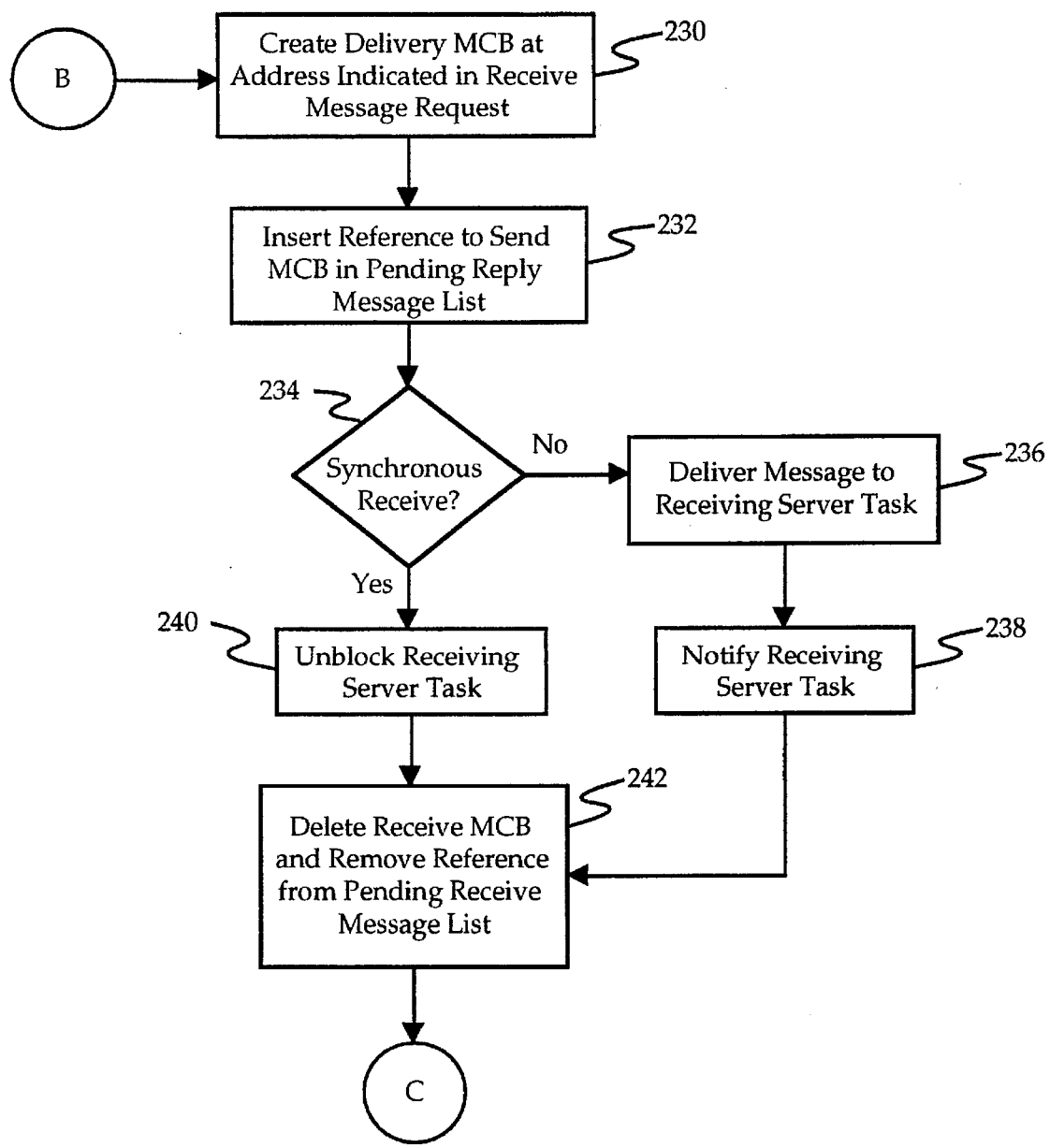
Figure 12C:
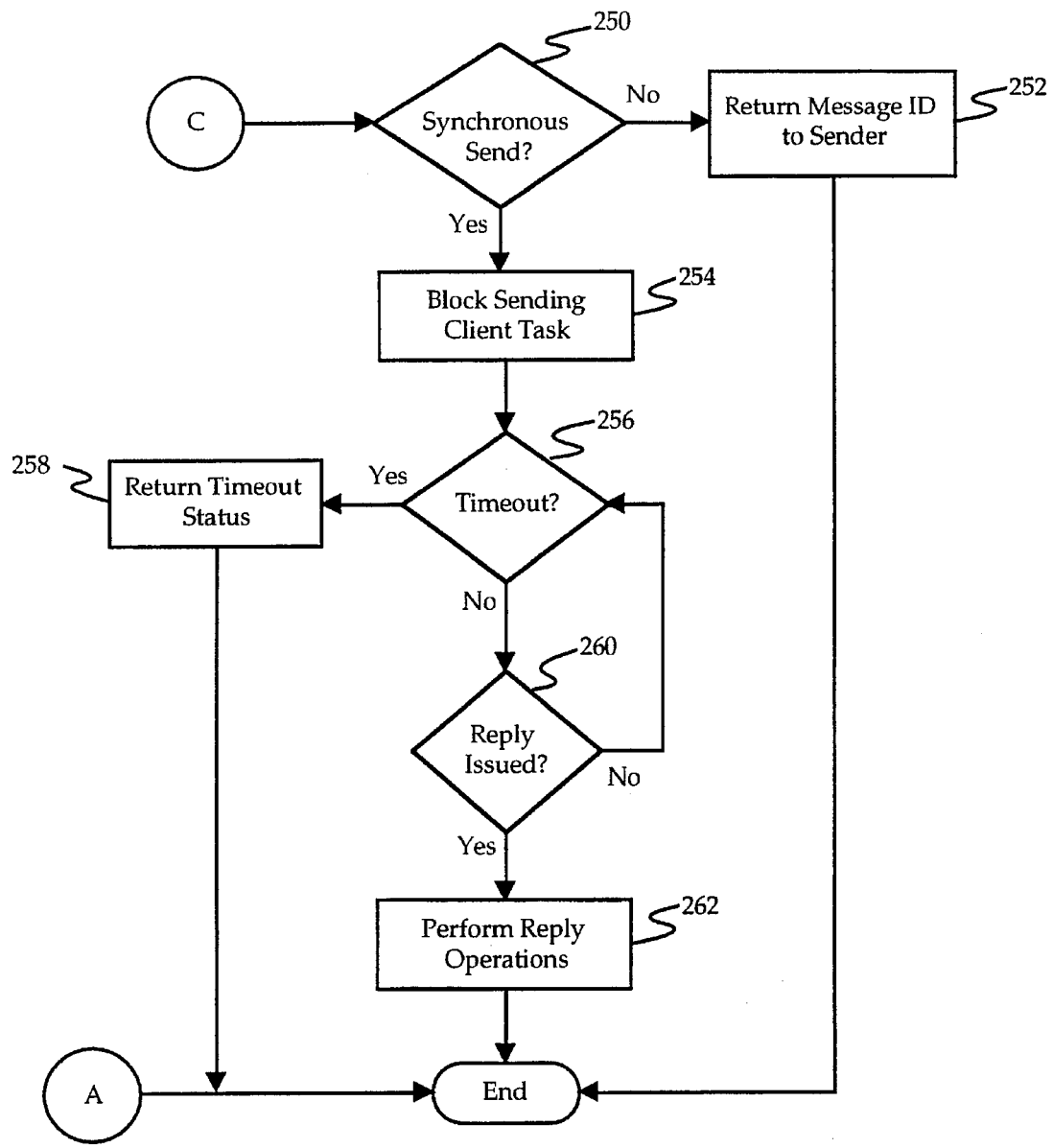

Referring now to FIGS. 12A, 12B, and 12C, a flowchart of a preferred method for responding to a send message request is shown. The preferred message passing method begins in step 200 with the message transaction unit 44 decoding the message object ID specified in the send message request. Next, in step 202, the message transaction unit 44 determines whether the message object ID is valid. If the message object ID is invalid, the message transaction unit 44 returns an invalid ID error to the client task 32 that issued the send message request in step 204, after which the preferred method ends. If the message object ID is valid, the message transaction unit 44 proceeds to step 206 and determines whether the message object 52 to which the send message request is directed is locked. If the message object 52 is locked, the message transaction unit 44 blocks the sending client task 32 until the message object 52 is unlocked in step 208. The blocking performed by the message transaction unit 44 prevents the client task 32 from performing further operations. After step 208, or after step 206 if step 208 is not performed, the message transaction unit 44 determines in step 210 whether the send message request specifies that the message object is to be locked as a result of the message transaction initiated. If so, the message transaction unit 44 issues a corresponding lock request to the locking unit 46 in step 212. After step 212, or after step 210 if step 212 is not performed, the message transaction unit 44 generates a unique message ID to correspond to the message transaction initiated by the send message request, and creates a send MCB corresponding in type to the send message request type in step 214.

Next, in step 216, the message transaction unit 44 determines whether an acceptance function specifying a message type that matches the message type in the send MCB has been registered with the port object 54. If an acceptance function has been registered, the message transaction unit 44 creates a delivery MCB 80 in the client task's address space in step 218. Preferably, the delivery MCB 80 is created in the microkernel-accessible portion of the client task's address space. Following step 218, the message transaction unit 44 passes a pointer to the delivery MCB 80 to the acceptance function in step 220. Next, the message transaction unit 44 inserts a reference to the send MCB in the pending reply message list within the port object 54 in step 222.

After step 222, the message transaction unit 44 determines whether the send MCB created is a synchronous send MCB 60 in step 250. If not, the message transaction unit 44 returns the message ID to the client task 32 that issued the send message request in step 252, after which the preferred method ends. If the send MCB is a synchronous send MCB 60, the message transaction unit 44 next prevents the sending client task 32 from performing further operations, that is, blocks the sending client task 32, in step 254. Next, in step 256, the message transaction unit 44 determines whether the maximum time interval specified in the send MCB has been exceeded. If so, the message transaction unit 44 returns a timeout status to the sending client task 32, after which the preferred method ends. If the maximum time interval has not been exceeded, the message transaction unit 44 determines whether a reply has been issued to the message indicated in the send message request in step 260. If no reply has been issued, the preferred method returns to step 256. If in step 260 the message transaction unit 44 determines that a reply has been issued, the message transaction unit 44 performs reply operations in step 262. Following step 262, the preferred method ends.

If in step 216 the message transaction unit 44 determines that a matching acceptance function is not present, the message transaction unit next determines whether a matching receive MCB is present in the port object's pending receive message list in step 224. If a matching receive MCB is not present, the message transaction unit 44 inserts a reference to the send MCB in the pending send message list in step 226, after which the preferred method proceeds to step 250. If the message transaction unit 44 determines that a matching receive MCB is present in step 224, the message transaction unit 44 creates a delivery MCB at the message buffer address specified within the matching receive MCB in step 230. Next, the message transaction unit 44 inserts a reference to the send MCB in the pending reply message list in step 232. Following step 232, the message transaction unit 44 determines in step 234 whether the receive MCB is a synchronous receive MCB 70. If so, the message transaction unit 44 unblocks the receiving server task 34 that issued the corresponding receive message request in step 240. If the message transaction unit 44 determines that the receive MCB is not a synchronous receive MCB 70, the message transaction unit 44 delivers the message referenced in the send MCB to the server task 34 identified in the asynchronous receive MCB 72 in step 236. Following step 236, the message transaction unit 44 notifies the receiving server task 34 according to the event notification information specified in the asynchronous receive MCB 72 in step 238. After step 238, or after step 240, the message transaction unit 44 deletes the receive MCB and its corresponding pending receive message list reference in step 242. Following step 242, the preferred method proceeds to step 250.

Figure 13A:
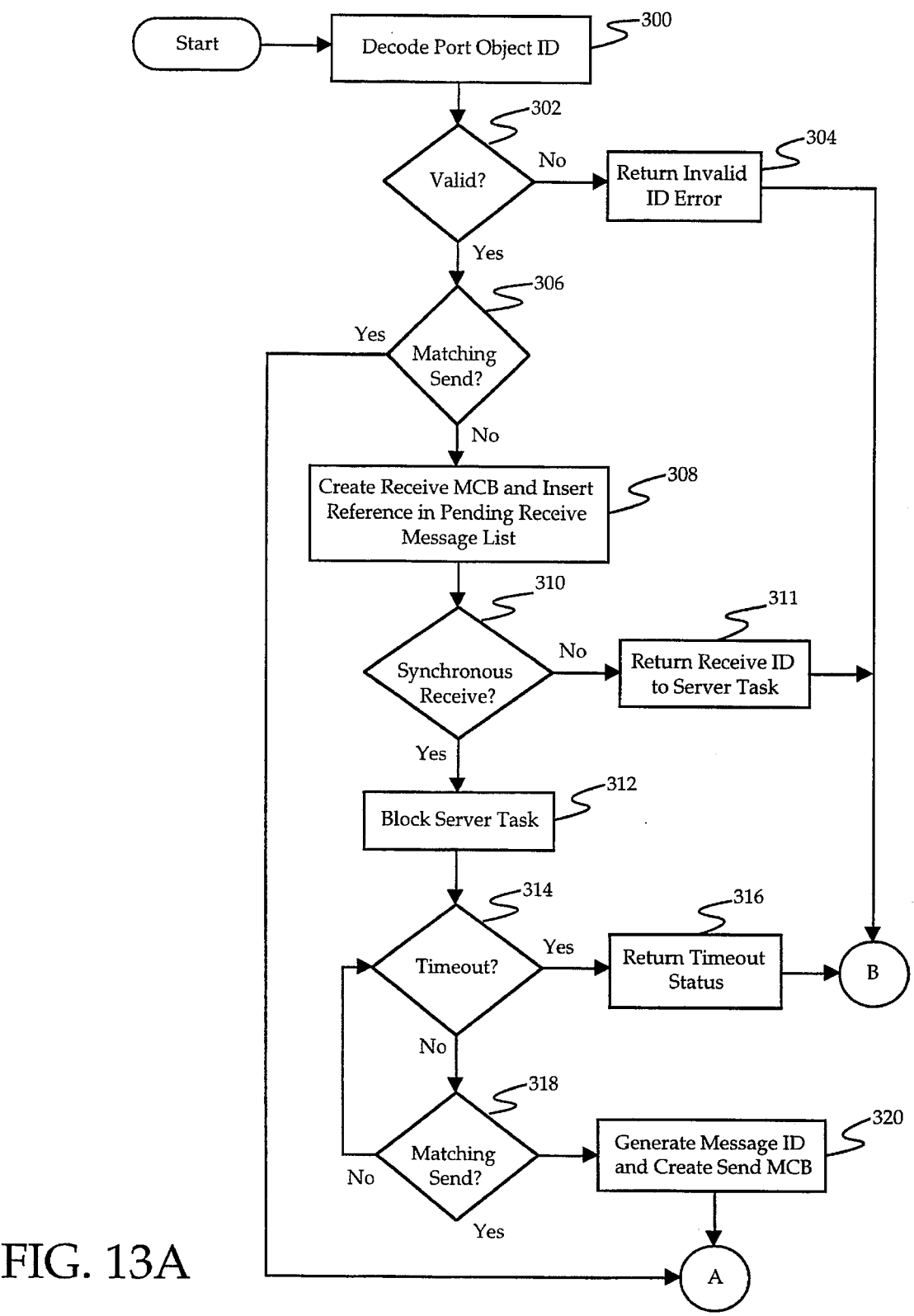
FIGS. 13A and 13B are a flowchart of a preferred method for responding to a receive message request in the present invention.
Figure 13B:
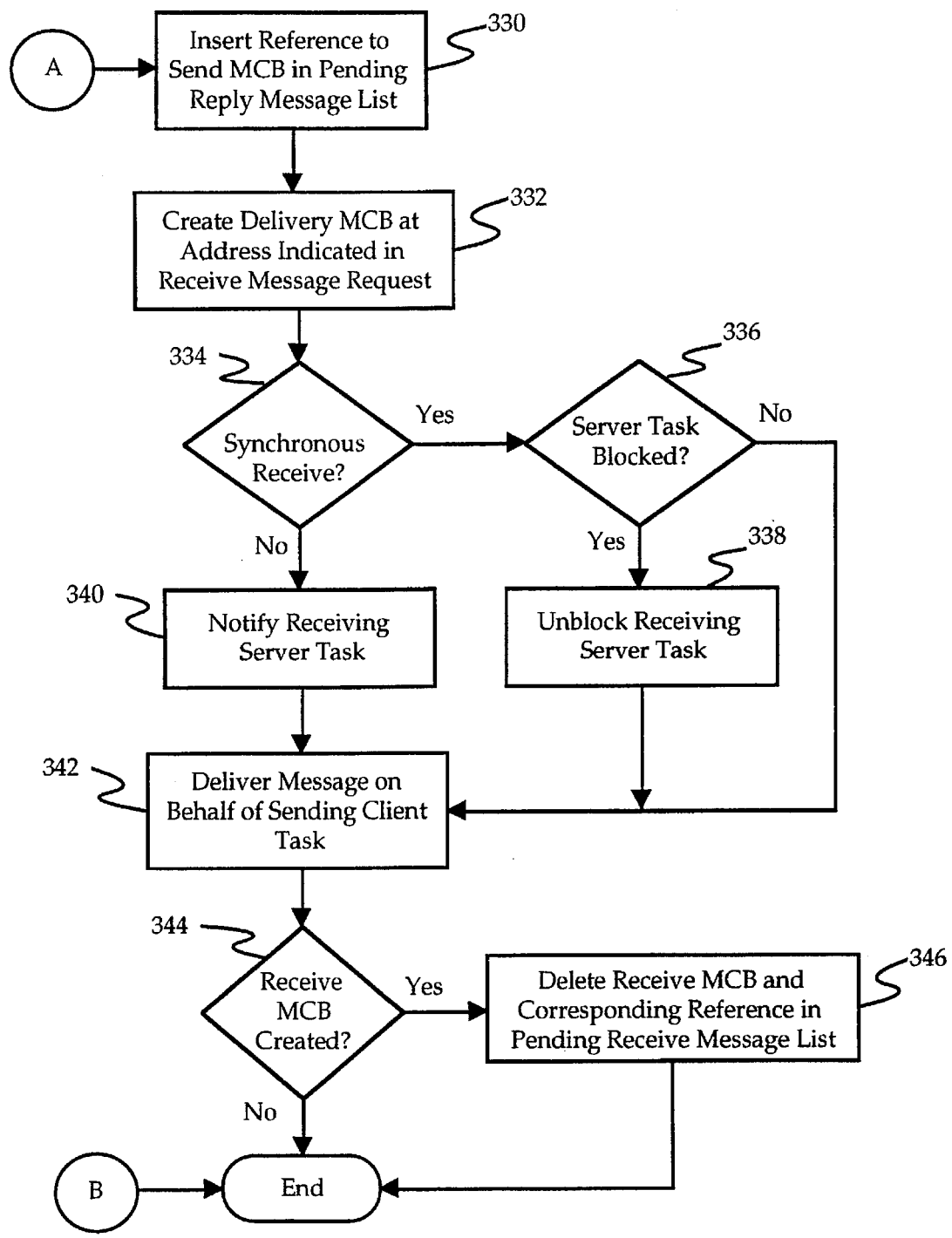

Referring now to FIGS. 13A and B, a flowchart of a preferred method for responding to a receive message request is shown. The preferred method begins in step 300 with the message transaction unit 44 decoding the port object ID specified in the receive message request. Next, the message transaction unit 44 determines whether the port object ID is valid in step 302. If the port object ID is not valid, the message transaction unit 44 returns an invalid ID error to the server task 34 that issued the receive message request in step 304, after which the preferred method ends. If the port object ID is valid, the message transaction unit 44 next determines whether a matching send MCB is present in the port object's pending send message list in step 306. If a matching send MCB is not present, the message transaction unit 44 creates a receive MCB according to the type of receive message request issued, and inserts a reference to the receive MCB in the pending receive message request list in step 308. Following step 308, the message transaction unit 44 determines whether the receive message request is synchronous in step 310. If not, the message transaction unit 44 returns the receive ID to the server task 34 that issued the asynchronous receive message request in step 311, after which preferred method ends. If the receive message request is synchronous, the message transaction unit blocks the server task 34 that issued the receive message request in step 312. Next, in step 314, the message transaction unit 44 determines whether the maximum time interval specified in the receive MCB has been exceeded. If so, the message transaction unit 44 returns a timeout status to the server task 34 in step 316, after which the preferred method ends. If the maximum time interval has not been exceeded, the message transaction unit next determines whether a matching send message request has been issued in step 318. If not, the preferred method returns to step 314. If a matching send message request has been issued, the message transaction unit 44 generates a unique message ID and creates a corresponding send MCB in step 320.

Following step 320, or following step 306 if a matching send MCB is present, the message transaction unit 44 inserts a reference to the send MCB in the port object's pending reply message list in step 330. The message transaction unit 44 then creates a delivery MCB 80 at the address specified in the receive message request or in the receive MCB in step 332. After step 332, the message transaction unit 44 determines whether the receive message request is a synchronous receive message request in step 334. If the receive message request is synchronous, the message transaction unit 44 determines whether the server task 34 that issued the receive message request is blocked in step 336. If so, the message transaction unit 44 unblocks the server task 34 in step 338. If the message transaction unit 44 determines in step 334 that the receive message request is an asynchronous receive message request rather than a synchronous receive message request in step 334, the message transaction unit 44 notifies the server task 34 that issued the asynchronous receive message request in step 340. Following step 340, or after step 338, or after step 336 if step 338 is not performed, the message transaction unit 44 delivers the message specified in the send MCB to the message buffer specified in the receive message request in step 342. After step 342, the message transaction unit 44 determines whether a receive MCB corresponding to the receive message request had been created in step 344. If so, the message transaction unit 44 deletes the receive MCB and its corresponding reference in the pending receive message list in step 346. After step 346, or after step 344 if step 346 is not performed, the preferred method ends.

Figure 14:
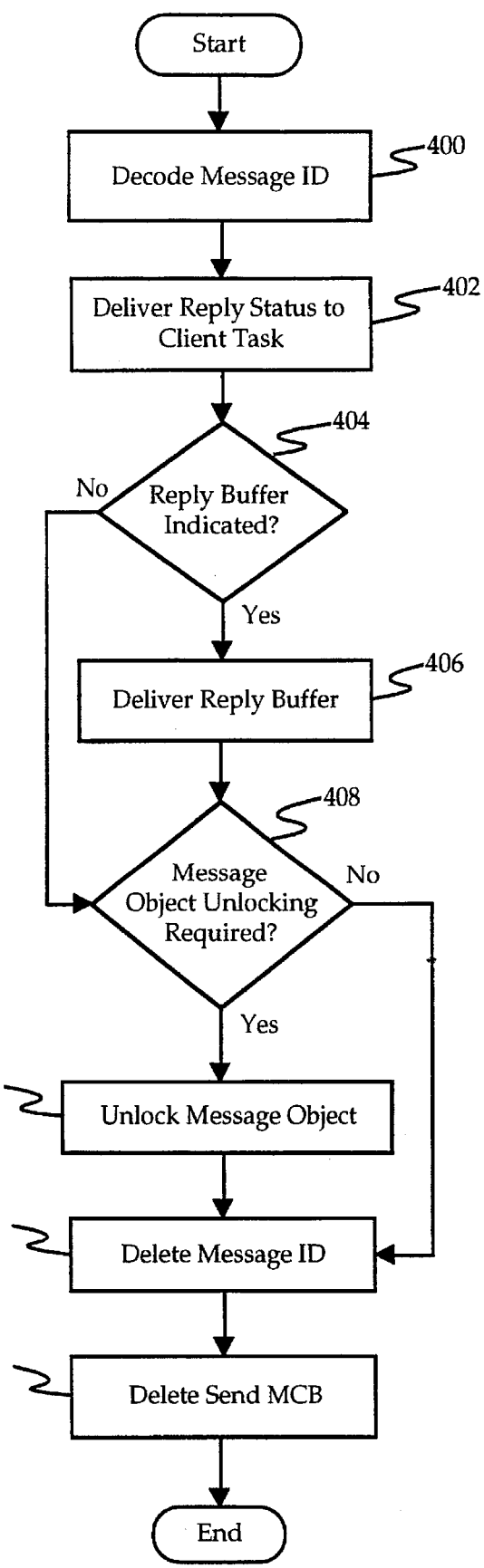
FIG. 14 is a flowchart of a preferred reply method in the present invention.

Referring now to FIG. 14, a flowchart of a preferred reply method is shown. The preferred method begins in step 400 with the message transaction unit 44 decoding the message ID specified in the reply to locate the send MCB associated with the message transaction. Next, in step 402, the message transaction delivers the reply status to the client task 32 indicated in the send MCB. The message transaction unit 44 then determines in step 404 whether a reply buffer was indicated in the reply. If so, the message transaction unit 44 delivers a copy of the contents of the reply buffer to the client task 32 in step 406. After step 406, or after step 404 if no reply buffer is indicated in the reply, the message transaction unit 44 determines in step 408 whether the message object 52 indicated in the send MCB is to be unlocked upon completion of the message transaction. If so, the message transaction unit 44 issues a corresponding unlock request to the locking unit 46 in step 410. After step 410 or after step 408, the message transaction unit 44 deletes the message ID representing the message transaction in step 412. Finally, the message transaction unit 44 deletes the send MCB in step 414, after which the preferred method ends.

Figure 15:
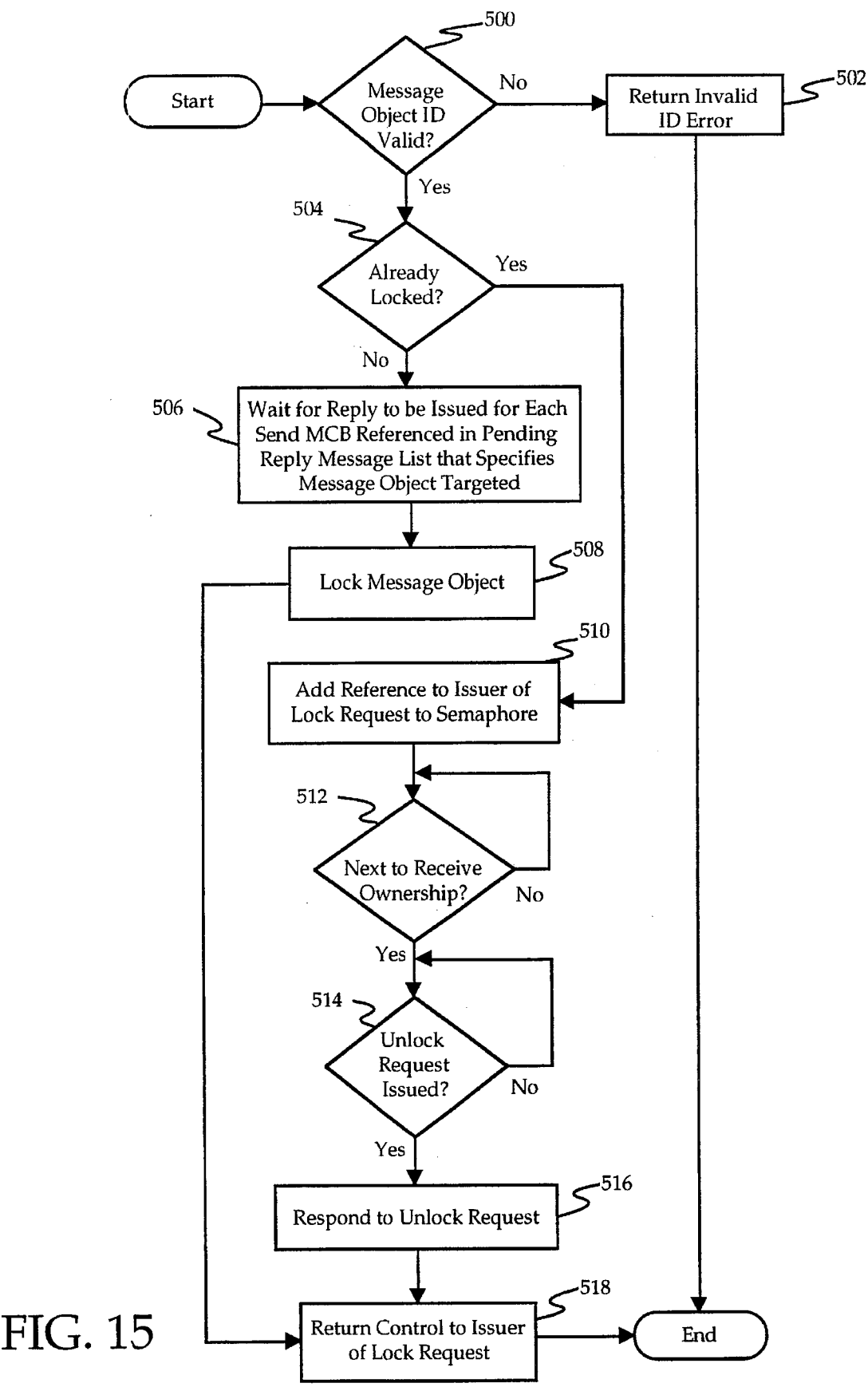
FIG. 15 is a flowchart of a preferred method for responding to a lock request in the present invention.

Referring now to FIG. 15, a flowchart of a preferred method for responding to a lock request is shown. The preferred method begins in step 500 with the locking unit 46 determining whether the message object ID specified in the lock request is valid. If the message object ID is not valid, the locking unit 46 returns an invalid ID error to the issuer of the lock request in step 502, after which the preferred method ends. If the message object ID is valid, the locking unit 46 next determines in step 504 whether the message object 52 targeted by the lock request is already locked. If not, the locking unit 46 waits for a reply to be issued for each send MCB referenced in the associated port object's pending reply message list that specifies the targeted message object 52 in step 506. Preferably, the locking unit 46 performs step 506 by first counting the number of send message control blocks referenced in the pending reply message list that specify, the targeted message object 52, after which the locking unit 46 waits for each of the references counted to be removed from the pending reply message list. After step 506, the locking unit 46 locks the targeted message object 52 by inserting a new lock structure containing the corresponding message object ID into the list of locked message objects. Next, the locking unit 46 returns control to the issuer of the lock request in step 518, after which the preferred method ends.

If the locking unit 46 determines in step 504 that the targeted message object 52 is already locked, the locking unit 46 next adds a reference to the lock request issuer to the corresponding lock structure semaphore in the list of locked message objects in step 510. Preferably, the semaphore provides a FIFO-ordered lock wait list that indicates the client task ID or the server task ID of each task that is waiting to lock the targeted message object 52. After step 510, the locking unit 46 determines in step 512 whether the issuer of the currently-considered lock request is next to receive ownership of the targeted message object's lock. In the preferred method, the locking unit 46 performs step 512 by determining whether the ID of the issuer of the currently-considered lock request is at the front of the lock wait list. If the issuer of the currently-considered lock request is not next to receive ownership of the targeted message object's lock, the preferred method remains at step 512.

Once the issuer of the currently-considered lock request is next to receive ownership of the targeted message object's lock, the locking unit 46 determines whether an unlocking request has been issued in step 514. If no unlocking request has been issued, the preferred method remains at step 514. After an unlocking request has been issued, the locking unit 46 responds to the unlock request by performing unlocking operations in step 516. Following step 516, the preferred method returns control to the issuer of the currently-considered lock request in step 518, after which the preferred method ends.

Figure 16:
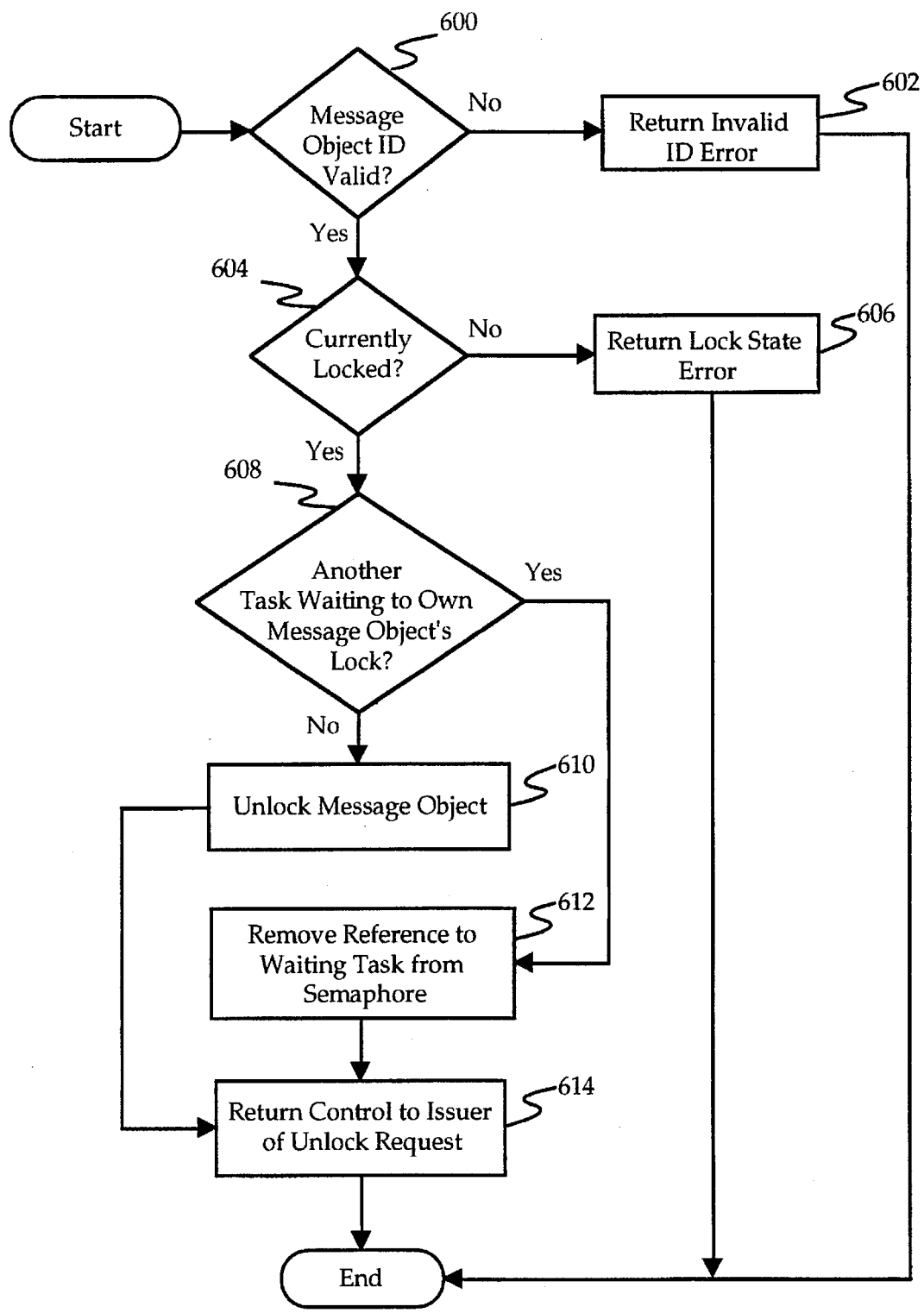
FIG. 16 is a flowchart of a preferred method for responding to an unlock request in the present invention.

Referring now to FIG. 16, a flowchart of a preferred method for responding to an unlock request is shown. The preferred method begins in step 600 with the locking unit 46 determining whether the message object ID of the message object 52 targeted in the unlock request is valid. If the message object ID is not valid, the locking unit 46 returns an invalid ID error to the issuer of the unlocking request in step 602, after which the preferred method ends. If the message object ID is found to be valid in step 600, the locking unit 46 next determines whether the targeted message object 52 is currently locked in step 604. Preferably, the locking unit 46 determines whether the targeted message object 52 is currently locked by inspecting the associated port object's list of locked message objects. If the targeted message object 52 is not currently locked, the locking unit 46 returns a lock state error to the issuer of the unlocking request in step 606, after which the preferred method ends.

If the targeted message object 52 is currently locked, the locking unit 46 next determines whether another task is waiting to assume ownership of the targeted message object's lock in step 608. The locking unit 46 preferably performs step 608 by inspecting the semaphore associated with the targeted message object 52. If no other task is waiting to assume ownership, the locking unit 46 removes the corresponding lock structure from the corresponding port object's list of locked message objects in step 610, thereby unlocking the targeted message object 52. After step 610, the locking unit 46 returns control to the issuer of the unlock request in step 614, after which the preferred method ends. If anther task is waiting to assume ownership of the targeted message object's lock in step 608, the locking unit 46 removes the reference to the client task 32 or server task 34 at the front of the semaphore's lock wait list in step 612. Following step 612, the preferred method proceeds to step 614.

While the present invention has been described with reference to certain preferred embodiments, those skilled in the art will recognize that various modifications may be provided. For example, the message transaction unit 44 could maintain the pending send message list, the pending receive message list, or the pending reply message list without maintaining FIFO order. This and other variations upon and modifications to the preferred embodiments are provided for by the present invention, which is limited only by the following claims.

PATENT

APPENDIX A

"NuKERNEL ERS" March 28, 1994

NuKernel ERS

Preliminary and Confidential

Macintosh System Software
Apple Computer, Inc.

Revision: Alpha 0.22
Edited: March 28, 1994

Direct comments to the NuKernel Team:
    Manager: Bill Bruffey
    Address Space Management: David Harrison
    Agents, IDs, Pools, Teams: Russell Williams
    Messaging, SCSI: Tom Saulpaugh
    Tasking, Events, & Interrupts: Wayne Meretsky Copyright 1992, 1993, 1994 Apple Computer, Inc. Need to Know Confidential About NuKernel ............................................................................................... 2
Kernel Objects And IDs ................................................................................. 3
Naming .......................................................................................................... 5
Execution - Tasking And Interrupts ............................................................... 6
    About Execution ...................................................................................... 6
    About Tasks ............................................................................................. 7
    About Task Scheduling ........................................................................... 8
    About Software Interrupts ....................................................................... 9
    About Privileged Execution .................................................................... 9
    About Synchronization .......................................................................... 10
    About Interrupts .................................................................................... 10
Teams .......................................................................................................... 12
Address Space Management ........................................................................ 13
    About Addressing ................................................................................. 13
    The System 7 Addressing Model .......................................................... 14
    The NuKernel Addressing Model ......................................................... 14
        Multiple Address Spaces ............................................................ 15
        Areas ........................................................................................... 15
        Paging ......................................................................................... 15
        The Kernel Band ........................................................................ 16
        Global Areas .............................................................................. 16
        I/O Coordination ........................................................................ 16
        Addressing And Execution ........................................................ 17
        Inter-Address Space Access ...................................................... 17
Synchronization - Event Groups .................................................................. 18
Messaging .................................................................................................... 19
    Messages ............................................................................................... 19
    Client-Server ......................................................................................... 19
    Transactions .......................................................................................... 19
    Moving Data ......................................................................................... 20
    Ports And Objects ................................................................................. 21
    Sending Messages ................................................................................. 22
    Receiving Messages ............................................................................. 22
    Replying To messages .......................................................................... 23
    Message Types ...................................................................................... 23
    Canceling Asynchronous Message Operations ..................................... 24
    Locking Message Objects .................................................................... 25
    Filtering Object Messages .................................................................... 27
        Filter Names ............................................................................... 28
        Filter Ordering ........................................................................... 28
Kernel Agents .............................................................................................. 30
    Accessing Agents ................................................................................. 30
    Kinds Of Agents ................................................................................... 30
    Installing Agents ................................................................................... 31
    Writing And Linking Agents ................................................................ 31
Timing & Timers ......................................................................................... 32
    Measuring Elapsed Time ...................................................................... 32
    Suspending Execution .......................................................................... 32

|   |   |
|---|---|
| Asynchronous Timers | 32 |
| Realizing the Value | 33 |
|     Phased Releases | 33 |
| About the API | 36 |
|     M68000 Calling Conventions | 36 |
|     PowerPC Calling Conventions | 37 |
|     Stack Space | 37 |
|     Addressing | 37 |
| Some Basic Types | 39 |
|     Miscellaneous Types | 39 |
|     Parameter Block Versions | 39 |
|     Duration | 39 |
|     Time | 40 |
|     Ref | 40 |
|     KernelID | 40 |
|     KernelIterator | 41 |
| Errors | 43 |
|     Generic Errors | 43 |
|     Specific Errors | 43 |
| Team Management | 44 |
|     Creating Teams | 44 |
|     Deleting Teams | 44 |
|     Obtaining The Current Team ID | 45 |
| Task Management | 46 |
|     About Task Hierarchy | 46 |
|     About Task Scheduling | 46 |
|     About Task Parameters and Results | 47 |
|     About Task Termination | 47 |
| The Tasking SERVICEs | 49 |
|     Creating Tasks | 49 |
|         Setting a Task's Static Context | 50 |
|         Starting A Task That Was Created Suspended | 51 |
|     Terminating A Specific Task | 51 |
|     Obtaining The ID Of The Current Task | 51 |
|     Determining The Amount Of Stack Space | 51 |
|     Obtaining Information About A Task | 52 |
|     Setting A Task's Execution Priority | 53 |
|     Iterating Over Task IDs | 53 |
| Exceptions | 55 |
|     About Exception Handlers | 55 |
|     Exceptions Within Exception Handlers | 56 |
|     Exception Handler Declarations | 56 |
|     Installing Exception Handlers | 56 |
| Software Interrupts | 57 |
|     Controlling Software Interrupts | 57 |
|     Querying The Level Of Execution | 57 |
|     Software Interrupt Handlers | 58 |
|     Specifying Software Interrupts | 58 |
|     Sending Software Interrupts | 58 |
|     Deleting A Software Interrupt | 59 |

Hardware Interrupts ............................................................................................. 60
    About Interrupt Handlers .............................................................................. 60
    Designating Interrupt Sources ........................................................................ 60
    Exceptions Caused By Interrupt Handlers ..................................................... 60
    Execution Context Of Interrupt Handlers ...................................................... 61
    Arbitrating for Interrupts ................................................................................ 61
    Parameters To Interrupt Handlers .................................................................. 61
    Installing Interrupt Handlers ......................................................................... 61
    Removing Interrupt Handlers ........................................................................ 62
Secondary Interrupt Handlers ............................................................................. 63
    About Secondary Interrupt Handlers ............................................................ 63
    Exceptions In Secondary Interrupt Handlers ................................................ 63
    Queuing Secondary Interrupt Handlers ........................................................ 64
    Calling Secondary Interrupt Handlers .......................................................... 64
Event Flags ............................................................................................................ 66
    Creating Event Flag Groups .......................................................................... 66
    Deleting Event Flag Groups .......................................................................... 66
    Setting Event Flags ....................................................................................... 66
    Clearing Event Flags ..................................................................................... 67
    Examining The Value Of Event Flags .......................................................... 67
    Waiting For Event Flags To Become Set ...................................................... 67
    Using Event Flags As Semaphores ............................................................... 68
    The Processing Of SetEvents ........................................................................ 68
Event Notification ................................................................................................. 69
    Event Notification ......................................................................................... 69
Timing Services .................................................................................................... 70
    Timer Accuracy ............................................................................................. 70
    About The Time Base ................................................................................... 70
    Timing Latency ............................................................................................. 71
    Timer Overhead ............................................................................................ 71
    Obtaining The Time ..................................................................................... 71
    Setting Timers To Expire In The Past ........................................................... 71
    Synchronous Timers ..................................................................................... 71
        Synchronous Timers With Absolute Times ........................................... 72
        Synchronous Timers With Relative Times ............................................ 72
    Asynchronous Timers ................................................................................... 73
    Interrupt Timers ............................................................................................ 73
    Canceling Asynchronous Or Interrupt Timers ............................................. 74
Address Space Management ................................................................................ 75
    Basic Types ................................................................................................... 75
        Static Logical Addresses ........................................................................ 76
    Address Space Control ................................................................................. 76
        Creating Address Spaces ........................................................................ 77
        Deleting Address Spaces ........................................................................ 77
        Obtaining Information About An Address Space .................................. 77
        Iterating Over All Address Spaces ......................................................... 78
        Logical Page Size .................................................................................... 78
    Area Control .................................................................................................. 79
        Creating Areas ........................................................................................ 79
        Deleting Areas ........................................................................................ 81

Obtaining Information About An Area ................................................. 81
Iterating Over All Areas Within An Address Space ............................ 82
Changing The Access Level Of An Area ............................................... 83
Finding The Area That Contains A Particular Logical Address ............ 83
Using Areas To Access Large Backing Stores ...................................... 84
Memory Control ................................................................................................. 84
Obtaining Information About A Range of Logical Memory ................. 84
Data-To-Code ........................................................................................... 85
Preventing Unnecessary Backing Store Activity ................................... 86
Memory Control In Association With I/O Operations ..................................... 86
Preparing For I/O .................................................................................... 87
Finalizing I/O ........................................................................................... 90
Memory Sharing ................................................................................................. 91
Global Areas ............................................................................................ 91
Client-Server Areas ................................................................................. 91
Mapped Access To Other Address Spaces ............................................ 91
Copying Data Between Address Spaces ............................................... 93
Memory Reservations ........................................................................................ 94
Creating Memory Reservations ............................................................. 94
Deleting Memory Reservations ............................................................. 95
Obtaining Information About A Memory Reservation ......................... 95
Iterating Over All Memory Reservations Within An Address
Space ........................................................................................................ 96
Memory Exceptions ........................................................................................... 97
Backing Object Providers .................................................................................. 98
Registration ............................................................................................. 98
Acquiring A Physical Memory Page From The Memory System .......... 99
Returning A Physical Memory Page To The Memory System ............. 100
Unmapping A Physical Page .................................................................. 100
Backing Object Messages ................................................................................ 100
General Message Format ..................................................................... 101
Area Creation ........................................................................................ 102
Area Deletion ........................................................................................ 103
Request To Relinquish Physical Memory Page ................................... 104
Opening A Scratch Backing Object ...................................................... 105
Closing A Backing Object ..................................................................... 106
Reading From A Backing Object .......................................................... 107
Writing To A Backing Object ................................................................ 108
Page Aging Notification ........................................................................ 109
Pools ............................................................................................................................. 111
Creating Memory Pools .................................................................................. 111
Allocating Memory From Pools ..................................................................... 112
Returning Memory To Pools .......................................................................... 112
Obtaining Information About A Pool ............................................................. 112
Using The Kernel Pools .................................................................................. 113
Growing A Pool ................................................................................................ 114
Messaging ................................................................................................................... 115
Message Port Management ............................................................................ 115
Creating Message Ports ........................................................................ 115
Deleting Message Ports ........................................................................ 116

```
                Changing The Asynchronous Operation Limits Of A Port..................... 116
                Obtaining Information About A Port...................................................... 116
              . Iterating Over Message Ports .............................................................. 118
        Message Object Management ........................................................................ 118
                Creating Message Objects..................................................................... 119
                Deleting Message Objects..................................................................... 119
                Locking Message Objects ..................................................................... 120
                Unlocking Message Objects.................................................................. 120
                Obtaining Information About An Object ............................................. 120
                Changing Information About An Object ............................................. 121
                Iterating Over Objects .......................................................................... 121
        Message Filter Management ........................................................................ 123
                Installing Filters ................................................................................... 123
                Removing Filters................................................................................... 124
                Obtaining Information About A Filter ................................................. 124
                Iterating Over Filters ........................................................................... 125
        About Message Transactions ........................................................................ 125
                Message IDs .......................................................................................... 125
                Message Types ...................................................................................... 126
                Kernel Messages ................................................................................... 126
        Sending Messages .......................................................................................... 127
                Send Options ........................................................................................ 127
                Synchronous Sends ............................................................................... 128
                Asynchronous Sends ............................................................................. 130
        Receiving Messages ....................................................................................... 131
                Receive Options ................................................................................... 132
                Message Control Blocks ....................................................................... 132
                Receiving Messages Synchronously ...................................................... 134
                Receiving Messages Asynchronously .................................................... 135
        Accepting Messages....................................................................................... 135
        Replying To Messages ................................................................................... 138
        Replying To A Message And Receiving Another ........................................... 139
        Forwarding Messages .................................................................................... 139
        Continuing Messages ..................................................................................... 140
        Canceling Message Requests ......................................................................... 140
                Send Cancellation ................................................................................ 141
                Receive Cancellation............................................................................ 142
                Client Initiated Cancellation Messages ............................................... 142
        Client Termination Notification................................................................... 143
                Registering An Object's Client............................................................. 143
                Client Termination Messages.............................................................. 143
Agents .................................................................................................................... 144
        Installing Agents ........................................................................................... 144
        Removing Agents........................................................................................... 146
Registry ................................................................................................................. A
        Setting the Registry Object ID ..................................................................... A
        Getting the Registry Object ID .................................................................... A
Restrictions On Using Kernel Services................................................................. B
        Services That Can Be Called From Task Level ............................................ B
        Services That CANNOT Be Called By Non-Privileged Tasks....................... B
```

Services That Can Be Called From Secondary Interrupt Handlers ................... B
    Services That Can Be Called From Hardware Interrupt Level .......................... D
Compatibility .............................................................................................................. E
    24-Bit Addressing ............................................................................................ E
    Debug Utilities ................................................................................................ E
    Delay ................................................................................................................ E
    The Device Manager ....................................................................................... F
    Exceptions ........................................................................................................ F
    Interrupts ......................................................................................................... G
    Memory Management .................................................................................... G
    Power Management........................................................................................ G
    Privileged Instructions ................................................................................... H
    The SCSI Manager .......................................................................................... I
    Stack Checking ................................................................................................ K
    The Time Manager.......................................................................................... K
    The Vertical Retrace Manager ....................................................................... M
    Virtual Memory............................................................................................... M
Issues .......................................................................................................................... O
    Naming ............................................................................................................. O
    Security ............................................................................................................. O
    Booting ............................................................................................................. O
    Portable Systems ............................................................................................. O
    SCSI ................................................................................................................... O

NuKernel Overview

ABOUT NUKERNEL

NuKernel is a modern micro kernel designed expressly towards the medium- to long-term needs of the Macintosh operating system.

Within the last five years, the micro kernel approach to system implementation has been used successfully throughout the industry to provide a small OS core that is highly portable in its implementation while also presenting a machine independent interface to all other system and application software. This approach allows successful porting to various platforms with minimal impact on the non-kernel portions of the operating system, ToolBox, and application investment.

Micro-kernel design is, by definition, a minimalist approach. If a given feature is not required to be part of the kernel it is implemented elsewhere in the system. File systems, dynamic linked libraries, device drivers and other fairly high level OS components are implemented on top of the kernel's features.

Unlike El Kabong, QuickTime®, Cube-E and others, NuKernel is neither a reference release nor an extension to System 7. Rather, it is a set of enabling technologies that, when integrated into the system, satisfy a number of growing market needs and concerns for both developers and end-users.

NuKernel provides support for modern operating system features including:
- Preemptive multi-tasking
- Synchronization primitives
- Multiple large, sparse address spaces
- Memory mapped files
- Demand paged virtual memory
- Memory protection
- Object based message system
- Timing services The effort required to integrate NuKernel with System 7 in a meaningful way is the subject of several investigations throughout MSAD. Approaches and methods of integrating System 7 and NuKernel are not discussed here per-se. The NuKernel design team did, however, have many of the integration issues in mind while designing and implementing NuKernel. Where appropriate, those issues are discussed if they help to clarify the usefulness of a particular feature.

This document is presented at three levels. First is an overview of the major features and concepts of NuKernel. This is followed by a comprehensive technical presentation of the kernel's interfaces. Finally, there are appendices that cover remaining issues and compatibility.

KERNEL OBJECTS AND IDS

Most interfaces to NuKernel fall in to one of three categories; those that create something, those that manipulate something previously created, and those that delete something. These things are collectively referred to as *kernel objects*.

The kernel objects include:
- Address spaces
- Address areas
- Memory backing objects
- Tasks
- Teams
- Timers
- Event groups
- Software interrupts
- Message Objects
- Message Filters
- Message Ports
- Messages
- Agents This document describes how to create kernel objects of various types. It describes their properties and behaviors. It discusses how to manipulate and destroy kernel objects and describes when they are destroyed as the side effect of some other operation.

You cannot directly manipulate kernel objects because the underlying data structures are not a part of the programmatic interface (API) to the kernel. In certain implementations, the objects themselves may not be directly addressable to software other than the kernel.

When the kernel creates a kernel object it generates an identifier (ID) for that object. IDs are 32-bit values that uniquely designate a particular object. Functions that create an object return the ID of the newly created object. Functions that act upon or destroy an object require that you pass the ID of the kernel object that is to be acted upon or destroyed.

IDs are completely opaque. The techniques used to associate an ID with the underlying object are private to the kernel. IDs cannot be used to access the underlying data structures. The actual memory used to store kernel objects is not necessarily in the same address space as kernel clients.

Presently, marketing input does not require NuKernel to implement any sort of low level OS security. IDs, although opaque, can be forged by simply trying to use every possible combination of 32-bit values in conjunction with a particular kernel function call. However, ignoring clandestine programs, IDs do allow some limited security because only the creator of a kernel object has the ID of the object and the creator can, therefore, limit access to the object by controlling access to the ID.

Because NuKernel does not support persistent objects (objects that survive across system boots), it has no need for persistent IDs. IDs are unique only for the duration of a particular boot. Additionally, IDs are unique only to a given kind of kernel object. That is to say there is a separate flat ID space for each kind of kernel object. If you create two separate kinds of kernel objects (e.g., a task and a message port), it is possible that the same ID value will be returned for each of them. It is the responsibility of the programmer to ensure that the ID of a particular kind of kernel object (e.g., task) is used only in conjunction with operations on that kind of object. If you perform message operations on task IDs there is a slight chance that, because the task ID is also a valid message ID, undesirable side effects may result.

Using an ID after the underlying object has been implicitly or explicitly deleted is erroneous. Typically, the kernel detects such usage and returns an error. However, IDs are subject to reuse when the kernel object to which the ID was originally assigned is reclaimed. Every effort is made to minimize the amount of reuse to assist in the detection of programming errors and to improve system robustness.

The mechanisms for the generation and decoding of IDs that are employed by NuKernel are not available to its clients. Exposing the interface to the ID implementation would compromise the limited security currently available and prevent the addition of additional security in the future.

NAMING

The kernel's consistent use of IDs is motivated by the desire to isolate the underlying data structures for reasons of both robustness and security. One problem with this approach concerns entities that must be well known throughout the system. Historically, solutions to this problem have one of two forms: place the IDs of these entities in well known locations (i.e., low memory) or provide a service whereby the IDs can be found through some naming conventions.

The design of NuKernel has always presumed the inclusion of some sort of name based registry into which these distinguished IDs would be placed at the time they are created. The registry would support operations to create, delete, and lookup entries.

Various issues, including the topology of the name space and the international problems caused by any sort of naming, have caused this issue to be deferred from the functional interface of NuKernel for the present time. This section of this document will be completed when these issues are resolved.

EXECUTION - TASKING AND INTERRUPTS

The tasking and interrupt mechanisms of NuKernel formalize the environments for execution of software by the processor. This section provides an overview of these concepts.

About Execution

Much of the confusion about System 7 programming is a result of ad-hoc rules governing execution environments. In System 7, applications have one set of rules while their VBL tasks, Time Manager tasks, I/O completion routines, etc., all have different rules. A significant amount of the NuKernel design is devoted to the manner in which code gets executed. Considerable effort has been spent on normalizing these environments and ensuring that high-level language software can be used directly with no interfacing glue. This part of the design is largely intangible in that there is little or no implementation part behind the design. Mostly, the design details the environments in which execution happens. These environments include:

- Task Level - This is where nearly all code is executed. Application programmers typically are only concerned with task level execution. The processor is executing at task level whenever it is not processing interrupt level code.

- Hardware Interrupt Level - This is usually of concern only to driver writers and certain internal OS software developers. Hardware interrupt level execution happens as a direct result of a hardware interrupt request.

- Secondary Interrupt Level - This is similar to the deferred task concept in System 7; it is sandwiched between hardware interrupt level and task level. The secondary interrupt queue is filled with requests to execute subroutines that are posted for execution by hardware interrupt handlers that need to perform certain actions but chose to defer the execution of those actions in the interests of minimizing interrupt level execution. Unlike hardware interrupt handlers that can nest, the execution of secondary interrupt handlers is always serialized. For synchronization purposes, task level execution may also post secondary interrupt handlers for execution; these are processed synchronously from the perspective of task level, but are serialized with all other secondary interrupt handlers.

- Kernel Level - The rules and guidelines for certain portions of the kernel are different from those of any exported environment. The kernel's environment will be covered in other internal documents and is not discussed further here.

Each of these execution environments has common attributes. For example, whenever any software is executing at task level it will be using the stack created for that task at the time the task was created. A particular target processor's runtime model is fully supported at all execution levels. For example, on M68000 based implementations, the A5 addressing model (static data and jump table) is completely supported at all levels of execution. This means that when you install an interrupt handler, the kernel records not only the PC of the interrupt handler but also the current value of A5. When your handler is invoked, due to an interrupt, A5 will be updated to that recorded value. Thus, a single consistent runtime model is enjoyed by all software regardless of execution level.

Of course different execution levels have different restrictions. Task level execution may make use of nearly any NuKernel, OS, or ToolBox service. Secondary interrupt and hardware interrupt handlers are allowed only a subset of those services. Furthermore, only task level execution is allowed to access memory that is not physically resident: page faults at either hardware interrupt level or secondary interrupt level are illegal and system fatal.

About Tasks

The primary unit of execution within NuKernel is called a *task*. This term is frequently interchanged with the term *thread* in other operating system and/or kernel architectures.

Tasks are used to virtualize the existence of the physical processor and provide the illusion of many processors, each performing a different kind of work at the same time. In a NuKernel based system, a separate task exists for each application. Additionally, applications are free to create additional tasks if it is desirable to do so. The NuKernel I/O system is also based upon tasks with a separate task potentially used for each device driver.

The processing resources available to a task are called the task's *context*. Context includes general purpose registers (D0, A0, FP0, etc.) and special purpose registers (CCR, FPSR, PC, etc.). Note that task context is processor dependent. A machine with a floating point co-processor has more task context than a machine without; a PowerPC® based machine has different context than a M68000 based machine.

Along with processor context, a task requires the presence of certain other resources. These include the task control block and the task stack(s). The task control block is an internal data structure that describes the task to the kernel; it is only accessible to the kernel and is always referred to by a task ID. In addition each task has at least one stack (stack utilization is described later in this document).

The process of ceasing the execution of one task and beginning the execution of a different task involves saving the context of the former task and restoring the context of the latter task. This combination of a context save and a context restore is called a *context switch*.

The mechanics of context switching is relatively simple. However, the decision regarding when to context switch and whom to context switch, collectively termed *scheduling*, is rather complex. Scheduling logic is a key differentiating factor between different operating system/kernel architectures.

About Task Scheduling

NuKernel employs an event-driven, priority based, preemptive scheduler. Although that sounds like a mouthful, it is really fairly simple.

Event-driven means that scheduling decisions are made coincidentally with certain key events that occur within the system. Interrupts are one example of an event that drives the scheduling process. Others include setting or waiting for a semaphore and sending or waiting for a message. Note that these scheduling events are different from the OS, ToolBox, and EPPC events which drive applications.

Priority based scheduling implies that each task's importance is used when selecting a task for execution. A task's relative importance is specified by its *priority*. NuKernel tasks have a priority between 1 and 31; the larger the value the higher the priority. Every task is given a priority at the time it is created and a task's priority may be increased or decreased at any time.

A task is eligible for execution whenever it is not waiting for some operation to complete. These waits can be either explicit as in the case of synchronous I/O operations or implicit as in the case of page faults. Tasks that are not eligible for execution are said to be *blocked* upon some event. Many tasks may be eligible for execution but only one can be executing at any instance. Under NuKernel, the task with the highest priority that is eligible for execution is guaranteed to be the task that is executing.

Preemptive scheduling, as opposed to cooperative scheduling, conveys that it is the system, not the currently executing task, which controls when scheduling happens. In System 7, the scheduling of applications is purely cooperative and the resultant system requires well-behaved applications if it is to function in a fashion that is pleasing to the user; if an application fails to cooperate it can interfere with the operation of the entire system. A preemptive system alleviates most of the need for cooperation. When the event upon which a task is blocked occurs, that task is again made eligible for execution. If that task has a priority greater than the currently executing task, a context switch is performed and the higher priority task immediately resumes execution from the point at which it was blocked.

Beyond preemptive scheduling, the NuKernel scheduler provides time-slice scheduling of tasks at equal priority. If several tasks are eligible for execution at the highest priority, each is allowed to execute for an internally specified time called a *time-slice*. When its time slice has expired, the currently executing task is context saved and the next task at that same priority is context restored. Each task at this highest priority is given access to the CPU in a *round-robin* fashion. No single task can starve the others unless it is the only task at the highest priority.

Of course, time-slicing never interferes with the otherwise priority based scheduling algorithms; it only has affect when several tasks are all eligible for execution at the same priority and no higher priority tasks are eligible. If a higher priority task becomes eligible for execution it will always get immediate access to the CPU.

NuKernel scheduling does not include specific support for real-time scheduling. You cannot specify that a task is to execute next or that a task should execute at a certain time or that a task should receive a certain percentage of CPU time. The NuKernel scheduler does not contain support for deadline scheduling. Currently, a task's priority is never adjusted implicitly by the kernel as is done by the Windows NT® Boost/Decay scheduling policy.

About Software Interrupts

In addition to the scheduling of multiple tasks on a single processor, the NuKernel scheduler provides a mechanism used primarily for the execution of asynchronous completion routines.

In System 7, an I/O completion routine associated with an asynchronous I/O request is usually run at interrupt level and is completely asynchronous to the execution of the application that started the I/O. Unfortunately, this means that the completion routine runs in a completely different environment than the initiator of the request. The completion routine gets parameters in registers rather than on the stack. The completion routine cannot access static variables or the jump table because A5 is not setup by the system. Finally, the invocation of the completion routine is in no way related to the importance of the requestor. Because the invocation happens at hardware interrupt time, application code gets invoked in a completely uncontrolled fashion.

The *software interrupt* feature of the NuKernel scheduler allows a specified subroutine, with specified parameters, to be executed within the context of a given task, but asynchronously to that task's otherwise normal execution. A NuKernel based system uses software interrupts to implement many hardware interrupt driven features of System 7 such as VBLs, Timers, I/O completion routines, ADB, etc.

Within a given task context, software interrupts are processed on a first-in, first-out basis; they do not nest. When a software interrupt handler finishes and no other software interrupts to that task are pending, the task simply resumes execution at the point prior to the software interruption. A given task may enable and disable its ability to receive software interrupts and interrupts are queued to the task until they can be delivered. Software interrupts do not affect the scheduling policies of a given task with respect to other tasks.

Any task can send a software interrupt to any other task and this mechanism is used throughout the kernel to inform clients of request completion.

About Privileged Execution

Most software in a NuKernel based system is non-privileged. Non-privileged software executes with the CPU in user mode. All applications run in user mode. Some kinds of software (E.g., device drivers) are best executed in supervisor mode and are, therefore, privileged. Privileged software has complete access to the machine with no sacrifice in performance. Execution mode is an attribute of tasks; when a task is created you must specify whether it is to be privileged or non-privileged.

Privileged tasks always execute in supervisor mode. They have a single stack for all execution and local variable storage. Non-privileged tasks may execute in either user mode or supervisor mode. Most all of their execution takes place in user mode. However, because the kernel always runs in supervisor mode, when a user mode task calls the kernel the kernel's execution takes place in supervisor mode. Therefore, non-privileged tasks have two stacks; one for use in user mode and one for use in supervisor mode.

About Synchronization

The preemptive nature of task scheduling requires explicit attention to task synchronization. Synchronization of accesses to shared memory or I/O devices is frequently the most difficult aspect of programming in a multi-tasking environment. NuKernel provides Event Groups to allow the synchronization of tasks around critical sections. Event Groups are similar to semaphores and can be used to implement traditional semaphores. Event groups are discussed later in this overview.

About Interrupts

Interrupt handlers are subroutines that are invoked by the kernel in response to a particular hardware interrupt request. Interrupt handlers execute in supervisor mode and have access to a single interrupt stack. The possibility of nested interrupts can cause several interrupt handlers to each be activated on the interrupt stack simultaneously.

Interrupt handlers are formally registered with the kernel. You do not install them directly into a vector table. Only a single handler may be registered for any given interrupt source and you cannot install a handler without first removing the previously installed handler.

Interrupt sources are designated by a hardware dependent vector number. This number is not related to the processor architecture's vectoring scheme. It is a simple enumeration of the interrupt sources. Currently, a single enumeration is used for all Macintosh systems supported by NuKernel. A second, different, enumeration will probably be created for use with PowerPC based Macintosh systems.

The kernel's interrupt system design philosophy is driven by the desire to minimize interrupt latency and, therefore, maximize responsiveness. This goal will not only enable better real-time response but also allows greater I/O throughput.

On M68000 based Macintosh systems, the priority interrupt system disables a subset of interrupt sources whenever processing any interrupt. This means that the hardware prioritization of devices governs the software prioritization of service. Unfortunately, the desirable prioritization is seldom that which seems appropriate when designing the hardware and frequently changes from application to application.

NuKernel provides a mechanism for performing real-time processing, in response to interruptions, outside of interrupt level. This mechanism is called the *secondary interrupt handler*. Secondary interrupt handlers are similar to deferred tasks in System 7. Secondary interrupt handlers are queued by hardware or *primary* interrupt handlers. When you queue a secondary interrupt handler you specify the handler and a set of parameters with which it is to be invoked. The handler is not called immediately, rather the information is placed into the *secondary interrupt queue*.

In order to synchronize with interrupt level execution yet avoid disabling hardware interruptions, task level software may also insert subroutines into the secondary interrupt handling queue. The queue is always processed first-in, first-out and the execution of the queued handlers is always serialized. Although hardware interrupts remain enabled and hardware interrupt handlers will preempt secondary interrupt handlers, secondary interrupt handlers cannot preempt one another.

The secondary interrupt handler queue is always emptied prior to running any task level software.

When writing device drivers that handle hardware interrupts, it is important to balance the amount of processing done within your primary and secondary interrupt handlers along with that done by your driver's task. You should make every effort to push processing time out of primary interrupt level into secondary interrupt level and, similarly, push secondary interrupt level processing into your driver's task. Doing this allows the system to be tuned so that your driver's processing time is balanced with the needs of other drivers and applications.

TEAMS

During the execution lifetime of any software, that software will allocate and deallocate many kernel objects. When that software goes away, either normally or abnormally, the system should reclaim any of the kernel objects that were not deallocated.

The locus of resource allocation and reclamation within NuKernel is called a *team*. This term is frequently interchanged with the term *process* in other operating system and/or kernel architectures. We choose team over process because the term process is already used and well understood in System 7 Process Manager nomenclature.

A team is composed of tasks and other kernel resources. The execution of those tasks may create and destroy additional kernel resources (including other tasks) during their lifetime. Each of these resources is said to belong to the team. Teams are completely passive. Teams do not execute instructions; tasks execute instructions and tasks belong to a specific team.

Teams also designate a set of memory locations and associated values, collectively termed an *address space* (the details of creating and controlling address spaces are described later). Each team has access to exactly one address space. However, a single address space may be shared by several teams. A given task, belonging to a given team, executes within the address space of that team. The task can only access memory locations associated with its team's address space. In this way, teams provide not only resource reclamation but also memory protection.

The creation of a team returns a team ID. All subsequent operations upon the team require that the team be specified by ID. When the team is reclaimed, all resources that belong to the team are also reclaimed. Teams are reclaimed either explicitly (possibly by their creator) or implicitly when all tasks with the team have terminated. In this fashion, problems of garbage generation are handled in a well controlled and easily understood manner.

Extensions to NuKernel for protection, accounting and auditing mechanisms would apply at the team level. That is, teams could be protected from each other, accounting limits (CPU time, memory size, etc.) could be imposed on individual teams, and audit trails could be maintained for teams.

ADDRESS SPACE MANAGEMENT

Addressing is such a basic concept in computer systems that it is frequently taken entirely for granted. However, as operating system and application software grow in complexity, the manner in which memory is utilized becomes increasingly important.

A significant portion of NuKernel is devoted to implementing a rich set of addressing and memory management mechanisms. These mechanisms provide the foundation for many of the high level features desired in Macintosh systems: memory protection, memory mapped files, and high performance virtual memory.

About Addressing

Because so much about addressing is taken for granted, a brief overview of terminology and concepts follows.

An *address space* is the domain of addresses that can be directly referenced by the processor at any given moment. A *logical address* specifies a location within an address space. Logical addresses are unsigned in nature; the lower bound of a logical address is zero, and the upper bound is the size of the address space minus one. For example, in a 4 GB address space there are $2^{32}$ (4 GB) distinct logical addresses for bytes, ranging from zero to $2^{32} - 1$. The number of bits required to represent logical addresses (the size of the address) is often used to denote the size of the address space. For example, a 4 GB address space can also be called a 32-bit address space.

Some systems provide a single address space that is in effect for all software. Others provide distinct address spaces for different software entities. This so-called *multiple address space* model provides isolation of software and restricted access to hardware (collectively termed *protection*). When combined with the ability to use secondary storage, usually hard disk, as an extension to a computer's physical memory (a technique called *virtual memory*) the resultant memory model offers many advantages. These include the ability to address large amounts of protected memory at a cost that in terms of both performance and dollars is quite low.

There is an association between logical addresses and hardware. When the processor references a given logical address there is an effect on the hardware. Usually, the hardware is RAM, and the effect is to acquire and/or modify data in that RAM. Alternatively, the hardware may be a device that provides some auxiliary function (such as network access) and the effect is to control that device's operation. In simple memory models, the association of logical addresses with hardware is statically determined by how the hardware is wired to the processor. In the relatively more complex models implemented by virtual memory systems, the association is made dynamically. Further, the association can be extended to hardware not directly accessible by the processor, such as secondary storage. Forming an association for a range of logical addresses is called *mapping*. A range that has an association is said to be *mapped*, and one that does not is said to be *not mapped*.

Virtual memory systems require specialized hardware support for mapping. For architectural reasons, this support hardware always forms mappings based on address ranges rather than on a per-address basis. These ranges become the unit of mapping. If those units are fixed-sized, as is the case for both M68000 and PowerPC architectures, they are called *pages* or *logical pages*. To provide address spaces with sizes greater than the amount of RAM, the virtual memory system uses the support hardware to shuffle RAM among different logical pages. Doing this on an as-needed basis is referred to as *demand-paging*.

A reference to a logical address that is mapped to secondary storage, but whose data is not immediately available in RAM, is referred to as a *page fault*. In response to a page fault, the kernel initiates the appropriate transactions to obtain the contents of the logical page and then maps that page into the address space. With the fault repaired, the kernel causes the execution of the faulting software to resume at the point of the fault. The entire effect of the page fault is transparent to the software that caused the fault.

The System 7 Addressing Model

System 7 provides an addressing model that is molded around a single, completely open address space that provides no protection of software or hardware. Originally, this space was shared by the system and one application; now it is shared by the system and multiple applications. The Virtual Memory introduced by System 7 did not change this. For compatibility reasons, Virtual Memory was not allowed to provide separate address spaces or protection, and was forced to settle for extending the existing single address space by about a factor of two. Virtual Memory's purpose is confined to preventing users from having to buy more RAM. Internally, its method for RAM management complicates the model for non-application software and introduces substantial address space overhead.

Logical addresses may be either 24- or 32-bits, on a per-system boot basis. This coexistence complicates both the internal workings of the system software and the implementation of third-party software, but has been considered necessary for backward compatibility.

The simultaneous execution of multiple applications within a single, limited address space means contention for memory among those applications. The Temporary Memory scheme was introduced by MultiFinder (an earlier version of the Process Manager) to provide an outlet for applications that need "emergency" dynamic memory allocations. This is possible because, often, there is more memory where MultiFinder gets it. Temporary Memory is really just a stop-gap measure because applications have no other way to fully utilize the address space.

The NuKernel Addressing Model

The NuKernel addressing model is designed with modern hardware and software architecture in mind.

Multiple Address Spaces

NuKernel provides operations to create and destroy address spaces. The contents of a newly created address space are based upon a template maintained by the kernel. This template causes Slot Space, Frame Buffers, ROM, and the Kernel to be mapped into each address space with appropriate access protection. The remainder of the address space is devoid of content.

Areas

A range of logical address space that is mapped is called an *area*. Areas begin and end on page boundaries. Operations are provided to create and destroy areas. The area creator must specify the size of the area, how the memory content of the area is to be derived and maintained and what access rights are available to various clients.

Areas can be derived from disk files or their initial contents may be unspecified. In either case, the memory management system provides support for clearing the contents of the area on a per-page basis when the page is first accessed. Areas can be maintained in a manner that causes each logical page within the area to always be physically resident or to be paged in and out of physical memory as needed. Area attributes govern the ability of privileged and non-privileged execution to read and/or write the area and for the area to be shared among multiple address spaces.

When an area is created it can be surrounded by *guard pages*. These guard pages are excluded pages in the address space that assist with detecting accesses beyond the area. Guard pages can be used to detect stack overflow in typical cases.

Paging

The sum of the pages in all areas in all address spaces typically exceeds the amount of physical memory. This shortfall is made up by using secondary storage or backing storage to store that data which cannot be physically resident.

The kernel is responsible for the movement of data between backing store and memory. The page replacement policies utilized by NuKernel attempt to minimize the frequency of page faults by retaining the most recently used pages in physical memory and allowing infrequently used pages to migrate to backing storage.

Paging performance is further enhanced because the software involved in resolving page faults is limited to the kernel itself and those drivers involved in accessing the paging device. Therefore, only a small number of logical pages must be held in physical memory allowing a much greater number of physical pages to be used for frequently accessed data.

All I/O performed by the kernel to satisfy page faults is performed through *Backing Objects*. Backing objects are message objects that respond to messages specified by the kernel and perform the appropriate I/O operations. Backing objects isolate the kernel from the mechanics of finding the appropriate data on the storage device. Page faults can therefore be satisfied from nearly any I/O device including networks, hard disks, tape, etc.

The Kernel Band

As described above, each newly created address space contains common areas created from the kernel-maintained template. These areas each appear at the same logical address in every address space and are shared between address spaces. Among these areas is a distinguished set of areas collectively called the *Kernel Band*. This area contains all code and data that is ever accessed by the processor when execution is at hardware interrupt or secondary interrupt level. The kernel band also contains all code and data associated with the kernel and kernel agents (kernel agents are extensions to the kernel and are described later). The kernel band is protected with attributes that allow access only in supervisor mode.

The kernel band is an important concept because it allows the kernel to execute in the addressing context of its clients. This allows the kernel to access client memory in a natural manner without having to create alternate mappings as is done in some operating systems.

Global Areas

Sharing certain resources, especially code, among many clients is an important concept in modern software. NuKernel provides effective, efficient support for sharing code and/or data between clients in separate address spaces.

When creating an area, the globalArea option causes the contents of the area to be addressable in every address space. The contents disappear from all address spaces when the area is destroyed. Global areas have the protection attributes specified at the time of their creation regardless of the address space from which a reference is performed.

Because global areas are visible to all address spaces, space in every address space must be available to create any global area. The kernel sets aside a predetermined amount of space in every address space for use by global areas. Once exhausted, no additional global areas can be created until others have been deleted. The amount of address space set aside for global areas is unspecified.

I/O Coordination

When I/O operations are performed between an external device and memory, several aspects of the memory's contents must be coordinated. Typically, the logical contents must be made physically resident so that they may be accessed at hardware interrupt or secondary interrupt level where page faults are not allowed. Additionally, the coherency of any data and/or instruction caches must be maintained to ensure that the data being moved is not stale and that the effects of the data movement are observed by the processor.

When using DMA hardware to perform the I/O operation, it is also necessary to translate the logical address range into set of physical address ranges. This set of physical address ranges is called a *scatter-gather list*.

NuKernel provides efficient support to prepare a range of addresses for an I/O operation and to cleanup that same range when the operation is finished. Through the use of appropriate parameters, all cache manipulations are performed, the data is made physically resident, and a scatter gather list is generated. The client need not be concerned with the cache topology or any other aspect of the hardware as the kernel provides complete isolation.

Addressing And Execution

The relationship of execution to addressing is at the team level. When a team is created an address space must be designated for that team. Any tasks created within that team will see this logical address space. Several teams may all share a single address space, however, they will not be protected from one another.

Inter-Address Space Access

During normal execution, a given task has access to only the memory that is mapped into its team's address space. It is possible, however, to gain access to the logical memory of other address spaces. The general mechanism for shared memory is to map the same backing store data into the various clients' address spaces. Further routines enable straightforward data copying and cross-address space mapping. An additional facility is provided to arbitrate sharing memory at the same location in each address space.

SYNCHRONIZATION - EVENT GROUPS

*Event groups* are the synchronization mechanism of choice for task level execution. An event group is a set of 32 individual semaphores that may be acted upon individually or in combination.

Event groups are created explicitly. There is no limit upon the number of event groups that may be active in the system at one time. Each event group is referenced by an ID and contains 32 unique *event flags* (semaphores).

Once created, any task can operate on a given event group. Operations on the group manipulate one or more of the group's event flags. The operations are read, set, clear, and wait.

Reading an event group simply returns the value of the 32 event flags. This operation has no side effects upon the task that is reading the flags or any other task.

Clearing event flags is done by specifying an event group and a 32-bit mask. Each flag that is set in the mask is cleared in the event group. This operation does not effect the clearing task or any other tasks in the system.

Setting event flags is done by specifying an event group and a 32-bit mask. Each flag that is set in the mask is set in the event group. This operation may cause other tasks that are waiting upon the event group to become executable.

Waiting for event flags is done by specifying the group, a mask of flags to wait for, and a waiting operation. The mask contains 32 bits and indicates, in conjunction with the operation, a condition for which the calling task wishes to wait. The operation specifies whether the condition is satisfied by *any* of the events in the mask becoming set or only when *all* of the events in the mask become set. Additionally, the operation indicates if the events, specified by the mask, are to be cleared when the condition is satisfied.

Wait operations can include a time limit. This limits the time the calling task is willing to wait for the specified condition to occur. If the time limit is exceeded, the task is made executable even though the condition has not been satisfied.

Event groups may be used to implement many styles of semaphores. The ability to wait upon a combination of events may be used to prevent many deadlock situations that occur when only binary semaphores are available.

MESSAGING

As system software has become more modular, the flow of information between modules has become critical to both robustness and performance. The inclusion of NuKernel features such as preemption and multiple address spaces add significantly to the inter-module communications dilemma. Problems of synchronization must be overcome and the ability to communicate across address space boundaries is required. The NuKernel message system provides this support.

Messages

A message is the unit of information interchange. The kernel is not concerned with the contents of the message; it does not examine or interpret the contents of the messages. Rather, it assists in movement of the message from the originator to the recipient, providing the ability to control and prioritize the flow of information. The message system is suited for the exchange of control and status information as well as for the exchange of data.

Client-Server

The NuKernel message system presumes a *client-server* model of communications. In this model, a service is provided by a server. Software that wishes to make use of a service is called a client of the service. The message system simply allows data to be transported from a client to a server and for the server to notify the client of the results.

Transactions

When a client makes a request of a server it does so by *sending* a message. The server must actively participate by attempting to *receive* messages from its clients. When a server has received a message it performs the implied work and then notifies the client by *replying* to the message. This combination of send, receive, and reply is termed a *message transaction*. The kernel provides all transaction support including synchronization and address space mapping operations that may be required. The following figure illustrates these concepts:

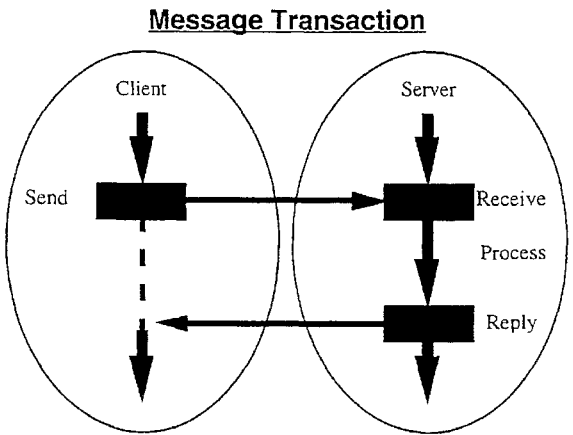

Message Transaction

Moving Data

The data that flows between the client and server usually conforms to semantics specified by the server. The data may flow from client to server and/or server to client. All data is described to the kernel through the use of address/byte count pairs. The data flowing from client to server is called the message *contents*. The data which flows from server back to the client is called the *reply data*.

Thecontents and reply data address/byte count pairs are conveyed to the server at the time the server receives the message. If the message is sent across address space boundaries, the kernel may, at the client's discretion, either map the message contents directly into the server's address space or copy the contents into the server's address space. The kernel may also choose to map the reply data buffer into the server's address space.

No data is ever buffered in the kernel. Therefore, the client must not attempt to modify or deallocate either the message contents or reply data buffers until the transaction is complete.

Some messages, specified as part of the send operation, include addresses of other data that is associated with the message. This is common when reading data. Read requests typically indicate the source of the data (E.g., a file offset) and specify the address of a client buffer into which the server should place the data. These other regions of memory, associated with the message by both client and server, are unknown to the kernel. It is the responsibility of the server to ensure that these additional regions of memory are addressable by the server. Kernel services are available to perform the mapping or copy operations needed to implement such services.

Ports And Objects

Message objects are abstract entities that represent various resources to message system clients. These objects may represent devices, files, windows, etc. Clients send messages to *objects*.

Message ports are abstract entities that represent a service. These ports may represent a device driver, a file system, or a window manager. Servers receive messages from *ports*.

Objects are said to belong to a port. A message sent to an object is received from that object's port. The client is usually unaware of the port associated with a particular object.

The duality of objects and ports allows efficient support in situations where a number of separate entities, all conceptually different from the client's perspective, are served by a single server and with identical actions.

Ports and Objects

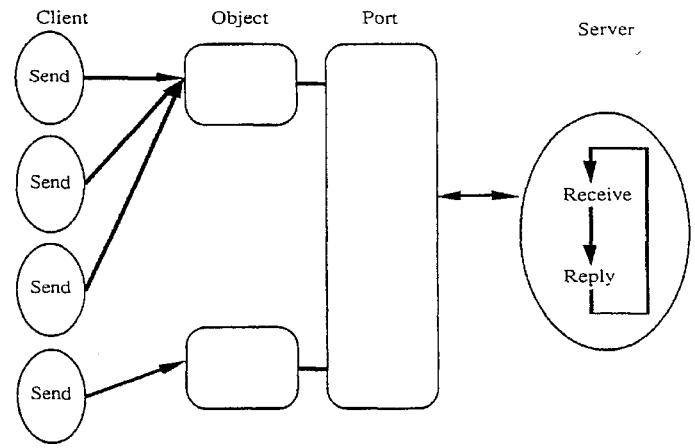

Ports and objects are created by the message system on behalf of a server. The creation of an object requires designating a port from which messages sent to the object will be received. Therefore, ports must be created prior to their objects. Once created, an object may be migrated from one port to another. This allows servers to control port utilization for whatever reasons they choose. For example, objects that are highly utilized can be migrated to a port that is served by several tasks within the server.

Objects contain a single 32-bit value, specified at creation time, that is used by the server to identify the object. This value, called a *refcon*, allows the server to associate any per-object information with the message. When receiving messages from a port, the server is provided with not only the message but also the refcon from the object to which the message was sent. The server can use these refcons for any purpose; they are not examined or interpreted by the kernel. Typically, the refcon is the address of a control block for the object; a file object's refcon could be the address of the file control block for that file. The refcon of an object may be examined and changed at any time.

Ports and objects are referenced by IDs.

Sending Messages

The process of sending a message can be either synchronous or asynchronous. Synchronous sends block the client until the server has acted upon and replied to the message. Asynchronous sends allow the client to continue execution while the server is processing the message.

Synchronous send operations return a status value that indicates the success or failure of the message transaction. Errors may be returned by either the kernel or by the server.

When a message is sent synchronously, the sender may specify a time limit. The value of the time limit controls how long the sender is willing to wait for the transaction to complete. Should the time limit be exceeded, the message is canceled by the kernel. Cancellation is described below.

Asynchronous send operations yield two separate status results. The send status is returned at the time the asynchronous send call returns from the kernel back to the sender. The reply status is delivered asynchronously to the client's execution when the server has finished processing the request.

The client may receive notification that the server has finished processing an asynchronously sent message in any or all of three different ways. First, the client can specify a memory location that is to be updated with the 32-bit message reply status. Second, the client can specify an event flag group and set of flags within that group that should be set. Finally, the client can specify a software interrupt that should be delivered.

Receiving Messages

Servers receive messages from ports. Servers can receive messages in three separate ways: synchronous receives, asynchronous receives, and acceptance functions. All three methods of receiving messages requires that the server explicitly designate a port from which the messages are to be taken.

Synchronous receives block the execution of the server task until a message arrives at the port. The server may limit the length of time that the server remains blocked waiting for messages. If the time limit is exceeded, the server again begins to execute and is informed of the time-out.

Asynchronous receive requests inform the kernel that the server wishes to be notified when the next message arrives at the port. Asynchronous receives do not cause the server to block. The server can request that the notification be delivered in any or all of three ways: memory location update, event flag update, or software interrupt delivery. These are the same as the notifications described above for asynchronous sends.

The third method of receiving messages is by registering an acceptance function. Acceptance functions are simply subroutines that are called in-line in the context of the sender at the time the message is sent. Acceptance functions are always called in supervisor mode and, therefore, not all servers can register them. They are intended for use by kernel agents.

Numerous synchronous and asynchronous receives may be made of a single port but only one acceptance function may be registered. When a message is sent it is given to only one receiver. The process of matching a sent message to a receiver is governed by message type. These message types are described below.

Regardless of the manner in which a message is received (synchronously, asynchronously, or acceptance), the server is provided with more than just the message. The refcon of the object to which the message was sent and an ID for the message, are also returned to the server. The refcon allows the server to associate information about the object with the message. The message ID is used by the server to notify the client that processing of the message is complete.

Replying To messages

When a server has finished processing a message it must inform its client. The process of notifying the client is called a *reply*. When a server replies to a message it provides both the message ID it got when it received the message and a 32-bit result or message status. The kernel does not interpret the status in any way. Rather, the status is interpreted by the client in a way defined by the interface between client and server.

Servers must reply to all messages they receive. Synchronous senders remain blocked until the server replies. Servers can implement time limits upon their transactions to prevent the system from becoming deadlocked.

Message Types

All message send and receive operations require that you specify a message type. Message types are 32-bit values. The message system does not interpret the type directly but uses it to match senders with receivers.

A message type is associated with each message at the time the message is sent.; the type must be specified with all send operations. When a server makes a receive request, it also specifies a message type. The two message types are used to match sent messages with receivers.

Receivers are matched with messages by ANDing the message type specified by the sender with the message type specified by the receiver. If the result of the AND is non-zero, the message is given to that receiver. When scanning the receivers looking for compatible message types, acceptance functions are checked first. If no acceptance function matches the message type, then the synchronous and asynchronous receivers are checked. If no receiver can be matched with the message then the message remains in the port until a receive operation is performed that matches the message type.

A receive operation that specifies a message type value of 0xFFFFFFFF receives all messages, regardless of type. This includes messages sent with a type value of zero.

One bit of the message type is used by NuKernel for certain special system-generated messages. Messages of this type are defined by Apple and your server should support them. Clients should, however, refrain from doing so. The kernel message type and the pre-defined messages are covered in the detailed description of the message services.

Canceling Asynchronous Message Operations

When using asynchronous services, it is occasionally desirable to withdraw operations that have been started but have not yet completed. The act of withdrawing these requests is termed *canceling* the outstanding request.

The asynchronous send and receive services each return a transaction ID that remains valid until the request becomes satisfied. These IDs may be used, when appropriate, to cancel the pending send or receive.

Cancellation of asynchronous send requests is handled in one of two ways. If the send has not yet been matched with a receive request from the server, the send is simply withdrawn and the server is not affected in any way. If, on the other hand, the server has already received the request then the server is sent a special message (designated by use of the kernel message type) that indicates that the client wants the request canceled. This special message includes the ID of the transaction so that the server knows which request is being canceled.

Canceling asynchronous receive requests simply removes the pending receive from the message port. These operations have no side affects.

Locking Message Objects

At times, a server may want to prevent messages from being sent through an object and arriving at the object's port. This is especially true when the server needs to manipulate an object synchronously to the use of that object by clients or multiple server tasks. For this purpose, the kernel provides services that lock and unlock message objects.

Ports, Objects, and Locks

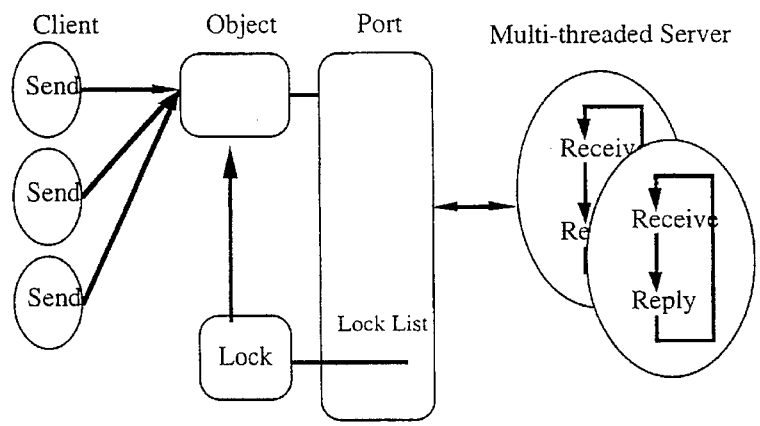

Message objects are said to be in one of three states: Unlocked, Locking, and Locked. A message object is Unlocked until an attempt is made to lock the object by using the LockObject service. At this time the message object enters the Locking state. While in the Locking state, message sent to an object do not reach that object's port. Instead they pile up at the object and are not eligible to be received by the port's server. Messages that had been sent through the object to the port but had not yet been received by the port's server are removed from the port and placed back at the object. These messages are similarly not eligible to be received by the port's server. Messages that had been sent through the object to the port and had been received by the port's server prior to the lock request are not affected in any way.

An option to the LockObject service allows the caller to specify that the Locking to Locked transition should occur with either zero or one received but unreplied messages. The caller of the LockObject service is blocked until this condition is reached. Once the condition is reached, the task is unblocked and the message object is said to be Locked.

In the Locked state, newly sent messages continue to pile up at the message object. They are not eligible to be received. The task that made the LockObject service request should perform whatever actions are appropriate and then either unlock or delete the Locked object. Until the object is unlocked or deleted, clients of the object could be waiting for messages to be processed through the object.

While in the Locking or Locked state, cancel requests for messages sent to the object are processed normally. This means that the cancel requests may be placed in the object's port.

Once a Locked object is Unlocked, any messages that had been sent while the object was Locked will pass through the object and arrive at the object's port and may be received. These messages will contain the Refcon value from the object at the time the UnlockObject service is called.

Only one client can lock a given object at any time. If a request is made to lock an object that is either Locking or Locked, that request is blocked until the object becomes Unlocked.

Filtering Object Messages

A message *filter* is a pair of objects used to screen another object's messages. An object with filters is called a *target*. The set of installed filters on a target is called the *filter chain*..

Installed filters are designated by ID. The ID may be used to later remove the filter, or retrieve its installation information.

Once installed, filters are completely transparent to both clients and servers. However, servers have complete control over which of its objects may become a target.

If the target is deleted, all installed filters are automatically removed. If the target is locked, the lock applies to the entire filter chain. A target object's filter chain may be examined using an iterator service.

There is no limit to the number of filters or the number of objects which can be filtered. Filter objects can share a single port; however, a filter can only screen a single object's messages.

Message Filters

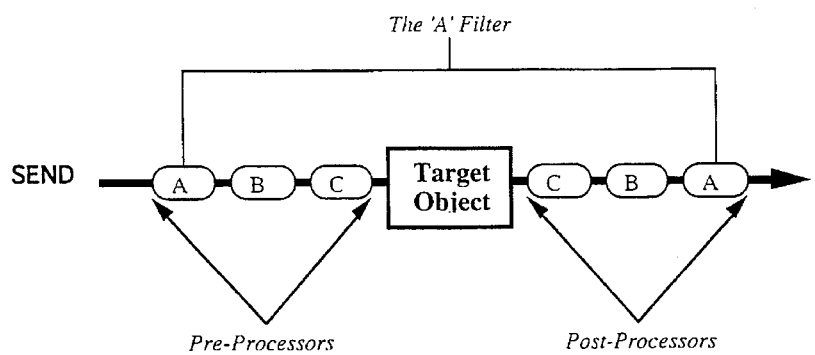

Two kinds of message objects may be used in a filter. The first kind of object screens messages *before* they arrive at the target and is called a *pre-processor*. The second kind of object screens messages as they *leave* the target and is called a *post-processor*. A filter may be composed of just a pre-processor, or just a post-processor.

A single message is passed through each filter and target object. The message is given first to the pre-processors, then the target, and finally the post-processors.

The SendMessage, SendMessageAsync, and ForwardMessage services invoke an object's pre-processors. The ReplyToMessage and CancelAsyncMessage services invoke its post-processors. The ContinueMessage service may be used by any object to pass the message to the next object in the chain.

The ForwardMessage service stacks the remaining post-processors in the current filter chain before routing the message to a new target. Once the new target and its filters have completing processing, the stack of remaining post-processors is activated.

A pre-processor object may issue a ReplyToMessage to jump over the target and begin post-processing, starting with the its *twin* . Any per-message state generated by a pre-processor object can be cleaned up by its twin.

The format of an object's message contents must be published if content modification filters are to be accommodated. Message content version numbers are recommended so that filters may track format evolution.

Filter Names

All filters are named. Filters attached to the same target must have a unique name. Filters installed on separate targets may share names.

A filter name consists of a *service* and *signature* type. The service type identifies the functionality provided by the filter. The signature type identifies the provider of the service.

Filter Name

| Service Type | Signature Type |
|---|---|

For example, an Apple supplied encryption filter might be named: 'ENCR','APPL'. The registration and allocation of signature types is to be managed by Apple Computer Inc.

Filter Ordering

Some filters require a guaranteed order of invocation with respect to other filters. Ordering requirements are specified as a set of two rules. The first rule names a filter *before* and the second rule names a filter *after* the desired location in the filter chain. The combination of a before and after rule determines the placement within the filter chain.

Filter Ordering

| Before Rule | Service Type | Signature Type |
|---|---|---|

| After Rule | Service Type | Signature Type |
|---|---|---|

Strict adjacency requirements are also supported by specifying an installation option. A filter may specify that it must be placed *directly* after or *directly* before another filter.

Two forms of wildcard name matching is supported. The first form *always* matches any service or signature type. The second form *never* matches a service of signature type. Using wildcard ordering rules allows a filter to be placed after all filters (last) or before all filters (first); for example.

A filter will not install properly if its ordering rules cannot be met, nor if the new filter will violate an existing filter's rules.

KERNEL AGENTS

NuKernel agents allow customized extensions to the kernel. Agents are just one way in which the system can be extended but they are the only method of extending the kernel. Only through use of agents can privileged code be added to the system. This section discusses the properties of agents as well as how to write them and how to install them.

Agents were designed with the following goals:

- Provide a way for user mode code to install additional functionality into NuKernel and remove it when no longer needed.

- Put agents in the kernel band to protect them from applications.

- Share agent code among multiple agent installations.

- Do common case initialization so most agents are simpler to write

- Minimize code changes to port to PowerPC. The kernel trap calls and arguments are the same across platforms. Agent static data is automatically initialized so that no explicit call to _DataInit is needed on the 68K.

- Make simple cases simple and complex cases possible.

Accessing Agents

The agent system is message based. To communicate with an agent you send a message to an object that is served by that agent. Using the message system means that you can make synchronous or asynchronous requests to any agent. The agent's implementation will govern whether a particular request is truly asynchronous.

Kinds Of Agents

Agents can have their own task. This task is created at the time the agent is installed. These agents execute asynchronously to and in parallel with their clients. These agents are termed *server agents* because they fit directly into the client-server model. Server agents use the message Receive/Reply primitives to serve a message port to which clients send messages.

Agents that have no need for asynchronous access or parallelism can instead execute in the task context of their client. These agents are called *in-line* agents. In-line agents have no dedicated task context, but are instead called directly in the task context of their client. In-line agents use the message system Accept/Reply primitives to serve a message port to which clients send messages. The message send becomes, in effect, a subroutine call.

Agents are ideal for use as loadable device drivers, network protocol layers, etc. Because they can be task based, agents can have execution priorities. A high priority agent can respond in real time to device requests. A low priority agent can use otherwise-idle CPU cycles to anticipate the user without slowing system performance.

Installing Agents

Installation of agents involves allocating storage within the kernel band for the agent's code and static data. If the agent is task based, the installation includes creating a task for the agent. Installation also creates a message system port and object for use in communication with the agent. All of these actions are performed by the kernel; you don't have to worry about them when writing an agent or when using an agent.

Writing And Linking Agents

Agents can be written in a high level language or assembly language. The kernel only requires that the main entry point conform to the 'C' calling conventions. The main entry point must be callable as either a task entry point (in the case of a server style agent) or an acceptor function (in the case of an in-line style agent). Agents must be linked with an Apple supplied object module that assists with the initialization of the agent.

TIMING & TIMERS

The timing services enable the precise measurement of elapsed time. The timer services of the kernel allow tasks to suspend their execution until a given time or to cause a specified subroutine to be called at a given time.

Measuring Elapsed Time

Measurement of elapsed time is done by simply obtaining the time before and after the event to be timed. The difference of these two values indicates the elapsed time of the event. Time, in this context refers to a 64-bit count, maintained by the kernel, with each unit equal to one microsecond. The count is set to zero by the kernel during its initialization at system startup time. Using this technique, elapsed times as short as one microsecond or as long as 584,542 years can be measured.

Suspending Execution

A given task may chose to suspend its execution until a specified time in the future. This process is termed *delaying*. When this time is reached, the task again becomes eligible for execution. The task will not actually execute until it is scheduled for execution according to its priority and the priorities of the other eligible tasks. In any case, the task will never execute prior to the time specified.

When a task uses a delay service, it may specify the time at which it should resume execution in either relative or absolute terms. Relative times allow the programmer to indicate that execution should resume, for example, five minute from now. Absolute times allow the programmer to indicate that execution should resume at, for example, three o'clock. Absolute times are a bit more cumbersome to use but allow periodic timing with no long term drift.

Asynchronous Timers

Asynchronous timing services cause notification at a given time. The notification can be delivered in any or all of three ways. First, a specified memory location can be altered. Second, one or more event flags within a single event flag group can be set. Third, a specified subroutine can be run as a software interrupt.

Once set, an asynchronous timer remains in effect until it is either canceled or expires. Cancellation may be done at any time prior to expiration, using the ID of the timer returned by the kernel when the timer was set. Expiration of the timer causes the notification, described above, to be delivered.

Asynchronous timers always specify absolute expiration times.

REALIZING THE VALUE

The NuKernel design team believes the features described above can be utilized by the Macintosh System Software to build a software platform that is richer and more robust than System 7 while providing real value to both software developers and end users.

Launching an application involves creating an address space, a team and a task. The address space contains three areas: code, heap, and stack. The code area is write protected and mapped directly to the application file's code; no pre-loading of code is done at launch time, rather the application faults itself in during execution. The heap and stack areas are backed by swapping space. They are spread apart within the logical address space to allow expansion as needed.

The application is free to allocate kernel resources during its execution including, if desirable, other tasks. Application scheduling involves only the scheduling of tasks and is performed completely by the kernel. Key OS and ToolBox routines may adjust the priority of the current task to ensure system responsiveness.

Running in separate address spaces, applications can not interfere with each other or with the kernel. Gross application errors cannot corrupt the system or other applications. Upon termination, either normal or abnormal, the team and all associated kernel resources would be reclaimed.

Device management functions are largely subsumed by the message system. Device drivers are kernel agents that service message ports. The Device Manager is used to resolve device names and return message object IDs. I/O requests are made by sending messages to the device objects. Synchronous and asynchronous I/O is provided by the message system without additional consideration on behalf of the device driver writer. Drivers no longer have any constraints regarding order of request processing or limitations regarding the number of concurrent requests processed at a time. Of course, writing drivers that handle multiple concurrent requests requires additional code.

Other than the kernel and certain agents, no locked memory is required in the system. A much larger percentage of real memory is available to applications enabling better end-user perceived performance.

Phased Releases

The current ToolBox and the application programming model itself are not capable of supporting separate address spaces, preemption, and true asynchrony. Furthermore, there are no immediate plans in MSSW to take advantage of some of the key features of NuKernel. Consequently, the system described above will be reached through a series of releases.

The first version of a NuKernel based system will have a memory model much like that presented by System 7.0 Virtual Memory. The use of tasking will be limited. There will be a single 32-bit address space shared by all software. Only a subset of the programming interface will be used. One consolation is that all privileged code, including the kernel, privileged agents, secondary interrupt routines and interrupt service routines will be protected from direct access by any non-privileged software. This release can be integrated into the existing system with minimal change to the system, but may not be suitable for all CPUs (e.g., portables do not work well with active paging). Little real value will be provided but laying this groundwork is important. Application developers can begin to use tasking in a limited fashion while preparing for the inevitability of concurrency and true preemption.

Subsequent releases will include larger subsets of the programming interface, including support for multiple address spaces and file mapping. These releases will require greater degrees of NuKernel/OS/ToolBox integration, and might result in incompatibilities with today's software. System and application developers should be forewarned.

Using NuKernel

ABOUT THE API

The programmatic interface (API) to the kernel is completely formalized through function calls. There are no exported data structures or low-memory locations.

Unlike other Macintosh system software, the NuKernel API cannot be patched with GetTrapAddress/SetTrapAddress. In fact, calling the kernel does not involve the use of an A-Line instruction. Rather, the kernel is called by executing a TRAP #C instruction. This departure from other system interfaces, combined with memory protection, allows the kernel to be protected from the application domain.

All NuKernel interfaces are provided in 'C' header files. The calling conventions required by the kernel are those of the 'C' runtime model used by Apple on the machine in question.

Most kernel functions return an error indication. You should check these error conditions. NuKernel makes every effort to validate all parameters to each function call prior to beginning any additional work.

Many kernel functions have "out" parameters. These are addresses that you pass to the function. The contents of the address are modified by the kernel call. Passing null as the address of an out parameter tells the kernel you don't want that value returned. These null values do not generate an error. When a call to the kernel fails, the kernel clears any output parameters of that particular function.

M68000 Calling Conventions

On M68000 Macintosh systems, NuKernel conforms to the MPW 'C' parameter and register conventions.

Registers D0, D1, D2, A0, and A1 are volatile and destroyed by any call to the kernel. Registers D3-D7, A2-A7 are non-volatile and, therefore, preserved across any call to the kernel. When calling the kernel, parameters are pushed right to left. Scalar parameters are right justified in a single 32-bit stack word. A 32-bit selector value is loaded into register D0; this value determines which kernel function is desired. Finally a TRAP #C instruction (opcode 4E4C hex) is executed.

Upon return from the kernel, register D0 contains a function result. This is typically an OSStatus value and indicates which, if any errors, occurred during the processing of the kernel call. At the time of return, the parameters passed to the kernel are still on the calling stack. They must be deallocated by the caller.

Some kernel functions use the contents of register A5 as an implicit parameter. In general, whenever you supply the address of any code (a procedure parameter) to a kernel service, the kernel retains not only that address but also the value which was in A5 at the time the kernel was called. When the service is ultimately invoked, that retained A5 value will be placed into register A5. This treatment of A5 allows complete use of the M68000 Macintosh runtime model, including jump table and static data, from applications and their asynchronous components.

Be aware that the kernel's treatment of the Macintosh runtime model does not include consistency with respect to the ToolBox and OS usage of low memory and other machine/system state. Those aspects of Macintosh execution are still controlled by the OS and ToolBox as in System 7.

PowerPC Calling Conventions

On PowerPC Macintosh systems, calls to NuKernel are performed using the shared library mechanisms of the PowerPC runtime model. All conventions used by the kernel are described in the PowerPC Runtime ERS.

> Note: Once control has transferred into the shared library, execution is considered to be within the kernel. The shared library code, although within the address space of the client, is considered to part of the kernel's implementation. None of this software, including the trapping mechanisms, are documented. They are subject to change at any time.

Stack Space

Most clients of the kernel execute in user mode. These clients need not be concerned about the amount of stack space used by the kernel because the kernel's execution never takes place on user mode stacks. Each user mode task has a separate kernel stack that is used by the kernel when the kernel is called.

Privileged software, (i.e, drivers, agents, etc.) always execute in supervisor mode. These clients of the kernel must be aware that the kernel does use stack space. The amount of stack storage is not currently documented. The kernel's design goals are to require less than 4K bytes of stack storage.

Certain design decisions can lead to kernel stack space exhaustion. In-line style agents or other software that makes use of the message system's acceptance function features, all run on the supervisor mode stack of their client. It is the responsibility of these entities to perform stack checks prior to using stack storage. Stack checking may be performed using the NuKernel CurrentStackSpace service.

NuKernel performs stack checks on behalf of its clients at certain times. If stack overflow is detected, a stack overflow exception is generated. Exceptions are described in the Exceptions section of this document.

Addressing

Within NuKernel, all addressing is 32-bit clean. Don't even think about using the upper or lower bits of an address as flags or tags.

MMU hardware and the contents of the underlying page tables are owned entirely by the kernel. They must not be manipulated directly. The kernel provides support for many of the operations that have historically required direct manipulation of the MMU. See the Memory Management section for descriptions of these services

SOME BASIC TYPES

This section introduces some basic types which are used throughout the API. They are presented here, in no particular order, to avoid confusion later.

Miscellaneous Types

The following type declarations are self-explanatory:

```
typedef  unsigned long  ByteCount;
typedef  long           ItemCount;
typedef  long           OSStatus;
typedef  unsigned long  OptionBits;
```

The symbol *nilOptions* is provided for clarity.

```
enum
{
    nilOptions    = 0
};
```

Parameter Block Versions

Any kernel service that operates upon a parameter block requires that you pass a parameter block version in the service's parameter list. This version number allows the kernel to provide backwards compatibility. Each parameter block type definition has an associated, named, version constant. As long as you always use the named constant your source is guaranteed to be correct and your object code will be supported.

```
typedef  unsigned long  PBVersion;
```

Duration

Many interfaces allow the caller to specify a time relative to the present. These values are of the type *Duration*.

```
typedef  long  Duration;
```

Values of type duration are 32-bits. They are interpreted in a manner consistent with the System 7 Time Manager as follows: positive values are in units of milliseconds, negative values are in units of microseconds. Therefore the value 1500 is 1,500 milliseconds or 1.5 seconds while the value -8000 is 8,000 microseconds or 8 milliseconds. Notice that many values can be expressed in two different ways. For example, 1000 and -1000000 both represent exactly one second. When two representations have equal value they may be used interchangeable, neither is preferred or inherently more accurate.

Values of type duration may express times as short as one microsecond or as long as 24 days. However, two values of duration are reserved and have special meaning. The value zero, (0) specifies exactly the present time. A value of 0x7FFFFFFF, the largest positive 32-bit value, specifies an infinite time from the present.

The following definitions are provided for use with values of type Duration:

```
enum
{
    durationMicrosecond  = -1,
    durationMillisecond  = 1,
    durationSecond       = 1000,
    durationMinute       = 1000 * 60,
    durationHour         = 1000 * 60 * 60,
    durationDay          = 1000 * 60 * 60 * 24,
    durationForever      = 0x7FFFFFFF,
    durationImmediate    = 0,
};
```

Time

A second data type is used to specify absolute times. These values are of the type *AbsoluteTime*. They are in units of microseconds and are 64-bits in width.

```
typedef struct AbsoluteTime
{
    unsigned long  high;
    unsigned long  low;
} AbsoluteTime;
```

Ref

Many interfaces to the kernel require that you pass the address of something as a parameter. In fact, these parameters need not be addresses. These parameters are of type *Ref*.

```
typedef  void *   Ref;
```

Because they are derived from the predefined type void, Refs need not be coerced when passed into the kernel.

KernelID

IDs are used whenever you create, manipulate, or destroy a kernel object. All IDs are derived from the type *KernelID*.

```
typedef  Ref    KernelID;
```

You should used the derived types whenever possible as they will make your code more readable.

The value *invalidID* is reserved to mean "no ID."

```
enum
{
    invalidID     = 0
};
```

KernelIterator

The Kernel provides several iteration functions that allow the client to obtain the IDs of all kernel objects within a specified domain. For example, you can iterate over all the tasks within a given team or all of the message objects associated with a given message port.

Each of these functions acts upon a KernelIterator provided to the kernel by the client.

```
typedef struct KernelIterator
{
    ItemCount   totalItems;
    ItemCount   validItems;
    IteratorKey IterationKey;
    KernelID    theItems [1];
} Kernel Iterator;
```

Each iteration function provided by the kernel requires at least three parameters. These are theCount, skipCount, and theItems. The first two are integer values that tell the kernel how many items you want information about and how many items to ignore prior to those items. The third parameter is the address of a KernelIterator that is to be filled in with the information. Additional parameters may be needed to describe the iteration domain.

Imagine that you wanted to iterate over all of the tasks in a particular team and that you want to get the IDs of those tasks in groups of ten at a time. Your first call to the kernel would specify 10 and zero for theCount and skipCount respectively. The second call would specify 10 and 10 indicating that you want information about the second group of 10 tasks. The third would specify 10 and 20, etc.

The kernel fills in the KernelIterator you provide with information. In the same example as above, you would provide a KernelIterator that had enough room for 10 task IDs. That iterator would be filled in as follows:

- totalItems indicates the total number of tasks in the team.

- validItems indicates the number of task IDs that were returned by this call to the kernel. This is always between zero and the value of theCount parameter.

- IterationKey is a value that changes whenever the domain through which you are iterating has changed. In this example, if any tasks have been created or terminated within the specified team, the key value will change.

- theItems contains the IDs of the items described by skipCount and validItems.

ERRORS

As with all system interfaces, you should check the OSStatus code returned by each kernel service you call. OSStatus values are 32-bits wide. However, to remain compatible with System 7, all values currently returned by the kernel are in the range of negative 16-bit values.

```
typedef long OSSTATUS;
```

Error codes returned by the kernel fall into one of two categories. Some error codes are generic in nature and could be returned by nearly any kernel service; these include paramErr or memErr. Other error codes are specific in nature and may only be returned by a specific service.

Whenever possible, the kernel returns an error rather than causing an exception. However, in certain cases, erroneous calls to the kernel may result in exceptions. For example, if you pass an invalid address you may receive either paramErr or incur an access violation exception.

Generic Errors

Described here are the error codes that could be returned by any kernel service. The meanings given apply only to the meaning of that error code when it is returned by a kernel service. Other system software may use that same error code to indicate some other error.

- paramErr indicates that a parameter value is out of range or that a combination of parameters passed to the service are illegal.

- memFulErr indicates that the kernel could not allocate the resources necessary to satisfy the service request.

- kernelPrivilegeErr indicates that the caller of a kernel service is non-privileged and cannot use the service in question.

Specific Errors

- TBD

TEAM MANAGEMENT

Teams are created through explicit requests to the kernel. Teams are deleted through either explicit request or implicitly, when, during task termination processing, it is determined that the team has no additional tasks.

Tasks that belong to a specific team can allocate various kernel resources including messages, event flag groups, message ports, message objects, other tasks, etc. If, at the time the team is being deleted, these resources have not been deallocated they will be reclaimed as part of the team deletion process.

Teams, when newly created, contain no tasks. Because automatic team deletion is a side effect of task termination, teams that never have tasks are never automatically deleted. If you create a team you must be careful that you either create a task within that team or explicitly delete the team.

Deleting a team causes the termination of all tasks within that team and reclamation of all resources that belong to the team. The team may or may not be deleted by the time the DeleteTeam service returns to the caller. A Team is never deleted until all its member tasks have terminated. Task termination is discussed in the Task Management chapter of this document.

If, as the result of deleting a team, that team's address space is no longer accessible from any team, the address space is also deleted. Address space deletion is discussed in the Address Space Management chapter of this document.

Creating Teams

```
OSStatus CreateTeam (AddressSpaceID theAddressSpace,
                     TeamID *        theTeam);
``` theAddressSpace is the ID of the address space that is to be addressable by the team's tasks. A value of currentAddressSpaceID specifies that the team is to be created in the current team's address space.

theTeam is updated with the ID of the newly created team.

Deleting Teams

```
OSStatus DeleteTeam (TeamID   theTeam,
                     Boolean  immediate);
``` theTeam is the ID of the team to be deleted.

immediate is used in conjunction with the TerminateTask service when terminating the team's tasks. See a description of TerminateTask in the Task Management chapter of this document.

Obtaining The Current Team ID

You can obtain the ID of the current team whenever executing at task level.

```
TeamID   CurrentTeamID (void);
```

TASK MANAGEMENT

About Task Hierarchy

Tasks are found within conceptually enclosing environments called Teams. All tasks within a team share the same address space. Additionally, tasks live within a parent-child hierarchy. Tasks with no parent, called orphans, live at a root of a task tree within their team. By default, a task is the child of the task which caused its creation; a task's creator is termed its parent. During task creation you can specify that the created task should be an orphan rather than a child.

The TaskRelationship type is used in conjunction with certain operations that affect more than one task.

```
typedef unsigned long TaskRelationship;
enum
{
    taskOnly         = 0,
    taskAndChildren  = 1,
    taskFamily       = 2,
    taskTeam         = 3
};
```

- TaskOnly means just that.

- TaskAndChildren means that the operation should be applied to the task and each of its children and each of their children, etc.

- TaskFamily requires that the kernel must first find the ancestor of the specified task which is an orphan and then perform the operation as if that orphan had been specified and the relationship had been TaskAndChildren.

- TaskTeam causes the operation to be applied to each task within the team of the specified task.

Tasking operations which can affect more than one task through use of a TaskRelationship do not operate on those tasks in any particular order.

About Task Scheduling

Tasks are scheduled for execution based only upon their CPU priority. No consideration is given to the team to which a task belongs or to the priorities of the task's parent or children. The initial priority of a task is specified by its creator but may be subsequently changed.

Tasks are scheduled with either a run-til-block or time-slice policy depending upon their priority. Tasks with priorities of 24 or greater are run-til-block while tasks with priorities less than 24 are time-sliced. Time slicing is only used to provide CPU time to tasks of equal priority. The execution of a higher priority task is never preempted to allow a lower priority task to execute.

About Task Parameters and Results

When you create a task you specify a subroutine which is to be executed within the context of the newly created task. That routine should conform to the TaskProc declaration.

```
typedef OSStatus (*TaskProc) (Ref p);
```

The parameter P is specified at the time of creation and may be used for any purpose. The result returned by the task at the time it terminates will be returned to its creator as specified by the TerminationEvent parameter to the CreateTask call. Should the task terminate abnormally, for example due to an unhandled exception, the system will provide a suitable result value.

About Task Termination

Task execution can be terminated either implicitly, when the main routine of the task returns, or explicitly through use of the TerminateTask service. In either case, the effect of termination is similar. First, the task is marked as "terminating"; this causes operations on the task to behave as if the task were in fact terminated. The termination process requires execution of kernel code on behalf of the task which is being terminated. Therefore, the termination does not proceed until the task becomes eligible for execution and does in fact execute.

> Note: Tasks of low priority can take awhile to terminate under normal conditions. Tasks which are deadlocked will not terminate until they are released from the deadlocking condition or the Immediate termination option is used (see below).

The Immediate parameter to TerminateTask will force the to-be-terminated task to become eligible for execution immediately.

> Note: This may have side effects on other system code that is maintaining data structures (i.e. open files) on behalf of the task being terminated.

Once the task begins to execute, a check is made to see if it has children. If children are present no further actions are taken until they terminate. This allows children which have references to their parent's resources (such as pointers into the stack) to continue normal execution. Finally, when no children remain, any remaining resources including all stacks and control blocks internal to the kernel are reclaimed.

Finally, the task's TerminationEvent, if any, is delivered. The termination event is specified by the task's creator and is the only kernel-provided method of learning of a task's termination. See the EventNotification section for a complete description of how this notification is delivered.

If, as the result of task termination, that task's team contains no tasks, the team is implicitly deleted. Team deletion is discussed in the Team Management chapter of this document.

THE TASKING SERVICES

Tasks are always referenced by their IDs.

```
typedef KernelID  TaskID;
```

Creating Tasks

```
typedef unsigned long   TaskOptions;
typedef OSType          TaskName;
enum
{
    taskIsPrivileged    = 0x00800000,
    taskIsOrphan        = 0x00400000,
    taskCreateSuspended = 0x00200000,
    taskPriorityMask    = 0x000000FF
};
OSStatus CreateTask (TaskName            theName,
                     TeamID              theTeam,
                     TaskProc            theEntryPoint,
                     Ref                 theParameter,
                     Ref                 stackBase,
                     ByteCount           stackSize,
                     EventNotification * terminationEvent,
                     TaskOptions         theOptions,
                     TaskID *            theTask);
```

CreateTask creates a task subject to the parameters provided.

theName specifies a four character name that may be useful for subsequent debugging. The name is stored by the kernel in association with the task. This name is not used by the kernel for any purpose and can be obtained using GetTaskInformation.

theTeam specifies an existing Team to which the task will belong. A value of zero causes the task to be created within the Team of the caller. Tasks created in Teams other than that of the caller will be orphans within the specified Team.

theEntryPoint is the address of a subroutine and will become the initial PC of the task created. This address must be within the address space of the team specified by theTeam.

theParameter is a single 32-bit parameter which will be passed to EntryPoint when the task begins its execution. The value and interpretation of Parameter are of no concern to the kernel and may be used to convey information between the creator and created task.

stackBase is the optional address of memory to be used for the task's user mode stack. This parameter is ignored for privileged tasks. If the value is Null, a stack will be created for the task by the kernel. If non-null, the caller guarantees that StackSize bytes are available to the task at this address and will remain available for use by the task until it has terminated.

stackSize indicates the size of the stack desired for the task. Although the kernel may detect certain stack overflow situations, it is the responsibility of the task to ensure it does not run out of stack space. Kernel detected stack overflows are converted into stack overflow exceptions. If the task is non-privileged the stackSize parameter specifies the size of the user-mode stack. If the task is privileged it indicates the number of bytes of kernel stack which should be allocated for the task; this value is in addition to the kernel's requirements on this stack.

terminationEvent allows the creator to be notified upon the termination of the task being created. If a value of Null is passed, no notification is given of its termination. If an Event is specified it is delivered at the time the task finishes its termination. The status value provided with the notification is either that from the return statement of the main routine of a task, or that value supplied in a TerminateTask call that caused the task to terminate.

theOptions is used to control various aspects of task creation.

- The taskIsPrivileged bit, when set, causes the task to be privileged and to execute in supervisor mode.

- taskIsOrphan, when set, specifies that the task being created should not be a child of the creator, but rather should live at the root of the team to which it belongs; this affects the termination relationship between the creator and createe.

- taskCreateSuspended indicates that the task should not begin its execution upon creation. Such tasks commence execution when the StartTask kernel service is called.

- The TOPriority field indicates the initial CPU priority of the task and is used by the scheduler. CPU priorities range from 1 to 31 with larger numbers signifying higher scheduling priority. Specifying a priority of zero causes the created task to inherit the priority of its creator.

theTask is updated with the ID of the task thus created.

Setting a Task's Static Context

A task's static context is inherited from its parent. For 68K systems this is the initial A5 value which will be active during the task's execution. For POWER/PC systems this is the initial TOC which will be active during the execution of the task.

Starting A Task That Was Created Suspended

The StartTask service is used to cause tasks which were created with the taskCreateSuspended option to begin executing.

Using this service in conjunction with a task which has either already been started or was not created with the CreateSuspended options will result in an error being returned.

```
OSStatus StartTask (TaskID theTask);
```

Terminating A Specific Task

```
OSStatus TerminateTask (TaskID           theTask,
                        TaskRelationship theScope,
                        Boolean          immediate,
                        OSStatus         theResult);
```

TerminateTask forces one or more tasks to terminate. See the About Task Termination section.

theTask is the task ID of the task to be terminated.

theScope indicates what other tasks should also be terminated.

immediate governs whether the task termination takes place immediately. See the About Task Termination section.

the Result will be used to in conjunction with the TerminationEvent of tasks which, prior to the TerminateTask call, have not yet begun to terminate.

Obtaining The ID Of The Current Task

```
OSStatus CurrentTaskID (TaskID * theTask);
```

When called from a task TheTask is updated with the ID of the current task. If called from either an interrupt handler or secondary interrupt handler, an error is returned.

Determining The Amount Of Stack Space

```
ByteCount CurrentStackSpace (void);
```

CurrentStackSpace returns the amount of stack space available on the current stack. It may be called from any execution level.

Obtaining Information About A Task

You can obtain information about a given task by using the GetTaskInformation service. The information returned reflects the state of the task at the time the GetTaskInformation service is made. Due to the preemptive nature of the kernel, this information may be obsolete even before the GetTaskInformation service returns to its caller. The information that is available is returned in the form of a TaskInformation record with the following type definition:

```
typedef OSType SchedulerState;

typedef struct TaskInformation
{
    TaskName        theName;
    TeamID          theTeam;
    TaskPriority    thePriority;
    SchedulerState  taskState;
    SchedulerState  swiState;
    Boolean         isTerminating;
    ItemCount       softwareInterrupts;
    Ref             programCounter;
    AbsoluteTime    creationTime;
    AbsoluteTime    cpuTime;
} TaskInformation;
```

The various fields of the TaskInformation record have the following meanings:

- theName indicates the four character name provided when the task was created

- theTeam indicates the ID of the team to which the task belongs

- thePriority indicates the CPU priority of the task

- taskState is a four character abbreviation of the scheduler state of the task

- swiState is a four character abbreviation of the scheduler state of software interrupts for the task

- isTerminating, if true, indicates that the task is in the process of terminating

- softwareInterrupts indicates the number of software interrupts that have been processed by the task. It does not indicate how many software interrupts are pending execution by that task.

- programCounter is the logical address at which the task will execute next. This value may be used for histogramming. If the task is executing in the kernel, this value will be the logical address of the instruction following the kernel call. If a value of zero is returned, this indicates that the kernel could not obtain the programCounter of the task.

- creationTime indicates the time at which the task was created. Subtracting this value from the value returned by the UpTime service will yield the amount of wall-clock time that has passed since the task was created.

- cpuTime indicates the amount of CPU time that the task has consumed. This includes all task execution time in the kernel as well as that consumed by processing software interrupts. Also included is the time spent processing hardware and secondary interrupts incurred while the task was running.

```
enum
{
    taskInformationVersion = 0
};

OSStatus GetTaskInformation   (TaskID            theTask,
                               PBVersion         theVersion,
                               TaskInformation * theInfo);
```

GetTaskInformation returns information about the specified task to the caller.

theTask specifies the ID of the task about which information is to be returned.

theVersion specifies the version number of TaskInformation to be returned. This provides backwards compatibility. taskInformationVersion is the version of TaskInformation defined in the current interface.

theInfo is the address of a TaskInformation record. This record is filled in by the kernel with information about the designated task.

Setting A Task's Execution Priority

You can alter the priority of a task. Note that the priority of a task does not change until it is next made eligible to execute. This means, for example, that a lower priority task which is waiting for an event flag will not have its priority in the wait queue adjusted until after it has acquired the flag or the wait operation has timed out. The effect of SetPriority is immediately seen by GetTaskInformation even though the task's priority change may not as yet have taken effect.

```
OSStatus SetPriority    (TaskID   theTask,
                         long     theNewPriority);
```

Iterating Over Task IDs

```
OSStatus GetTasksInTeam   (TeamID            theTeam,
                           ItemCount         theCount,
                           ItemCount         skipCount,
                           KernelIterator *  theTasks);
```

GetTasksInTeam allows the caller to find the IDs of all tasks within a particular Team. For additional information about using iteration functions see the Some Basic Types section of this document.

theTeam indicates the team of interest. A value of zero indicates the callers team.

theCount indicates the maximum number of task IDs that should be returned. This indicates the size of the KernelIterator that is passed.

skipCount indicates the number of tasks within theTeam that should be ignored.

theTasks is a KernelIterator that is filled in with the IDs of the tasks within theTeam.

EXCEPTIONS

Exceptions are synchronous alterations in program flow which arise from exceptional conditions caused by normal instruction execution. Certain exceptions, such as page faults, are handled entirely by the kernel. Other exceptions, such as illegal instruction, are presented to the client for resolution; the handling of these exceptions by the client is covered here.

Different processor families support different exception models and cause exceptions under varying circumstances. For example, the M68000 family of processors generate exceptions when any of the integer divide instructions attempts to divide by zero whereas the POWER/PC family of processors indicates this condition by setting the OV bit in the condition code register.

Exceptions are, therefore, processor specific in nature. The kinds of exceptions, the information made available at the time of the exception, and the ability to resume execution after an exception are all processor specific. NuKernel attempts to isolate these processor dependencies by presenting a processor independent model for the registration and invocation of exception handlers. However, exception handlers that want to correct, rather than simply report, an exception must, by definition, be processor dependent.

Exceptions can arise during processing at any execution level: task, secondary interrupt, or hardware interrupt. This section covers only exceptions that occur during task level execution. See the Interrupt Handling and Secondary Interrupt Handlers sections for details about handling exceptions during non-task level. execution.

About Exception Handlers

NuKernel provides support for catching, resolving, and proceeding from exceptions, subject to the specifics of the processor. Exception handling is performed within the context of the task which incurred the exception. Exception handlers are installed for a given task and do not inherently affect other tasks in any way.

Exception Handlers are not nested. Each task can have only a single handler. Installing an exception handler overrides any previous exception handler installed for that task. When a handler is installed, the previous handler for that task is returned. This allows a routine to temporarily install an exception handler and then restore the previous handler.

At the time of an exception, the exception handler is provided with information about the nature of the exception and the state of the processor at the time of the exception. The type ExceptionInformation is machine dependent and therefore described in the NuKernel implementation guide for each product.

Exception handlers may resume execution either by returning to the kernel or by transferring control using longjmp or similar mechansims. If a handler chooses to return to the kernel, it must supply a result indicating what action should be taken by the kernel. A value of noErr indicates that the exception has been cured and that execution should resume based upon the information. Any other value indicates that the exception handler could not cure the exception and that the task should be terminated.

Exceptions Within Exception Handlers

Exception handlers are invoked on the stack of the task which caused the exception and synchronously to that task's execution. Exception handlers which incur exceptions simply cause exception processing to begin recursively. Exception handlers may be preempted by software interrupts which may in turn cause exceptions leading to the invocation of an exception handler yet again.

Exception Handler Declarations

All exception handlers should conform to the ExceptionHandler declaration.

```
typedef OSStatus (*ExceptionHandler)
                    (ExceptionInformation * theException);
```

Installing Exception Handlers

No implicit exception handling is provided by NuKernel. Tasks which incur exceptions and have not installed an exception handler are terminated as a result of the exception.

```
ExceptionHandler InstallExceptionHandler (ExceptionHandler theHandler);
``` theHandler specifies a subroutine which becomes the active exception handler for the task. Specifying Null indicates that no exception handler should be installed. The previously active handler is returned as the function result.

SOFTWARE INTERRUPTS

The software interrupt mechanism allows a given subroutine to be run asynchronously to a given task's normal flow of control yet still be within the context of that task. Software interrupts are said to be *sent* to a task by either a different task, a secondary interrupt handler, or in some cases, the task itself. Once sent, software interrupts are said to be *pending* until actually *activated*.

The execution of a software interrupt happens on the same stack and with the same addressing context which the task typically executes. Software interrupts can be handled by a task even when its normal execution has been suspended. At completion of a software interrupt, the interrupted task will resume execution at the point of interruption. If the task was not executable prior to delivery of the software interrupt it will, again, become blocked upon whatever event it was awaiting prior to the interruption.

Software interrupts are serialized. If a task is executing a software interrupt routine and is sent a second software interrupt, it will finish processing the first interruption prior to beginning the processing associated with the second. This is true even if the first software interrupt handler performs some blocking operation such as waiting for an event flag or initiating a synchronous I/O operation.

The presence of a pending software interrupt or the invocation of a software interrupt handler does not inherently change the execution priority of the associated task or affect the scheduling of that task or any other tasks in any way.

Controlling Software Interrupts

Software interruptions to given task may be enabled and disabled programmatically by using EnableSoftwareInterrupts and DisableSoftwareInterrupts. These operations nest automatically so every call to DisableSoftwareInterrupts must be matched with a call to EnableSoftwareInterrupts. Calls to either of these services have no effect when the task is processing a software interrupt.

```
void DisableSoftwareInterrupts    (void);
void EnableSoftwareInterrupts     (void);
```

Querying The Level Of Execution

A task may check whether it is executing at software interrupt level through use of the InSoftwareInterruptHandler service.

```
Boolean InSoftwareInterruptHandler (void);
```

Software Interrupt Handlers

A software interrupt handling routine must conform to the prototype definition SoftwareInterruptHandler. The meanings of the parameters, P1 and P2, are specified by the creator and sender of the particular software interrupt, respectively.

```
typedef void (*SoftwareInterruptHandler) (Ref    p1,
                                          Ref    p2);
```

Specifying Software Interrupts

Software interrupts are specified by a software interrupt ID. These IDs are created by using the CreateSoftwareInterrupt service. Software interrupt IDs are instances of potential interrupt requests. The ID of a software interrupt is valid until it is released by either the invocation of the software interrupt handler, which occurs sometime after a call to SendSoftwareInterrupt, or deleting it using DeleteSoftwareInterrupt.

```
typedef KernelID SoftwareInterruptID;

OSStatus CreateSoftwareInterrupt
                (SoftwareInterruptHandler    theHandler,
                 TaskID                      forTask,
                 Ref                         theParameter,
                 Boolean                     persistent,
                 SoftwareInterruptID *       theSoftwareInterrupt);
``` theHandler is the routine address of the software interrupt handling routine. The address of this routine must be within the Team of the caller.

forTask is the ID of a task which will receive the software interrupt. If Null, the current task will receive the interrupt. This task must be within the same task Team as the calling task.

theParameter is the value that will be passed to TheHandler as its p1 parameter.

persistent indicates whether the ID of the software interrupt should be consumed when the software interrupt is activated or should persist until explicitly deleted by DeleteSoftwareInterrupt. These persistent software interrupts may each be sent multiple times but only once per activation; that is, the software interrupt must run before it can be re-sent. See Sending Software Interrupts, below.

theSoftwareInterrupt is updated with the ID of the created software interrupt.

Sending Software Interrupts

You can send a software interrupt to a specific task by calling SendSoftwareInterrupt. The software interrupt will be activated when the designated task becomes eligible for execution with software interrupts enabled and all software interrupts previously sent to the designated task have been processed. Attempts to send a single software interrupt more than once result in errors. Persistent software interrupts can only be re-sent after they have been activated.

```
OSStatus SendSoftwareInterrupt
            (SoftwareInterruptID   theSoftwareInterrupt,
             Ref                   theParameter);
```

TheSoftwareInterrupt specifies a software interrupt previously created by CreateSoftwareInterrupt.

theParameter is the value that will be passed to TheHandler as its p2 parameter.

Deleting A Software Interrupt

You can delete a software interrupt by calling DeleteSoftwareInterrupt. The software interrupt and its ID will be consumed immediately. Software interrupts that are pending can be deleted; they will never be activated.

```
OSStatus DeleteSoftwareInterrupt
            (SoftwareInterruptID   theSoftwareInterrupt);
```

HARDWARE INTERRUPTS

About Interrupt Handlers

NuKernel provides support for installing and removing hardware interrupt handlers. Interrupt handlers are invoked by the kernel in response to an external interrupt. Interrupt handlers execute on a special stack dedicated to interrupt processing. Interrupt handlers must operate within the restrictions of the interrupt execution model by not causing page faults, and not using certain system services.

To ensure maximum system performance interrupt handlers should perform only those actions which must be synchronized with the external device that caused the interrupt and then queue a secondary interrupt handler to perform the remainder of the work associated with the interruption.

NuKernel services pertaining to hardware interrupts are only available to privileged clients.

Designating Interrupt Sources

Interrupts are designated by use of a 32-bit vector number. This is not related in any way to the interrupt vector defined by the processor. These vector numbers will be assigned by Apple and described in the NuKernel implementation guide for each product.

```
typedef  unsigned long  InterruptVector;
```

Exceptions Caused By Interrupt Handlers

Whenever you register an interrupt handler, you can specify an exception handler. That exception handler will gain control should an exception be incurred by the interrupt handler. Additional exception handlers can not be installed nor can any exception handlers be removed during processing at hardware interrupt level.

Should an exception arise, control will be transferred to the exception handler as described in the Exceptions chapter of this document. The handler can affect a transfer of control using longjmp or similar mechanisms or return to the kernel. If the handler returns to the kernel indicating that the exception was handled, control will resume according to the exception state information provided by the handler. If, however, the handler returns to the kernel with status indicating that the exception was not handled, the system will crash.

When registering an interrupt handler, you may request that no exception handler be installed during the activation of that interrupt handler. Specifying a value of Null causes no exception handler to be installed. Should an exception arise with no exception handler installed, the system will crash.

Execution Context Of Interrupt Handlers

Interrupt handlers are invoked with the appropriate addressing context (A5 or TOC) as determined at the time they are installed. However, all data and code references generated during the processing of a hardware interrupt must be to physically resident pages. Access to non-resident pages cause access error exceptions.

Arbitrating for Interrupts

Installation of interrupt handlers can only succeed if no other handler is currently installed. Removal of interrupt handlers requires that you know the handler which is active (see Removing Interrupt Handlers). In short, it is not possible to usurp control of an interrupt which is already under control of some other handler. The policies for such arbitration are beyond the scope of the kernel.

Parameters To Interrupt Handlers

When an interrupt handler is invoked it is supplied with two 32-bit parameters. The first indicates the source of the interruption, and is the same vector number supplied at installation time. This allows a single interrupt handler installed for multiple sources to determine the source of the current invocation. The second parameter to an interrupt handler is the reference constant value, parameter p1, that was passed to InstallInterruptHandler.

```
typedef void (*InterruptHandler)(InterruptVector    theVector, Ref p1);
```

Installing Interrupt Handlers

```
OSStatus InstallInterruptHandler
                    (InterruptVector    theVector,
                     InterruptHandler   theHandler,
                     ExceptionHandler   theExceptionHandler,
                     Ref                p1);
```

If no other handler is currently installed, the specified handler is installed for the logical interrupt source. If a handler is already installed for this vector, no actions are taken and an error is returned.

theVector specifies the interrupt vector source for which the handler is to be invoked.

theHandler is the subroutine that is the interrupt handler. It will be invoked with a single parameter whose value is theVector.

theExceptionHandler is an exception handler which will be invoked if an exception occurs during an invocation of theHandler. If Null, exceptions during an invocation of the handler will be system fatal.

p1 is a refcon that is passed to the interrupt handler whenever it is invoked.

Removing Interrupt Handlers

```
OSStatus RemoveInterruptHandler (InterruptVector   theVector,
                                 InterruptHandler  theHandler);
```

If the handler specified is currently installed at the vector specified, it is removed along with any associated exception handler. If theHandler is not the active handler for this vector, no action is taken and an error is returned. Once a handler is removed, interruptions from the source will cause fatal system errors unless a new handler has been installed.

theVector specifies the interrupt vector source of the handler to be removed.

theHandler specifies the handler which must be currently active for the operation to succeed.

SECONDARY INTERRUPT HANDLERS

Secondary interrupt handlers are the primary synchronization mechanism used within the kernel and its extensions. Secondary interrupt handlers must conform to the interrupt execution environment rules which include: no page faults, severe restrictions on using system services, etc. Secondary interrupt handlers run on a special stack reserved just for this purpose. They may not make any presumptions about the task context in which they execute.

The special characteristic of secondary interrupt handlers which makes them useful is that the kernel guarantees that at most one handler is active at any time. This means that if you have a data structure which requires complex update operations and each of the operations utilize secondary interrupt handlers to access or update the data structure, then all access to the data structure will be atomic even though hardware interrupts are enabled during the access.

> Note: Although interrupts are taken during the execution of secondary interrupt handlers, no task level execution takes place. This can lead to severely degraded system responsiveness. Use the Secondary Interrupt facility only when necessary.

NuKernel services pertaining to secondary interrupts are available only to privileged clients.

About Secondary Interrupt Handlers

Secondary interrupt handlers are simple procedures. They have between zero and four parameters and return no result. A separate prototype describes each of the five flavors of secondary interrupt handler.

```
typedef OSStatus  (*SecondaryInterruptHandlerProc0)   (void);
typedef OSStatus  (*SecondaryInterruptHandlerProc1)   (Ref   p1);
typedef OSStatus  (*SecondaryInterruptHandlerProc2)   (Ref   p1,
                                                       Ref   p2);
typedef OSStatus  (*SecondaryInterruptHandlerProc3)   (Ref   p1,
                                                       Ref   p2,
                                                       Ref   p3);
typedef OSStatus  (*SecondaryInterruptHandlerProc4)   (Ref   p1,
                                                       Ref   p2,
                                                       Ref   p3,
                                                       Ref   p4);
```

Exceptions In Secondary Interrupt Handlers

Whenever you queue or call a secondary interrupt handler, you can specify an exception handler. That exception handler will gain control should an exceptions be incurred by the secondary interrupt handler. Additional exception handlers can not be installed nor can any exception handlers be removed during processing at secondary interrupt level.

Should an exception arise, control will be transferred to the exception handler as described in the Exceptions chapter of this document. The handler can affect a transfer of control using longjmp or similar mechanisms or return to the kernel. If the handler returns to the kernel indicating that the exception was handled, control will resume according to the exception state information provided by the handler. If, however, the handler returns to the kernel with status indicating that the exception was not handled, the system will crash.

When queueing or calling a secondary interrupt handler, you may request that no exception handler be installed during the activation of that secondary interrupt handler. Specifying a value of Null causes no exception handler to be installed. Should an exception arise with no exception handler installed, the system will crash.

Queuing Secondary Interrupt Handlers

Queueing secondary interrupt handlers is usually done during the processing of a hardware interrupt. The secondary interrupt handler's execution will be deferred until execution is about to transition back to task level. You may, however, queue secondary interrupt handlers from secondary interrupt level. In this case, the enqueued handler will be run after all other such queued handlers, including the current handler, have finished executing. Only one flavor of secondary interrupt handler, those with two parameters, may be queued. You must specify the values of the two parameters at the time you queue the handler.

Secondary interrupts handlers that are queued from hardware interrupt handlers consume kernel resources from the time they are queued until the time they begin to execute. These resources are finite. You should make every attempt to limit the number of simultaneously queued secondary interrupt handlers.

```
OSStatus QueueSecondaryInterruptHandler
            (SecondaryInterruptHandlerProc2    theHandler,
            ExceptionHandler                   theExceptionhandler,
            Ref                                p1,
            Ref                                p2);
```

Calling Secondary Interrupt Handlers

Secondary interrupt handlers can be called synchronously through use of the CallSecondaryInterruptHandler .. CallSecondaryInterruptHandler4 routines. These services may be used from either task level or secondary interrupt level but not from hardware interrupt level. The secondary interrupt handler is invoked immediately in response to calls to these services; they are never queued.

```
OSStatus CallSecondaryInterruptHandler
        (SecondaryInterruptHandlerProc0    theHandler,
        ExceptionHandler                   theExceptionHandler);

OSStatus CallSecondaryInterruptHandler1
        (SecondaryInterruptHandlerProc1    theHandler,
        ExceptionHandler                   theExceptionHandler,
        long                               p1);

OSStatus CallSecondaryInterruptHandler2
        (SecondaryInterruptHandlerProc2    theHandler,
        ExceptionHandler                   theExceptionHandler,
        long                               p1,
        long                               p2);

OSStatus CallSecondaryInterruptHandler3
        (SecondaryInterruptHandlerProc3    theHandler,
        ExceptionHandler                   theExceptionHandler,
        long                               p1,
        long                               p2,
        long                               p3);

OSStatus CallSecondaryInterruptHandler4
        (SecondaryInterruptHandlerProc4    theHandler,
        ExceptionHandler                   theExceptionHandler,
        long                               p1,
        long                               p2,
        long                               p3,
        long                               p4);
```

EVENT FLAGS

Event Flags are primarily used for synchronizing operations among tasks and are similar to classical semaphores. Event Flags come in groups, each group containing 32 separate flags or semaphores. The kernel provides a set of operations which Create and Delete Event Flag Groups and operate upon one or more of the flags within a specified group. As with most abstract types provided by the kernel you cannot get access to the underlying data of an event group; it is maintained within the kernel's address space and you may only reference it by the ID returned when the group is created.

```
typedef KernelID EventGroupID;
```

In addition to operations which allow the creation and deletion of event flag groups, other operations allow you to Set, Clear, Test, and Wait for one or more flags within a group. These operations require that you specify a mask value which is used to manipulate the flags within the group.

```
typedef unsigned long EventMask;
```

Creating Event Flag Groups

```
OSStatus CreateEventFlagGroup (EventGroupID * theGroup);
```

CreateEventFlagGroup creates an event flag group returns the group's ID. Each flag within the group is cleared. The group of flags will persist until it is explicitly deleted.

Deleting Event Flag Groups

```
OSStatus DeleteEventFlagGroup (EventGroupID theGroup);
```

DeleteEventFlagGroup destroys the specified event flag group. Any tasks waiting upon flags within the group are made executable and the result of their wait operation will be a kernelIncompleteErr.

Setting Event Flags

```
OSStatus SetEvents    (EventGroupID   theGroup,
                       EventMask      theMask);
```

SetEvents sets specified flags in the specified event flag group. As a result of setting flags, tasks waiting upon those flags will become eligible for execution. See WaitForEvents below.

theGroup specifies the event flag group.

theMask specifies zero or more event flags to set.

Clearing Event Flags

```
OSStatus ClearEvents    (EventGroupID   theGroup,
                         EventMask      theMask);
```

ClearEvents clears specified flags in the specified event flag group. Clearing event flags does not have any scheduling side effects.

theGroup specifies the event flag group.

theMask specifies zero or more event flags to clear.

Examining The Value Of Event Flags

```
OSStatus ReadEvents (EventGroupID   theGroup,
                     EventMask *    theValue);
```

ReadEvents returns the values of the event flags in the specified event flag group.

theGroup specifies the event flag group.

theValue specifed where to return the values of the event flags.

Waiting For Event Flags To Become Set

```
typedef unsigned long EventFlagOperation;
enum
{
    eventFlagAll      = 0,
    eventFlagAny      = 1,
    eventFlagAllClear = 2,
    eventFlagAnyClear = 3
};

OSStatus WaitForEvents  (EventGroupID       theGroup,
                         Duration           timeLimit,
```

March 29, 1994  Copyright 1992 Apple Computer, Inc.

```
            EventMask            theMask,
            EventFlagOperation   theOperation,
            EventMask *          theValue);
```

WaitForEvents waits for the flag(s) specified by theMask to become set within theGroup. If you want to wait for any one of several flags to become set use the eventFlagAny operation. If you want to wait for multiple flags to all become set use the eventFlagAll operation. You can optionally cause the flags for which you were waiting to be cleared by using either eventFlagAllClear or eventFlagAnyClear rather than eventFlagAny or eventFlagAll respectively. The maximum amount of time spent waiting is controlled by the timeLimit parameter and may range from zero to infinite. theValue represents the value of the flags when either the condition is satisfied or the timeLimit is exceeded.

Using Event Flags As Semaphores

Event flags may be used to implement traditional semaphores. To acquire a semaphore simply use the WaitForEventFlag with theOperation set to eventFlagAllClear. To release a semaphore which you have acquired, just use the SetEvents operation. Note, however, that the initial state of flags within an event flag group (cleared) causes them to be in the acquired state. They must be released (set) prior to being subsequently acquired.

```
    SetEvents (theGroup, theMask);     // V (S) - Release

WaitForEvents    (theGroup,         // P (S) - Acquire
                      durationForever,
                      theMask,
                      eventFlagAllClear,
                      nil);
```

The Processing Of SetEvents

SetEvents is of most interest because it can cause one or more task scheduling operations if any corresponding WaitForEvents requests become satisfied.

At the time of a Set operation, zero or more tasks are waiting for flags with the specified group to become set.

After the flag group has been updated to reflect the effect of the Set operation, the set of waiting tasks is scanned in an order dependent upon the priority of the waiting tasks. Higher priority tasks are considered before lower priority tasks. Within a single priority, tasks that have been waiting longer are considered prior to those which have been waiting for a shorter time. If the condition, specified by a given wait request, is satisfied the task is made executable and it is removed from the list of waiting tasks. Otherwise, the task remains on the list. If the condition is satisfied and the clear option was specified (EventFlagAnyClear or EventFlagAllClear), the effect of the clear happens before any other task's conditions are evaluated. The evaluation of the list continues until all tasks in the list have been processed.

EVENT NOTIFICATION

Many services provided by the kernel have forms that allow them to take place in parallel with the execution of the task making the request. These services are said to be *asynchronous*. NuKernel supports three mechanisms indicating when these asynchronous requests have completed: memory location update, Event Flags and Software Interrupts.

Asynchronous services allow you to specify an EventNotification which governs how you'll be informed of the request's completion. An EventNotification allows you to select any or all of the notification schemes. EventNotifications are used in conjunction with various address space, timer, task, and message operations.

When an asynchronous kernel service finally completes, those services *deliver* the notification. Notification delivery is defined as the following actions in order:

- Placing the service's result into a specific memory location.

- Setting one or more event flags within a specific event group.

- Sending a specific software interrupt. The service's result is used as the value of the second parameter to the software interrupt handler.

Delivery of a notification is completely asynchronous to the execution of the task that is being notified.

Every kernel service that makes use of the event notification mechanism has a notification parameter. This parameter is the address of an EventNotification record. If you pass the Null address, no notification will be delivered. Although event notification records are passed by address, the kernel makes a complete copy of the record that you supply at the time that you call the service. The record that you supply is not referenced at the time the service completes and the notification is delivered.

Event Notification

Below is the type declaration of an EventNotification.

```
typedef struct EventNotification
{
    OSStatus *          theStatus;
    EventGroupID        theGroup;
    EventMask           theMask;
    SoftwareInterruptId theSwi;
} EventNotification;
```

TIMING SERVICES

The kernel's timing services provides four different kinds of timers in addition to services that allow you to determine the timer accuracy of the hardware and to get the current time.

Three of the timer services are used when tasks need to either delay for a period of time or receive notification at a particular time. The fourth timer service allows you to specify a secondary interrupt handler that is to be run at a particular time.

Timer Accuracy

The accuracy of timer operations is quite good. Every attempt is made to ensure the quality of timed operations. However, certain limitations are inherent in the timing mechanisms and these are described below.

About The Time Base

Timer hardware within the system is clocked at a rate that is model dependent. This rate is called the *Time Base*. The timer services isolate you from the time base by representing all times in microseconds. However, the times that you specify are converted from microseconds into the units supported by the underlying hardware when hardware timers are actually programmed. This conversion can introduce errors. These errors are typically limited to one unit of the time base.

When performing sensitive timing operations, it can be important to know the underlying time base. For example, if the time base is 10 milliseconds, there is not much value in setting timers for 1 millisecond. You can determine the hardware time base by using the following service:

```
void TimeBase (unsigned long * Numerator,
               unsigned long * Denominator);
```

Representing the time base is difficult. The value is typically an irrational number. NuKernel solves this problem by returning a representation of the time base in fractional form; two 32-bit integer values, a numerator and denominator, are returned. The result of dividing the numerator by the denominator is a value that is equal to the number of hardware ticks per microsecond.

For example, if the hardware time base increments the hardware timer once every 1.2 microseconds then a call to TimeBase will return a numerator of 12 and a denominator of 10. In this example, numerator/denominator values of 120/100 or 6/5 would be equally valid.

Timing Latency

Timing latency is the amount of time which passes between when a timer should expire and when the notification of its expiration is received. Timing latency within the system is not deterministic. The effects of scheduling operations triggered by timer expiration do not necessarily occur immediately. Hardware interrupt handlers, secondary interrupt handlers, and tasks of greater or equal CPU priority will all contribute to the perceived latency of these timing services. Latency, by its nature, is not constant over time. Under some conditions, such as servicing a page fault when invoking the timer handler, latency may be larger than the requested time interval. If you avoid installing many timers that all expire at nearly the same time, timer latency should be acceptable.

Timer Overhead

When setting a timer, the time you specify is used directly to program the timing hardware. NuKernel does not attempt to account for either the overhead of setting up the timer or the overhead of notifying a client of the timer's completion. As a result, a timed operation of one millisecond may actually require, for example, 1.1 milliseconds. Overhead is different from latency because it is constant.

Obtaining The Time

You can read the internal representation of time to which all timer services are referenced. This value starts at zero during kernel initialization and increases throughout the system's lifetime.

```
void UpTime (AbsoluteTime * theTime);
```

Setting Timers To Expire In The Past

Several of the timer services allow you to specify an absolute time at which the timer is to expire. It is, therefore, possible that the time you specify has already occurred. The kernel does not attempt to optimize these cases. Timers set at times in the past will expire within a very short period of time, perhaps instantly, perhaps not. You should not depend upon the exact behavior of such timers.

Synchronous Timers

Synchronous timers cause the calling task to stop executing until a specific time is reached. NuKernel provides synchronous timers that specify time in both absolute and relative terms.

Synchronous Timers With Absolute Times

```
void   DelayUntil  (AbsoluteTime * expirationTime);
```

The calling task is blocked until expirationTime at which point the task is again made eligible for execution. Unless called with software interrupts disabled or from within a software interrupt handler, software interrupts may be received while the task is otherwise sleeping. Because DelayUntil allows you to specify an absolute expiration time, you can perform periodic work at intervals which have no long term drift.

Following is an example of a task that performs some work at one second intervals with no long term drift.

```
OSStatus DriftFreeWorker (Ref work)
{
   TimeFormat   nextWorkTime;

UpTime (&nextWorkTime);              // Get the time reference
   do
   {
      DoTheWork      (work)             // Do the work
      AddOneSecond   (&nextWorkTime);   // Calculate next time to work
      DelayUntil     (&nextWorkTime);   // Delay until that time
   } while (true);
}
```

Synchronous Timers With Relative Times

```
void   DelayFor (Duration    theDelay);
```

The calling task is blocked for the amount of time specified. DelayFor allows the caller to delay for a time relative to when the service is called. You cannot achieve drift free timing by using repeated calls to DelayFor.

Following is an example of a task that performs some work at one second intervals with unpredictable long term drift.

```
OSStatus DriftingWorker (Ref work)
{
   do
   {
      DoTheWork   (work);               // Do the work
      DelayFor (durationSecond);        // Delay for one second
   } while (true);
}
```

Asynchronous Timers

Asynchronous timers cause the task to be notified when a specified time is reached. Starting an asynchronous timer yields an ID which may be used to cancel the timer prior to its expiration. Notification of timer expiration is done through use of the EventNotification mechanism.

```
typedef KernelID TimerID;

OSStatus SetTimer    (AbsoluteTime *        expirationTime,
                      EventNotification *   theNotification,
                      TimerID *             theTimer);
```

A timer is set and upon expiration a notification is delivered.

expirationTime specifies the absolute time at which the notification should be generated.

theNotification specifies the manner in which the caller wishes to be notified upon expiration of the timer. See the Event Notification chapter of this document for additional details.

theTimer is updated to reflect the ID of the timer thus created. This ID may only be used to cancel the timer prior to its expiration. The TimerID becomes invalid when either a CancelTimer operation is performed or the timer expires.

Interrupt Timers

Each of the timing operations previously discussed are only pertinent to task level execution. This aspect of those timers is not acceptable to certain device drivers and other low level software. These clients may require timers that have less latency or can be set from hardware interrupt handlers. Interrupt timers fulfill both of these requirements.

Interrupt timers allow you to specify a secondary interrupt handler that is to be run when the timer expires. They are asynchronous in nature. You can set an interrupt timer from a hardware interrupt handler, a secondary interrupt handler, or a privileged task.

Interrupt timers require the use of preallocated kernel resources; a finite number of these timers are available. They should be used only when no alternative exists.

```
OSStatus SetInterruptTime (AbsoluteTime *             expirationTime,
                           SecondaryInterruptHandler  theHandler,
                           Ref                        p1,
                           TimerID *                  theTimer);
``` expirationTime is the absolute time at which the timer is to expire.

theHandler is the address of a secondary interrupt handler that is to be run when the specified time is reached.

p1 is the value that will be passed as the first parameter to the secondary interrupt handler when the timer expires. The value of the second parameter passed to the secondary interrupt handler is undefined.

theTimer is updated with the ID of the timer that is created. This ID may be used in conjunction with CancelTimer.

Canceling Asynchronous Or Interrupt Timers

Outstanding asynchronous timers can be canceled. This prevents the notification from being delivered. When you attempt to cancel an asynchronous timer a race condition begins between your cancellation request and expiration of the timer. It is, therefore, possible that the timer will expire and that your cancellation attempt will fail even though the timer had not yet expired at the instant the cancellation attempt was made.

Attempts to cancel interrupt timers that are made at interrupt level are slightly less deterministic. The kernel cannot cancel the actual timer until secondary interrupt time. So it is possible that the timer will expire and the secondary interrupt handler associated with the timer is run even though the timer was canceled. However, if the hardware interrupt handler that cancels the interrupt timer queues a secondary interrupt handler after it has made the cancellation request, the kernel guarantees that the interrupt timer will have either run or been canceled before that secondary interrupt handler executes.

```
OSStatus CancelTimer (TimerID theTimer);
```

CancelTimer cancels a previously created timer. An error is returned if the timer has either already expired or been canceled.

ADDRESS SPACE MANAGEMENT

Address Space Management is the creation, deletion, and maintenance of logical address spaces. Address spaces are composed of memory ranges, called *areas*, that possess a set of common attributes including backing store and protection level. Maintenance services include those for copying data between address spaces and for controlling access to and paging of areas within a particular address space.

Commonalities in address space management services are noted in the following list. Deviations are mentioned in the descriptions of individual services.

- The kernelIDErr error is returned when the specified address space or area does not exist.

- When a logical address range (base and length) is specified, that range must lie entirely within a single area. Although some range operations need to be implemented in a page-aligned fashion, it is never required that the base and length be specified page-aligned. Further, these calls require that area be based in RAM, not in ROM or IO space.

Basic Types

This section defines some types and values that are fundamental to address space management. The significance of the items mentioned is clarified by the descriptions of the services that use them.

Values of type LogicalAddress represent location in an address space or area.

```
typedef  Ref    LogicalAddress;
```

Values of type PhysicalAddress represent location in physical memory. They are used primarily with backing object and DMA I/O operations.

```
typedef  Ref    PhysicalAddress;
```

Address spaces are referred to by values of type AddressSpaceID. The value currentAddressSpaceID refers to the current address space.

```
typedef  KernelID    AddressSpaceID;
enum
{
   currentAddressSpaceID   = 0
};
```

Areas are referred to by values of type AreaID. The value noAreaID refers to an area that does not exist.

```
typedef  KernelID    AreaID;
enum
```

```
{
   noAreaID = 0
};
```

Values of type MemoryAccessLevel represent allowable accesses to some portion of memory.

```
typedef unsigned long MemoryAccessLevel;
enum
{
   memoryExcluded   = 0,
   memoryReadOnly   = 1,
   memoryReadWrite  = 2,
   memoryCopyOnWrite = 3
};
```

- memoryExcluded specifies that no accesses at all, including instruction fetches, are allowed.

- memoryReadOnly specifies that read and instruction fetch operations are allowed.

- memoryReadWrite specifies that read, write and instruction fetch operations are allowed.

- memoryCopyOnWrite specifies that read, write and instruction fetch operations are allowed, but that modifying data in the area does not alter data in the backing store. Note that there is no means provided to revert modified copy-on-write pages back to their original state.

```
typedef UnsignedWide BackingAddress;
```

Values of type BackingAddress are used to specify offsets within backing objects. They are 64-bit integer values in anticipation of file systems that provide support for files larger then 4 GB.

Static Logical Addresses

It is sometimes necessary to access the physical pages through logical addresses regardless of whether the physical page is mapped into the current address space. To enable this, the memory system keeps a *static mapping* of physical pages such that physical pages are mapped into the kernel band at all times. The logical address in the static mapping corresponding to a given physical address is called the *static logical address* of the page. Static logical addresses are kept in variables of type LogicalAddress. They are valid for access by privileged software only.

Address Space Control

The following services support the creation and deletion of address spaces. Others allow the caller to obtain information about the address spaces already in existence.

Creating Address Spaces

Address spaces can be created to provide additional addressing and protection.

```
OSStatus CreateAddressSpace (AddressSpaceID *   theAddressSpace);
```

CreateAddressSpace builds a new address space and returns an AddressSpaceID for it. A new address space automatically contains any existing global areas and range reservations (see CreateArea and CreateMemoryReservation, respectively).

theAddressSpace is an output parameter indicating the address space identifier that can be used for subsequent operations on the created address space. A value of invalidID will be returned if CreateAddressSpace fails.

Deleting Address Spaces

```
OSStatus DeleteAddressSpace (AddressSpaceID    theAddressSpace);
```

DeleteAddressSpace destroys the specified address space. All non-global areas mapped into that space are also destroyed.

> Note: Care should be taken to prevent references to the deleted address space.

theAddressSpace specifies the address space to destroy.

Obtaining Information About An Address Space

```
typedef struct SpaceInformation
{
   AddressSpaceID identity;
   ByteCount      logicalRAMSize;
   ByteCount      pageSize;
} SpaceInformation;

enum
{
   spaceInformationVersion = 0
};

OSStatus GetSpaceInformation (AddressSpaceID      theAddressSpace,
                              PBVersion           theVersion,
                              SpaceInformation *  theSpaceInfo);
```

GetSpaceInformation returns information about the specified address space.

theAddressSpace specifies the address space for which to get the information. A value of currentAddressSpaceID specifies the current address space.

theVersion specifies the version number of SpaceInformation to be returned. This provides backwards compatibility. spaceInformationVersion is the version of SpaceInformation defined in the current interface.

theSpaceInfo specifies where to return the information.

The fields of a SpaceInformation structure are:

- identity - the AddressSpaceID of the address space.

- logicalRAMSize - the number of bytes of mappable space within the address space.

- pageSize - the size, in bytes, of all logical pages in an address space. All address spaces use the same page size.

Iterating Over All Address Spaces

Tasks can obtain the AddressSpaceID's of all the existing address spaces.

```
OSStatus GetAddressSpacesInSystem  (ItemCount          theCount,
                                    ItemCount          skipCount,
                                    KernelIterator *   theAddressSpaces);
```

GetAddressSpacesInSystem allows the caller to iterate over all address spaces within the system.

theCount specifies the maximum number of AddressSpaceIDs to return.

skipCount specifies the number of address spaces to ignore prior to returning any AddressSpaceIDs.

theAddressSpaces specifies the KernelIterator in which to return the AddressSpaceID information. This KernelIterator must be large enough to store at least theCount AddressSpaceIDs.

Logical Page Size

```
#define  gestaltLogicalPageSize          'pgsz'
```

The Gestalt function includes the gestaltLogicalPageSize selector for acquiring the number of bytes in a logical page. The logical page size is constant for any given boot of the system. This information is also available from the GetSpaceInformation service.

Area Control

The following operations provide support for creating and deleting areas within address spaces. Others allow the caller to obtain information about the areas already in existence.

Creating Areas

```
typedef   OptionBits   AreaOptions;
enum
{
    zeroFill       = 0x00000001,
    residentArea   = 0x00000002,
    sparseArea     = 0x00000004,
    placedArea     = 0x00000008,
    globalArea     = 0x00000010
};

OSStatus CreateArea (AddressSpaceID     theAddressSpace,
                     BackingObjectID    theBackingObject,
                     BackingAddress *   theBackingBase,
                     ByteCount          theBackingLength,
                     MemoryAccessLevel  theAccessLevel,
                     MemoryAccessLevel  thePrivilegedAccessLevel,
                     ByteCount          theGuardLength,
                     AreaOptions        theOptions,
                     LogicalAddress *   theAreaBase,
                     AreaID *           theArea);
```

CreateArea creates a mapping between the specified address space and the specified backing store. The AreaID of the newly created area and the logical address of that area's origin are both returned to the caller. The logical address has meaning only within the context of the area's owning address space.

theAddressSpace specifies the address space in which to create the area.

theBackingObject specifies the backing store whose content is to be mapped. Specifying noBackingObjectID for this parameter implies that a scratch backing store file should be used. If either the residentArea option is specified, or if all access to the area is excluded, theBackingObject must be noBackingObjectID.

theBackingBase specifies the offset within theBackingObject that is to correspond to the lowest address in the area. Note that this parameter is the address of the actual BackingAddress parameter. theBackingBase being nil specifies a BackingAddress of zero. The range of possible BackingAddress values is not constrained by the memory system. Backing objects themselves may place restrictions (e.g. on a block-oriented device, the base might need to be a whole multiple of the block size). If the residentArea option is specified, theBackingBase must be specified as nil.

theBackingLength specifies the number of bytes to map from theBackingObject, starting at theBackingBase. It will be rounded up to a multiple of the logical page size. This implies that more backing store than was specified may be mapped in. Backing store data is not allocated by CreateArea. Rather, it is added on-demand (also, backing object providers may opt to implement a message to acquire the backing store). theBackingLength must be non-zero.

theAccessLevel and thePrivilegedAccessLevel specify the kinds of memory references that non-privileged and privileged software are allowed to make in the area, respectively. References made in violation of the access level result in exceptions at the time of the access. See the Memory Exceptions section of this chapter. If thePrivilegedAccessLevel is more restrictive than theAccessLevel, thePrivilegedAccessLevel will be made equal to theAccessLevel.

theGuardLength specifies the size, in bytes, of the excluded logical address ranges to place adjacent to each end of the area. The ranges, called *area guards*, are excluded to both privileged and non-privileged software. References to those addresses result in exceptions. See the Memory Exceptions section of this chapter. theGuardLength will be page-aligned, if necessary. This means that the excluded ranges may be larger than is specified.

theOptions specifies desired characteristics of the area being created. Values for this parameter are defined by the AreaOptions type.

- zeroFill specifies that memory in this area should be initialized to zero. This option applies only to scratch areas (i.e. noBackingObject is specified in theBackingObject) and non-pageable areas (i.e. the residentArea option is specified).

- residentArea specifies that the data for this area must always be physically resident. These areas are never paged between memory and backing storage. This option is available only to privileged callers.

- sparseArea specifies that the resources for the area be allocated on-demand. This option applies only to scratch areas (i.e. noBackingObject is specified in theBackingObject) and non-pageable areas (i.e. the residentArea option is specified). For scratch areas, sparseness means that the scratch backing object will be sparse, if possible. For resident areas, sparseness means that the physical memory will be allocated by page faulting.

- placedArea specifies that theAreaBase specifies where to create the area. theAreaBase and theBackingLength will be page-aligned. This means that the area may be larger than was specified. CreateArea fails and an error is returned if the area can not be so positioned. theAreaBase will be set to the actual beginning of the area.

Note: Care should be taken when using the placedArea option, as the specified location be part of a memory reservation unknown to the caller. It is advisable to create a reservation for the range in which the area will be placed, prior to creating the area. Reservations can be made either for a specific address space, or globally. See CreateMemoryReservation.

- globalArea specifies that the data for this area is to be addressable from any address space. All address spaces will get access in accordance with the privileged and non-privileged access levels specified. The created area appears at theAreaBase in every address space. When this option is specified theAddressSpace parameter has no effect; a value of nil should be passed.

theAreaBase is an ouput parameter indicating the beginning logical address of the mapped memory. If the placedArea option is specified, theAreaBase is also an input specifying where to position the area. See the description of placedArea, above.

theArea is an output parameter indicating the area identifier that can be used for subsequent operations on the created area. A value of noAreaID will be returned if CreateArea fails.

Deleting Areas

```
OSStatus DeleteArea   (AreaID   theArea);
```

DeleteArea removes the specified area. If the area is global, it is deleted from all address spaces. Further references to the logical addresses previously mapped will result in memory exceptions. Non-global areas are also deleted if the address space containing them is deleted.

> Note: DeleteArea has no formal interactions with other pieces of system software. Care should be taken to prevent potential references to the deleted area.

theArea specifies the area to destroy.

Obtaining Information About An Area

```
typedef struct AreaInformation
{
    AddressSpaceID     addressSpace;
    LogicalAddress     base;
    ByteCount          length;
    MemoryAccessLevel  accessLevel;
    MemoryAccessLevel  privilegedAccessLevel;
    AreaUsage          usage;
    BackingObjectID    backingObject;
    BackingAddress     backingBase;
    AreaOptions        options;
} AreaInformation;

enum
{
    areaInformationVersion  = 0
};
```

```
OSStatus GetAreaInformation  (AreaID            theArea,
                              PBVersion         theVersion,
                              AreaInformation * theAreaInfo);
```

GetAreaInformation returns information about the specified area.

theArea specifies the area for which to return information.

theVersion specifies the version number of AreaInformation to be returned. This provides backwards compatibility. areaInformationVersion is the version of AreaInformation defined in the current interface.

theAreaInfo specifies where to return the information.

The fields of an AreaInformation structure are:

- addressSpace - the address space that contains the area. This value will be currentAddressSpaceID if the area is global to all address spaces.

- base - the logical address of the area.

- length - the size, in bytes, of the area.

- accessLevel - the kinds of references allowed by non-privileged execution.

- privilegedAccessLevel - the kinds of references allowed by privileged execution.

- backingObject - the object providing backing store for the area. The value noBackingObjectID is returned if there is no backing object.

- backingBase - the area's base address within the backingObject.

- options - the options that were specified at the time the area was created.

See the description of CreateArea, above, for further information about access levels and area options.

Iterating Over All Areas Within An Address Space

```
OSStatus GetAreasInAddressSpace (AddressSpaceID   theAddressSpace,
                                 ItemCount        theCount,
                                 ItemCount        skipCount,
                                 KernelIterator * theAreas);
```

GetAreasInAddressSpace returns the AreaIDs of areas contained within the specified address space.

theAddressSpace specifies the address space from which to return areas. A value of currentAddressSpaceID specifies the current address space.

theCount indicates the maximum number of AreaIDs to return.

skipCount indicates the number of areas to ignore prior to returning any AreaIDs.

theAreas is filled in with the AreaIDs of the areas specified by theCount and skipCount. This KernelIterator must be large enough to store at least theCount AreaIDs.

Changing The Access Level Of An Area

It is sometimes useful to change the kind of accesses that are allowed to an area. For example, a code loader might need to make an area read-write while initializing it, then change it to read-only when the area is ready to use.

```
OSStatus SetAreaAccess    (AreaID            theArea,
                           MemoryAccessLevel theAccessLevel,
                           MemoryAccessLevel thePrivilegedAccessLevel);
```

SetAreaAccess changes the allowed accesses to an area.

theArea specifies the AreaID of the area in which to change the access.

theAccessLevel and thePrivilegedAccessLevel specify the kinds of memory references that non-privileged and privileged software are allowed to make in the area, respectively. References made in violation of the access level result in exceptions at the time of the access. See the Memory Exceptions section of this chapter. If thePrivilegedAccessLevel is more restrictive than theAccessLevel, thePrivilegedAccessLevel will be made equal to theAccessLevel.

Finding The Area That Contains A Particular Logical Address

```
OSStatus GetAreaFromAddress  (AddressSpaceID   theAddressSpace,
                              LogicalAddress   theAddress,
                              AreaID *         theArea);
```

GetAreaFromAddress returns the AreaID of the area associated with the specified logical address.

theAddressSpace specifies the address space containing the logical address in question. A value of currentAddressSpaceID specifies the current address space.

theAddress specifies the logical address to look up.

theArea is an output parameter where the AreaID of the logical address is returned.

Using Areas To Access Large Backing Stores

Some backing stores are too large to view in their entirety in the space available to a single address space. A common way to deal with this is to create a limited-size mapping (area), then adjust where in the backing store that mapping corresponds.

```
OSStatus SetAreaBackingBase   (AreaID           theArea,
                               BackingAddress * theBackingBase);
```

SetAreaBackingBase sets the specified BackingAddress as the base for the specified area. An area's base BackingAddress and length determine which portion of the BackingObject is mapped to the area. Changing an area's base BackingAddress is an effective method for accessing numerous parts of a large backing store through a relatively small logical address range.

theArea specified the area in which to change the backing store base.

theBackingBase specifies the offset within theBackingObject that is to correspond to the lowest address in the area. Note that this parameter is the address of the actual BackingAddress parameter. theBackingBase being nil specifies a BackingAddress of zero. The range of possible BackingAddress values is not constrained by the memory system. Backing objects themselves may place restrictions (e.g. on a block-oriented device, the base might need to be a whole multiple of the block size).

Memory Control

Obtaining Information About A Range of Logical Memory

You can obtain usage information for each logical page within a range of logical addresses. This information may be useful when performing certain runtime operations such as garbage collection and/or heap compaction.

```
enum
{
    pageInformationVersion  = 0
};

typedef unsigned long PageStateInformation;

enum
{
    pageIsProtected    = 0x00000001,
    pageIsModified     = 0x00000002,
    pageIsReferenced   = 0x00000004,
    pageIsLocked       = 0x00000008,
    pageIsResident     = 0x00000010,
    pageIsShared       = 0x00000020
};
```

```
typedef struct PageInformation
{
   AreaID              theArea;
   ItemCount           theCount;
   PageStateInformation theInformation [1];
} PageInformation;

OSStatus GetPageInformation   (AddressSpaceID    theAddressSpace,
                               LogicalAddress    theBase,
                               ByteCount         theLength,
                               PBVersion         theVersion,
                               PageInformation * thePageInfo);
```

GetPageInformation returns nformation about each logical page in the specified range. theAddressSpace specifies the address space containing the range of interest.

theBase is the first logical address of interest.

theLength specifies the number of bytes of logical address space, starting at theBase, about which information is to be returned.

theVersion specifies the version number of PageInformation to be returned. This provides backwards compatibility. pageInformationVersion is the version of PageInformation defined in the current interface.

thePageInfo is filled in with information about each logical page. This buffer must be large enough to contain information about the entire range. Page information is as follows:

- theArea indicates the AreaID of the area associated with the range.

- theCount indicates the number of enties in which information was returned.

- theInformation contains one entry for each logical page with bits to indicate whether the page is write protected, modified, referenced, locked, physically resident, and/or shared.

Data-To-Code

Placing executable data in memory requires synchronization with the processor's data and instruction caches. The details are specific to the processor and the internal operation of the memory system. Consequently, the memory system provides services that encapsulate the necessary operations.

```
OSStatus DataToCode  (AddressSpaceID  theAddressSpace,
                      LogicalAddress  theBase,
                      ByteCount       theLength);
```

DataToCode performs the operations necessary for the specified memory range to be treated as processor instructions instead of simple data. This is required, for example, when reading instructions into scratch memory, or when generating instructions "on the fly."

theAddressSpace specifies the address space containing the range to be treated as code.

theBase specifies the start of the range to be treated as code.

theLength specifies the number of bytes in the range to be treated as code.

The beginning and end of the range will be adjusted, if necessary, so that the range begins and ends on logical page boundaries. This means that more memory than was specified may be affected.

Preventing Unnecessary Backing Store Activity

```
OSStatus    ReleaseData    (AddressSpaceID    theAddressSpace,
                            LogicalAddress    theBase,
                            ByteCount         theLength);
```

ReleaseData informs the memory system that the data values in the specified range are no longer needed. It is an optimizing hint to prevent writing the data to the backing store. The backing store, if any, remains allocated to the range. This is useful, for example, when deallocating dirty heap blocks.

> Note: If the released range is subsequently accessed, the values in memory will be unpredictable. This includes data in areas with memoryCopyOnWrite access: that is, the data is not guaranteed to revert to its original, unmodified, state.

theAddressSpace specifies the address space containing the range to release.

theBase specifies the start of the range to release.

theLength specifies the number of bytes in the range to release.

The beginning and end of the range will be adjusted, if necessary, so that the range released begins and ends on logical page boundaries. This means that *less* memory than was specified may be released.

Memory Control In Association With I/O Operations

Memory usage in a demand paged, multi-tasking system is both highly dynamic and highly complex. It follows that data transfers to and from memory require close cooperation with the memory system to ensure proper operation.

The first consideration is that physical memory must remain assigned to the I/O buffer for at least the duration of the transfer (and, for logical I/O operations, that memory accesses do not page fault).

The second consideration is memory coherency. On output, it is essential that data in the processor's data cache be included in the transfer. On input, it is essential that the caches (both data and code) not be left with any out-of-date information, and it is desireable if the data cache can contain at least some of the data that was transferred. Furthermore, cache architectures vary from processor to processor, so it is also desirable to minimize or eliminate processor dependencies in the I/O drivers.

The kernel provides I/O support services that, when used properly, ensure that these considerations are met.

The most common I/O transaction envisioned is one-shot transfer where the I/O buffer belongs to the driver's client, such as handling a page fault by reading data directly into the user's page. The design also allows for multiple transactions to occur upon a single buffer. An example of this is a network driver whose transactions consist of reading data into its own buffer, processing the data, then copying the data off to a client's buffer. In this case, the driver re-uses the same buffer for an indefinite number of transactions.

The two services the kernel provides are PrepareMemoryForIO and CheckpointIO. PrepareMemoryForIO informs the kernel that a particular buffer will be used for I/O transfers. It assigns physical memory to the buffer and, optionally, prepares the processor's caches for a transfer. CheckpointIO informs the kernel that the previously started transfer, if any, is complete, whether there will be more transfers, and optionally the direction of the next transfer. It finalizes the caches and, if the next I/O direction is specified, prepares the caches for that transfer. If its parameters specify that no more transfers will be made, CheckpointIO deallocates the kernel resources associated with the buffer preparation: subsequent I/O operations on this range of memory will again need to begin with a call to PrepareMemoryForIO.

In the one-shot scenario, a PrepareMemoryForIO call prior to the transfer and a single CheckpointIO call following the transfer are used. The PrepareMemoryForIO parameters would specify the buffer location and the I/O direction, the CheckpointIO parameters would specify that no more transfers will be made.

In the multiple transfer scenario, a PrepareMemoryForIO when the buffer is allocated, a CheckpointIO prior to each transfer, and a CheckpointIO when the buffer is deallocated are used. The PrepareMemoryForIO parameters would specify the buffer location, but might or might not specify the I/O direction. The I/O direction is omitted if the transfer is not imminent, because the cache preparation would be wasted. The CheckpointIO calls before each transfer would specify the direction of the transfer and that more transfers will be made (not needed before the first transfer, if the PrepareMemoryForIO parameters specified an I/O direction). The final CheckpointIO parameters would specify that no more transfers will be made.

> Note: Failure to properly use these I/O related kernel services can result in data corruption and/or fatal system errors. Correct system behavior is the responsibility of the kernel and all I/O components including drivers, managers, and hardware.
>
> Note: The descriptions here are not, generally, sufficient to allow the reader to write a correct, high performance I/O driver. Guidelines for writing I/O drivers, including correct usage of the kernel services dedicated to I/O support, are beyond the scope of this document.

Preparing For I/O

```
typedef   KernelID IOPreparationID;

typedef   OptionBits   IOPreparationOptions;
enum
{
    ioIsInput            = 0x00000001,
    ioIsOutput           = 0x00000002,
    ioAddressIsLogical   = 0x00000004,
    ioCoherentDataPath   = 0x00000008,
    ioTransferIsLogical  = 0x00000010
};

typedef struct LogicalAddressRange
{
    LogicalAddress    theAddress;
    ByteCount         theCount;
} LogicalAddressRange;

typedef struct AddressRange
{
    Ref               theAddress;
    ByteCount         theCount;
} AddressRange;

typedef struct MappingTable
{
    AddressSpaceID          addressSpace;
    LogicalAddressRange     logical;
    ItemCount               tableEntryCount;
    AddressRange            rangeEntries [1];
} MappingTable;

OSStatus PrepareMemoryForIO   (AddressSpaceID        theAddressSpace,
                               Ref                   theBase,
                               ByteCount             theLength,
                               IOPreparationOptions  theOptions,
                               ItemCount             theEntryCount,
                               MappingTable *        theMappingTable,
                               IOPreparationID *     thePreparationID);
```

PrepareMemoryForIO enables device input/output on the specified range to occur in a manner coordinated with the memory system. Preparation includes ensuring that physical memory is assigned, and remains assigned, to the range at least until CheckpointIO relinquishes it. Depending upon the I/O direction and data path coherence that are specified, the kernel manipulates the contents of the processor's data caches, if any, and may make the underlying physical memory non-cachable.

I/O preparation must be done prior to the actual data movement. For typical operations such as those to block oriented devices, the preparation should be done just prior to moving the data, typically in the driver.

For operations upon buffers, such as memory shared between the main processor and a co-processor, frame buffers, or buffers internal to a driver, the preparation may be best performed when the buffer is allocated.

theAddressSpace specifies the address space containing the specified range. Note that logical I/O need not be performed in that address space. See the description of theMappingTable, below.

theBase specifies the start of the range to prepare. Either a logical or a physical address may be specified, as indicated by the ioAddressIsLogical. The manner in which the address is specified is entirely independent of the manner in which the I/O operation will be performed. For example, a physical address may be supplied even though the operation will be done using logical (programmed) I/O.

theLength specifies the number of bytes in the range to prepare.

theOptions control certain aspects of the operation. This value contains bits with the following meanings:

- ioIsInput indicates that data will be moved into main memory.

- ioIsOutput indicates that data will be moved out of main memory.

- ioAddressIsLogical indicates that theBase address is a logical address. In the absence of this option, theBase is presumed to be a physical address. When a physical address is specified, the kernel must create a mapping of the physical memory into the logical address space so that the logical I/O operation can proceed. The address of this mapping is returned in theLogicalBase.

- ioCoherentDataPath indicates that the data path that will be used to access memory during the I/O operation is fully coherent with the main processor's data caches. Coherency with the main processor's instruction cache is never presumed. When in doubt, do not specify this option.

- ioTransferIsLogical indicates that the operation reads/writes through the main processor's MMU and data caches. Such operations are performed with devices that fall into the Programmed I/O category of I/O devices. In the absence of the ioTransferIsLogical option, the I/O operation is assumed to bypass the processor's MMU and data caches. Such operations are performed with devices that fall into the DMA category of I/O devices. Among other things, this option determines whether the MappingTable will contain logical or physical addresses.

Note: PrepareMemoryForIO guarantees that the underlying physical memory remains assigned to the range at least until CheckpointIO relinquishes it. However, it does not guarantee that the original logical address range remains mapped. In particular, the controlling area may be deleted before CheckpointIO. If the caller can not somehow guarantee that the area will continue to exist, logical address references to the underlying physical memory must be made through the logical addresses provided in the mapping table.

Note that ioIsInput and ioIsOutput are completely independent. You may specify either, both, or neither at preparation time.

theEntryCount specifies the maximum number of AddressRanges in theMappingTable that PrepareMemoryForIO may fill in. An error is returned if this number is not sufficient. Note that the upper bound on required entries is equal to the number of distinct logical pages in the range. This parameter is ignored if theMappingTable is nil.

theMappingTable specifies the address at which the PrepareMemoryForIO should return a scatter-gather buffer representing the specified address range. A nil value for this parameter specifies that the scatter-gather buffer not be returned. If the ioTransferIsLogical option is specified, the address ranges will be logical ones valid in every address space. This is useful, for example, when the logical I/O will be performed in a different address space than the one containing the specified logical address range If the ioTransferIsLogical option is absent, the address ranges will be physical ones. This is useful for DMA. MappingTable fields have the following meanings:

- addressSpace indicates the address space containing the logical address range in the logical field. If the ioAddressIsLogical option was specified, this is the AddressSpaceID of the specified address space. Otherwise, it is the constant currentAddressSpaceID.

- logical indicates a contiguous logical range. If the ioAddressIsLogical option was specified, this is the originally specified base and length. Otherwise, this is a static logical address range for the specified physical range.

- entryCount indicates the number of valid entries in rangeEntries.

- rangeEntries is an array of address ranges corresponding to the original range. The entries will be static logical address ranges if the ioTransferIsLogical option is specified. The entries will be physical address ranges if the ioTransferIsLogical option is absent. Each entry represents an extent, so a given entry may indicate a length of one or more pages.

thePreparationID is an output parameter identifier that represents the I/O transaction. When the I/O operation has been completed or aborted this IOPreparationID is used to finish the transaction. See Finalizing I/O, below.

> Note: Memory must be prepared and finalized for the benefit of the system and other users of the memory and backing store, even if the caller does not need any of the information provided by PrepareMemoryForIO.

> Note: Calls to PrepareMemoryForIO should be matched with calls to CheckpointIO, even if the I/O was aborted. In addition to applying finishing operations to the memory range, CheckpointIO deallocates kernel resources used in preparing the range.

Finalizing I/O

```
typedef  OptionBits   IOPreparationOptions;
enum
{
   nextIsInput        = 0x00000001,
   nextIsOutput       = 0x00000002,
   moreTransfers      = 0x00000004
};

OSStatus CheckpointIO      (IOPreparationID     thePreparationID,
                            IOPreparationOptions theOptions);
```

CheckpointIO performs the necessary follow-up operations for the specified device input/output transfer, and optionally prepares for a new transfer or reclaims the kernel resources associated with the preparation. See the above section "Memory Control In Association With I/O Operations" for an overview.

thePreparationID is the IOPreparationID made for the input/output, as returned by a previous call to PrepareMemoryForIO. This ID is invalid following CheckpointIO if the moreTransfers option is not specified.

theOptions specifies optional operations. Values for this field are defined by the IOPreparationOptions type, as follows:

- nextIsInput specifies that the buffer be prepared for impending data input.

- nextIsOuput specifies that the buffer be prepared for impending data output.

- moreTransfers specifies that further I/O transfers will occur to or from the buffer. It is especially useful when the caller is unable to specify which direction the next transfer will be (i.e. neither nextIsInput nor nextIsOutput is specified), but is needed even if the next transfer direction is specified. If moreTransfers is not specified, all kernel resources associated with thebuffer preparation are reclaimed, including thePreparationID.

Note:  Call CheckpointIO even if the I/O is aborted. The kernel resources need to be reclaimed.

Note:  Multiple concurrent preparations of memory ranges or portions of memory ranges are supported. In this case, cache actions are appropriate and individual pages are not unlocked until all transactions have been finalized.

Memory Sharing

Memory sharing is a common requirement in device drivers, debuggers, and in client-server computing. The underlying method for sharing memory is to create areas that map the same backing store data into the various clients' address spaces. Because of the inherent memory caching, areas created this way use the same physical memory as well as the same backing store. Changes made to the memory in one address space are immediately present in the other address space(s). The kernel provides various services to share memory utilitizing this method, each with its own merits and applications.

Global Areas

A "global area" is an area that appears in every address space, at the same location and with the same attributes, and is automatically added to new address spaces. Global areas are useful, for example, for mapping shared library code that needs to be equally available in all address spaces. They are made by specifying the globalArea option (one of the AreaOptions) when creating the area.

Client-Server Areas

Certain servers benefit by providing their clients read-only access to the server's read-write data structures. This is simplified if the data appears at the same location in both the server's and the clients' address spaces, but with different memory access levels in each. The main hurdle is finding a location for the data that is available in the server and in all clients, present and future. "Memory reservations" address this problem. Reservations cordon off an address range such that areas will not be created there unless they are specifically placed there. See the Memory Reservations section, below.

Mapped Access To Other Address Spaces

It is sometimes useful to have on-going access to data in other address spaces. Although this can often be accomplished by creating an area with the same BackingObject and backing store offset as the area in the other space, this takes several kernel calls and furthermore is impossible for areas without BackingObjects, such as resident areas. The memory system provides a routine so that cross-address space mapping can be established easily and for all types of areas.

```
OSStatus CreateAreaForRange
                (AddressSpaceID    theAddressSpace,
                 AddressSpaceID    theOtherSpace,
                 LogicalAddress    theOtherBase,
                 ByteCount         theLength,
                 MemoryAccessLevel theAccessLevel,
                 MemoryAccessLevel thePrivilegedAccessLevel,
                 ByteCount         theGuardLength,
                 AreaOptions       theOptions,
                 LogicalAddress *  theBaseInArea,
                 AreaID         *  theArea);
```

CreateAreaForRange maps a logical address range from one space into another address space.

theAddressSpace specifies the address space in which to create the area.

theOtherSpace specifies tha address space containing the range to map.

theOtherBase specifies the start of the range in theOtherSpace.

theLength specifies the number of bytes in the range. It must be non-zero.

theOtherBase and theLength will be page-aligned. This means that a bigger range than was specified may be mapped.

theAccessLevel and thePrivilegedAccessLevel specify the kinds of memory references that non-privileged and privileged software are allowed to make in the area, respectively. References made in violation of the access level result in exceptions at the time of the access. See the Memory Exceptions section of this chapter. If thePrivilegedAccessLevel is more restrictive than theAccessLevel, thePrivilegedAccessLevel will be made equal to theAccessLevel. Note that the underlying backing object may disallow certain access levels.

theGuardLength specifies the size, in bytes, of the excluded logical address ranges to place adjacent to each end of the area. The ranges, called *area guards*, are excluded to both privileged and non-privileged software. References to those addresses result in exceptions. See the Memory Exceptions section of this chapter. theGuardLength will be page-aligned, if necessary. This means that the excluded ranges may be larger than is specified.

theOptions specifies desired characteristics of the area being created. Values for this parameter are defined by the AreaOptions type. Note that some of these options will be inherited from the area containing the range being mapped, so they will ignored by CreateAreaForRange.

- zeroFill specifies that memory in this area should be initialized to zero. This option applies only to scratch areas (i.e. noBackingObject is specified in theBackingObject) and non-pageable areas (i.e. the residentArea option is specified). This option is inherited from the range being mapped.

- residentArea specifies that the data for this area must always be physically resident. These areas are never paged between memory and backing storage. This option is available only to privileged callers. This option is inherited from the range being mapped.

- sparseArea specifies that the resources for the area be allocated on-demand. This option applies only to scratch areas (i.e. noBackingObject is specified in theBackingObject) and non-pageable areas (i.e. the residentArea option is specified). For scratch areas, sparseness means that the scratch backing object will be sparse, if possible, For resident areas, sparseness means that the physical memory will be allocated by page faulting. This option is inherited from the range being mapped.

- placedArea specifies that theBaseInArea specifies where to create the area. The area will begin on the page specified by theBaseInArea. CreateAreaForRange fails and an error is returned if the area can not be so positioned. The address corresponding to the beginning of the range will be returned in theBaseInArea. Note that this will be exactly as specified only if theBaseInArea and theOtherBase have the byte offset into their respective logical pages.

Note: Care should be taken when using the placedArea option, as the specified location be part of a memory reservation unknown to the caller. It is advisable to create a reservation for the range in which the area will be placed, prior to creating the area. Reservations can be made either for a specific address space, or globally. See CreateMemoryReservation.

- globalArea specifies that the data for this area is to be addressable from any address space. All address spaces will get access in accordance with the privileged and non-privileged access levels specified. The created area appears at theBaseInArea in every address space. When this option is specified theAddressSpace parameter has no effect; a value of nil should be passed.

theBaseInArea is an ouput parameter indicating the address in the area corresponding to the beginning of the specified range. If the placedArea option is specified, theBaseInArea is also an input specifying where to position the area. See the description of placedArea, above.

theArea is an output parameter indicating the area identifier that can be used for subsequent operations on the created area. A value of noAreaID will be returned if CreateAreaForRange failed.

Copying Data Between Address Spaces

It is sometimes useful to simply read or write data in another address space. For example, a debugger might need to display or set data in the debugged address space. The memory system provides a routine to achieve this without the overhead of setting up a mapping.

```
OSStatus InterspaceBlockCopy (AddressSpaceID    theSourceAddressSpace,
                              AddressSpaceID    theTargetAddressSpace,
                              LogicalAddress    theSourceBase,
                              LogicalAddress    theTargetBase,
                              ByteCount         theLength);
```

InterspaceBlockCopy copies bytes from the specified source address space and range to the specified destination address space and range. Note that neither address space needs to be the current address space.

theSourceAddressSpace specifies the address space containing the source range.

theTargetAddressSpace specifies the address space containing the destination range.

theSourceBase specifies the start of the source range in theSourceAddressSpace.

theTargetBase specifies the start of the destination range in theTargetAddressSpace theLength specifies the length, in bytes, of the range.

Memory Reservations

Certain servers benefit by providing their clients read-only access to the server's read-write data structures. This is simplified if the data appears at the same location in both the server's and the clients' address spaces, but with different memory access levels in each. The main hurdle is finding a location for the data that is available in the server and in all clients, present and future. "Memory reservations" address this problem. Reservations cordon off an address range such that areas will not be created there unless they are specifically placed there. Reservations can be made either for a specific address space, or globally.

Creating Memory Reservations

```
typedef KernelID        MemoryReservationID;

typedef OptionBits      ReservationOptions;
enum
{
   placedReservation = 0x00000001,
   globalReservation = 0x00000002
};

OSStatus CreateMemoryReservation
                     (AddressSpaceID          theAddressSpace,
                      LogicalAddress *        theBase,
                      ByteCount               theLength,
                      ReservationOptions      theOptions,
                      MemoryReservationID *   theReservation);
```

CreateMemoryReservation reserves a logical address range such that no areas will be created within that range unless they are specified to be there. Areas are created at specific locations by using the placedArea option (one of the AreaOptions).

theAddressSpace specifies the address space in which to reserve the range.

theBase is an ouput parameter indicating the beginning logical address of the reservation. If the placedReservation option is specified, theBase is also an input specifying where to position the reservation. See the description of placedReservation, below.

theLength is the number of bytes to reserve. It will be rounded up to a multiple of the logical page size. This means that the reservation may be larger than was specified.

theOptions specifies desired characteristics of the reservation being created. Values for this parameter are defined by the ReservationOptions type.

- placedReservation specifies that theBase specifies where to create the reservation. theBase and theLength will be page-aligned. This means that the reservation may be larger than was specified. CreateMemoryReservation fails and an error is returned if the reservation can not be so positioned. theBase will be set to the actual beginning of the reservation.

- globalReservation specifies that the reservation is to apply across all existing and future address spaces. The reservation appears at theBase in every address space. When this option is specified theAddressSpace parameter has no effect; a value of nil should be passed. Note that although the reservation is across all spaces, creating a non-global area in a reserved range adds the area just to the specified space.

Global reservations, like global areas, are automatically added to new address spaces. This assures the server that the range will be available when a client in the new address space initializes its connection to the server.

theReservation is an output parameter indicating the reservation identifier that can be used for subsequent operations on the reservation. A value of invalidID will be returned if CreateMemoryReservation fails.

Deleting Memory Reservations

```
OSStatus DeleteMemoryReservation (MemoryReservationID theReservation);
```

DeleteMemoryReservation destroys the specified memory reservation.

theReservation specifies the reservation to delete.

Obtaining Information About A Memory Reservation

```
typedef struct ReservationInformation
{
    MemoryReservationID  identity;
    AddressSpaceID       addressSpace;
    LogicalAddress       base;
    ByteCount            length;
    ReservationOptions   options;
} ReservationInformation;

enum
{
    reservationInformationVersion = 0
};
```

```
OSStatus GetReservationInformation
                    (MemoryReservationID      theReservation,
                     PBVersion                theVersion,
                     ReservationInformation * theReservationInfo);
```

GetReservationInformation returns information about the specified memory reservation.

theReservation specifies the memory reservation for which to get the information.

theVersion specifies the version number of ReservationInformation to be returned. This provides backwards compatibility. reservationInformationVersion is the version of ReservationInformation defined in the current interface.

theReservationInfo specifies where to return the information.

The fields of a ReservationInformation structure are:

- identity - the MemoryReservationID of the reservation.

- addressSpace - the address space in which the reservation exists. This value will be currentAddressSpaceID if the reservation is global to all address spaces.

- base - the logical address of the reservation.

- length - the size, in bytes, of the reservation.

- options - the options that were specified at the time the reservation was created.

Iterating Over All Memory Reservations Within An Address Space

```
OSStatus GetReservationsInAddressSpace
                    (AddressSpaceID    theAddressSpace,
                     ItemCount         theCount,
                     ItemCount         skipCount,
                     KernelIterator *  theReservations);
```

GetReservationsInAddressSpace allows the caller to iterate over the memory reservations that apply to the specified address space, including the global reservations that apply to all address spaces.

theAddressSpace specifies the address space from which to return reservations. A value of currentAddressSpaceID specifies the current address space.

theCount specifies the maximum number of MemoryReservationIDs to return.

skipCount specifies the number of reservations to ignore prior to returning any MemoryReservationIDs.

theReservations specifies the KernelIterator in which to return the MemoryReservationID information. This KernelIterator must be large enough to store at least theCount MemoryReservationIDs.

Memory Exceptions

The kernel provides a mechanism to present exceptional hardware and software conditions to higher level software for resolution (see the Exceptions section of this document). The memory system employs this mechanism for address space related errors to be handled outside the memory system.

In particular, an address space related error results in an exception that can then be processed by an appropriate exception handler. The relevant ExceptionKinds are accessException, unmappedMemoryException, excludedMemoryException, readOnlyMemoryException, and unresolvablePageFaultException. The MemoryExceptionInformation structure defines additional information included in these exceptions. The Exceptions section indicates how this structure is relayed to the handler.

```
typedef struct MemoryExceptionInformation
{
    AreaID              theArea;
    LogicalAddress      theAddress;
    OSStatus            theError;
    MemoryReferenceKind theReference;
} MemoryExceptionInformation;

typedef unsigned long MemoryReferenceKind;
enum MemoryReferenceKind
{
    writeReference = 0,
    readReference  = 1,
    fetchReference = 2
};
```

The fields of a MemoryException structure are:

- theArea - the area containing the logical address of the exception. This will be kNoAreaID if the reference was made to an unmapped range of the address space.

Note: The value of this field is unpredictable if the memory access spanned area boundaries. The use of area guards reduces the probability of such accesses.

- theAddress - the logical address of the exception.

- theError - the status for unresolvablePageFault.

- theReference - the type of memory reference that resulted in the exception.

The address space related values of the ExceptionKind type are:

- accessException - reference resulted in a page fault because the physical address was not accessible (i.e. it was a "hard fault").

- unmappedMemoryException - reference was to an address which is not part of any area in the address space.

- excludedMemoryException - reference was to an area whose access level prevents any access (the ExcludedMemory access level), or to an area guard.

- readOnlyMemoryException - reference was to an area whose access level prevents write accesses (the ReadOnlyMemory access level).

- unresolvablePageFaultException - reference resulted in a page fault that could not be resolved. theError field in the MemoryExceptionInformation indicates why the fault was not resolved.

The values of the MemoryReferenceKind type are:

- WriteReference - reference was an attempt to modify data.

- ReadReference - reference was an attempt to acquire data.

- FetchReference - reference was an attempt to acquire a processor instruction.

Note: The ability to distinguish instruction fetches from read references is processor dependent. Consequently, some implementations may report instruction fetches as ReadReferences.

Backing Object Providers

Backing object providers require a few specialized services.

Registration

Backing object providers must register with the kernel so they can be properly involved in the operation of the memory system.

```
typedef  OptionBits  BackingObjectProviderOptions;
enum
{
   noScratchBackingObjects = 0x00000001
};

OSStatus    RegisterBackingObjectProvider
                    (ObjectID                      theObject,
                     BackingObjectProviderOptions  theOptions);
```

RegisterBackingObjectProvider registers the specified message system object as being associated with a backing object provider. The kernel will send messages to this object as necessary for the operation of the memory system. The messages are described in the Backing Object Messages section.

theObject specifies the ObjectID of the backing object provider.

theOptions specifies properties of the backing object provider. Undefined options should be specified as zero, for upward compatibility. Values for this parameter are defined by the BackingObjectProviderOptions type.

- noScratchBackingObjects specifies that the provider is incapable of supporting scratch backing objects. This would be the case, for example, if the provider only manages backing store on CD-ROM (because CD-ROM is read-only). In general, providers are expected to support scratch backing objects. Scratch backing objects are requested with the OpenScratchBackingObject message.

Acquiring A Physical Memory Page From The Memory System

Backing object providers can acquire physical memory pages in which to place backing store data.

```
OSStatus    GetFreePage    (ObjectID          theBackingObjectProvider,
                            PhysicalAddress * thePageAddress,
                            LogicalAddress *  theStaticLogicalAddress);
```

GetFreePage allocates a physical memory page. The page will be considered "in use," and not be allocated to anyone else, until it is returned to the kernel using the PutFreePage kernel service.

This service may result in RelinquishPage messages being sent to the registered backing object providers. RelinquishPage is described in the Backing Object Messages section.

theBackingObjectProvider specifies the ObjectID of a single backing object provider to which to *not* send the RelinquishPage message. It is expected that the caller of GetFreePage is a backing object provider, and that it is better not to ask the caller to relinquish a page for itself. Therefore, the caller should specify its own registered backing object provider ObjectID (see RegisterBackingObjectProvider). The caller should treat failure of GetFreePage with the same seriousness as an "urgent" RelinquishPage message: dig deep to replace a physical page out of its own cache. A value of invalidID specifies that the caller does not wish to be skipped.

thePageAddress specifies where to return the physical memory address.

theStaticLogicalAddress specifies where to return a static logical address for thePageAddress.

Returning A Physical Memory Page To The Memory System

Backing object providers need to give back physical memory pages to the memory system as soon the pages are no longer needed to hold backing store data. This is preferable to each provider maintaining private free page lists, because it adapts better to changes in memory requirements system-wide.

```
OSStatus    PutFreePage    (PhysicalAddress       thePageAddress);
```

PutFreePage returns the specified physical memory page to the memory system, surrendering the current use of the page.

thePageAddress specifies the physical memory page being recycled.

Unmapping A Physical Page

Backing object providers can unmap a physical page from all the logical pages in which the physical page is mapped. This is useful as part of making a page eligible for replacement or when expelling a page from the cache.

```
OSStatus    UnmapMemory    (PhysicalAddress       thePhysicalAddress,
                            PageStateInformation * theState);
```

UnmapMemory undoes all logical mappings of the specified physical page, and returns page state information for further processing (for example, modified pages might need to be written to backing store). UnmapMemory fails if the page is currently locked in memory (pages are locked, for example, during I/O).

thePhysicalAddress specifies the physical page to unmap.

theState specifies where to return the page state information. If multiple mappings (aliases) existed, theState is a conservative combination of the page states and pageIsShared is indicated. In particular, pageIsModified is indicated if any of the mappings indicated "modified." See the description of the GetPageInformation service for details of the PageStateInformation type.

Backing Object Messages

There is a small set of messages sent from the Memory System to backing object providers. Some of the messages are sent to the BackingObjectID, the remainder are sent to the provider's registered ObjectID, as noted in the individual message descriptions.

General Message Format

Each backing object message contains an operation code. The defined operations are:

```
enum
```

```
{
    AreaCreated                     = 0,
    AreaDeleted                     = 1,
    RelinquishPage                  = 2,
    OpenScratchBackingObject        = 3,
    OpenBackingObject               = 4,
    CloseBackingObject              = 5,
    ReadBackingObject               = 6,
    WriteBackingObject              = 7,
    AgeBackingObject                = 8
};
```

Each backing object message contains a version number. The version number listed in the interface file corresponds to the message format described in that file.

```
enum
{
    AreaCreatedVersion              = 0,
    AreaDeletedVersion              = 0,
    RelinquishPageVersion           = 0,
    OpenScratchBackingObjectVersion = 0,
    OpenBackingObjectVersion        = 0,
    CloseBackingObjectVersion       = 0,
    ReadBackingObjectVersion        = 0,
    WriteBackingObjectVersion       = 0,
    AgeBackingObjectVersion         = 0
};
```

Messages related to page faulting are specially typed so providers can receive them differently than non-page fault messages. The messages having the type PageFaultIOType are: RelinquishPage, ReadBackingObject, WriteBackingObject, and AgeBackingObject.

```
enum
{
    PageFaultIOType                 = 1
};
```

A given message is a variation on the BackingObjectMessage. The operation code is specified in the theOperation field. The version number is in the theVersion field. The remainder of the message is specific to the particular message operation.

```
typedef union BackingControl
{
    AreaCreatedControl          areaCreatedMessage;
    AreaDeletedControl          areaDeletedMessage;
    RelinquishControl           relinquishMessage;
    BackingOpenScratchControl   openScratchMessage;
    BackingOpenControl          openMessage;
    BackingCloseControl         closeMessage;
    BackingReadControl          readMessage;
    BackingWriteControl         writeMessage;
    BackingAgeControl           agingMessage;
```

```
} BackingControl;

typedef struct BackingObjectMessage
{
    BackingOperation        theOperation;
    PBVersion               theVersion;
    BackingControl          theBackingControl;
} BackingObjectMessage;
```

Area Creation

Backing object providers participate in area creation.

```
typedef  OptionBits         AreaCreatedOptions;

typedef struct AreaCreatedControl
{
    AreaCreatedOptions      theOptions;
    AreaID                  theArea;
    MappingTable *          thePhysicalMappingTable;
    MappingTable *          theStaticLogicalMappingTable;
} AreaCreatedControl;
```

Request to use the backing object to map a new area. The area has been created, but the area creator has not yet been given the area address or AreaID. GetAreaInformation and other kernel services work. The provider should verify that the backing object is being used appropriately. For example, it should check that the access level and area base are reasonable. If the returned status indicates an error, the area is destroyed and the area creation call is failed with that status.

This message is sent to the provider's registered ObjectID, with AreaCreated specified in the operation code field.

theOptions specifies optional actions and/or properties. Undefined options should be specified as zero, for upward compatibility. There are currently no defined options, so this field is a placeholder and a value of nilOptions should be specified.

theArea indicates the AreaID.

thePhysicalMappingTable indicates the mapping of the area to physical addresses. A nil value indicates that there are no physical addresses yet mapped in. This information is provided so that the backing object provider can properly manage its backing store caches. The MappingTable fields have the following meanings:

- addressSpace indicates the AddressSpaceID of the address space containing the area.

- logical indicates the logical address range of the area.

- entryCount indicates the number of valid entries in rangeEntries.

- rangeEntries is an array of physical address ranges corresponding to the area's logical range. Each entry represents an extent, so a given entry may indicate a length of one or more pages.

theStaticLogicalMappingTable is the static logical addressing equivalent of thePhysicalMappingTable. The only difference between the two tables is that the rangeEntries of theStaticLogicalMappingTable contain static logical address ranges.

Area Deletion

Backing object providers participate in area deletion.

```
typedef  OptionBits       AreaDeletedOptions;

typedef struct UnmappedPageInformation
{
    PageStateInformation    theState;
    PhysicalAddress         thePhysicalAddress;
    LogicalAddress          theStaticLogicalAddress;
    BackingAddress          theBackingAddress;
} UnmappedPageInformation;

typedef struct UnmappedPageList
{
    ItemCount                 theCount;
    UnmappedPageInformation   theInformation [1];
} UnmappedPageList;

typedef struct AreaDeletedControl
{
    AreaDeletedOptions      theOptions;
    AddressSpaceID          theAddressSpace;
    AreaID                  theArea;
    UnmappedPageList *      thePageList;
} AreaDeletedControl;
```

Notification that the area has been deleted. All the pages in the area have been unmapped. Likely action is to write the dirty pages, and make all pages eligible for replacement.

This message is sent to the provider's registered ObjectID, with AreaDeleted specified in the operation code field.

theOptions specifies optional actions and/or properties. Undefined options should be specified as zero, for upward compatibility. There are currently no defined options, so this field is a placeholder and a value of nilOptions should be specified.

theAddressSpace indicates the address space containing the area that was deleted.

theArea indicates the area that was deleted.

thePageList is the address of a list of the pages that were resident in the area when the area was deleted.

The fields of the UnmappedPageList structure are:

- theCount indicates the number of entries in the array of page descriptions
- theInformation is an array of page descriptions The fields of the UnmappedPageInformation structure are:

- theState indicates the state information of the page when the area was deleted. See the description of the GetPageInformation service for details of the PageStateInformation type.
- thePhysicalAddress indicates the physical address that was mapped into the page
- theStaticLogicalAddress indicates the static logical address for thePhysicalAddress.
- theBackingAddress indicates the corresponding backing store address Note: The physical page that was mapped into a given logical page may still be mapped into other logical pages. In this case, the "likely action" should not include writing the page or making it eligible for replacement. Such pages are identified by having the pageIsShared indication in the PageStateInformation.

Request To Relinquish Physical Memory Page

The Memory System sometimes needs to request backing object providers to give up physical memory pages from their caches. The need can be mild or it can be urgent.

```
typedef  OptionBits         RelinquishOptions;
enum
{
    relinquishNeedIsUrgent  = 0x00000001
};

typedef struct RelinquishControl
{
    RelinquishOptions       theOptions;
    PhysicalAddress         thePhysicalPage;
} RelinquishControl;
```

Request to return a physical memory page to the memory system.

This message is sent to the provider's registered ObjectID, with RelinquishPage specified in the operation code field, and having the message type PageFaultIOType.

theOptions specifies optional operations. Values for this field are defined by the RelinquishOptions type, as follows:

- relinquishNeedIsUrgent indicates that the Memory System has exhausted normal means of acquiring a physical memory page, and system failure might result if this request is denied. The provider is strongly encouraged to dig deep. If relinquishNeedIsUrgent is not indicated, the provider need not go to extremes (a likely choice would be a physical memory page from the set of eligible pages).

thePhysicalPage is the field in which the provider returns the physical memory page address.

Opening A Scratch Backing Object

The Memory System opens scratch backing objects when, for example, creating scratch areas. Opening scratch backing objects, however, is an operation that some non-kernel entities will need to do, also. The message described here suits the Memory System's purposes, but is might not be suitable for general use.

> Note: This message is not suitable for mapping an existing file. There are two reasons for this. First, such an operation is not needed by the kernel or Memory System. Second, the manner in which files are specified depends entirely upon the backing object provider. At some point, backing object providers need to provide a file-mapping service(complete with a call to create the area), or at least a service that makes a BackingObjectID for a specified file.

```
typedef   OptionBits           BackingOpenScratchOptions;
enum
{
    sparseBackingObject        = 0x00000001,
    zeroFillBackingObject      = 0x00000002
};

typedef   UnsignedWide         BackingLength;

typedef struct BackingOpenScratchControl
{
    BackingOpenScratchOptions  theOptions;
    BackingLength              theLength;
    BackingObjectID            theBackingObject;
} BackingOpenControl;
```

Request to make a scratch backing object suitable for mapping a scratch area.

This message is sent to the provider's registered ObjectID, with OpenScratchBackingObject specified in the operation code field.

theOptions specifies optional operations or characteristics. Values for this field are defined by the BackingOpenScratchOptions type, as follows:

- sparseBackingObject specifies that backing store be allocated only as-needed. Non-sparse backing objects have backing store allocated even for ranges that have not been accessed.

- zeroFillBackingObject specifies that the initial value of the backing store data be zero. That is, the first read of any backing store page yields a page filled with zeroes.

theLength specifies the size, in bytes, of the BackingObject.

theBackingObject is the field in which the provider returns a BackingObjectID that can be used to create a scratch area.

Closing A Backing Object

Backing objects are closed, for example, when the backing store no longer needs to be mapped in.

```
typedef  OptionBits        BackingCloseOptions;
enum
{
   backingCloseDeleteObject  = 0x00000001
};

typedef struct BackingCloseControl
{
   BackingCloseOptions     theOptions;
} BackingCloseControl;
```

Request to eliminate the specified backing store mapping. Optionally deletes the backing store.

This message is sent to the BackingObjectID, with CloseBackingObject specified in the operation code field.

theOptions specifies optional operations. Values for this field are defined by the BackingCloseOptions type, as follows:

- backingCloseDeleteObject indicates to delete the backing store.

Reading From A Backing Object

Backing object providers are responsible for reading data from backing store into memory.

```
typedef  OptionBits        BackingReadOptions;
```

```
enum
{
    backingReadHasFreePage   = 0x00000001
};

typedef OptionBits          PageAttributes;
enum
{
    lockedPage              = 0x00000001,
    writeProtectedPage      = 0x00000002,
    modifiedPage            = 0x00000004,
    nonCachablePage         = 0x00000008
};

typedef struct BackingReadControl
{
    BackingReadOptions      theOptions;
    BackingAddress          theBackingAddress;
    ByteCount               theLength;
    PageAttributes          theAttributes;
    PhysicalAddress         theFreePhysicalPage;
    LogicalAddress          theFreeStaticLogicalAddress;
    PhysicalAddress         thePhysicalPage;
} BackingReadControl;
```

Request to make the specified backing store data available in memory.

This message is sent to the BackingObjectID, with ReadBackingObject specified in the operation code field, and having the message type PageFaultIOType.

theOptions specifies optional operations. Values for this field are defined by the BackingReadOptions type, as follows:

- backingReadHasFreePage indicates that message contains an available physical memory page address in the theFreePhysicalPage field.

theBackingAddress specifies the location in the backing object from which to start the read.

theLength specifies the number of bytes to read.

theAttributes indicates the attributes that the memory system will use when it maps the physical address into logical memory. This is supplied for the provider's information. Note that any or all of these attributes may change after the page is mapped.

- lockedPage indicates that the page will be mapped into memory such that it is ineligible for replacement (i.e. it won't be paged out).

- writeProtectedPage indicates that the page will be read-only. Note that this applies to, among others, unmodified pages in areas with memoryCopyOnWrite access.

- modifiedPage indicates that the contents of the physical page are known to be different from what is in backing store.

- nonCachablePage indicates that the access to data on the page will bypass the processor's caches.

theFreePhysicalPage indicates the address of an available physical memory page, if and only if the backingReadHasFreePage option is set. Using this page, if available, obviates calling the GetFreePage kernel service.

theFreeStaticLogicalAddress is a static logical address for theFreePhysicalPage.

thePhysicalPage is the field in which the provider returns the physical address into which the backing store data was read.

Writing To A Backing Object

Backing object providers are responsible for writing data from physical addresses into backing store.

```
typedef   OptionBits         BackingWriteOptions;

typedef struct BackingWriteControl
{
   BackingWriteOptions    theOptions;
   BackingAddress         theBackingAddress;
   ByteCount              theLength;
   PhysicalAddress        thePhysicalPage;
   LogicalAddress         theStaticLogicalAddress;
} BackingWriteControl;
```

Request to write the specified data to backing store.

This message is sent to the BackingObjectID, with WriteBackingObject specified in the operation code field, and having the message type PageFaultIOType.

theOptions specifies optional actions and/or properties. Undefined options should be specified as zero, for upward compatibility. There are currently no defined options, so this field is a placeholder and a value of nilOptions should be specified.

theBackingAddress specifies the location in the backing object at which to start the write.

theLength specifies the number of bytes to write.

thePhysicalPage specifies the physical address from which to start the write. Note that this address is probably already known to the provider as part of the cache information, but is provided in the message anyway, to eliminate the cache lookup overhead.

theStaticLogicalAddress is the static logical address for thePhysicalPage.

Page Aging Notification

Backing object providers receive notification when pages in backing objects they control have remained unreferenced long enough that they appear unlikely to be referenced in the near future.

```
typedef  OptionBits  AgingOptions;

typedef struct BackingAgeControl
{
    AgingOptions         theOptions;
    PhysicalAddress      thePhysicalPage;
    LogicalAddress       theStaticLogicalAddress;
    BackingAddress       theBackingAddress;
    ByteCount            theLength;
    ItemCount            theEligibleCount;
} BackingAgeControl;
```

Notification that a page has crossed the aging threshold. If the provider decides that the page should be made eligible for replacement, the provider must unmap the page (using the UnmapMemory kernel service) prior to writing it (if dirty) and make it eligible. This way, the provider finds out when the page "becomes young again" (i.e. is accessed) by receiving a ReadBackingObject message for it, and can make the page ineligible for replacement.

This message is sent to the BackingObjectID, with AgeBackingObject specified in the operation code field, and having the message type PageFaultIOType.

theOptions specifies optional actions and/or properties. Undefined options should be specified as zero, for upward compatibility. There are currently no defined options, so this field is a placeholder and a value of nilOptions should be specified.

thePhysicalPage indicates the physical address of the page in question.

theBackingAddress indicates the backing store address mapped into the page.

theLength indicates the number of bytes in the page.

theEligibleCount is the field in which the provider returns the number of pages in its cache that it considers eligible for replacement. The Memory System uses this information as feedback for the aging mechanism.

> Note: A fact of life in multi-tasking environments is that state can change asynchronously with respect to any given thread of execution. Accordingly, it is possible that the provider has relinquished the physical page for another purpose by the time the aging message is processed. Therefore, the processing of the aging message must ascertain whether the physical page still corresponds to the indicated BackingAddress of the backing object to which the message was sent. The aging message must be ignored if this correspondence no longer exists.

POOLS

The kernel pool manager provides the ability to allocate and deallocate variable length chunks of memory from abstract entities called pools. Previously, system software, drivers, DA's, INIT's, and applications had only the system heap and the application heap as alternatives for the allocation of dynamic memory. The pool manager allows clients to utilize memory in either of two kernel pools or to create and utilize pools of thier own.

NuKernel services pertaining to pools are available only to privileged clients.

Creating Memory Pools

```
typedef struct GrowPoolInfo
{
    Ref              poolAddress;
    ByteCount        spaceNeeded;
    ByteCount        currentPoolSize;
    ByteCount        maximumPoolSize;
} GrowPoolInfo;
typedef ByteCount (*GrowPoolProc) (GrowPoolInfo *growInfo);

typedef  unsigned long  PoolOptions;
enum
{
    poolIsPageable   = 1
};

OSStatus CreatePool     (Ref              theAddress,
                         ByteCount        maximumPoolSize,
                         ByteCount        initialPoolSize,
                         GrowPoolProc     theGrowProc,
                         PoolOptions      theOptions);
```

Creates a memory pool for subsequent allocations.

theAddress specifies the logical address at which the pool should be formed. It is the responsibility of the client to ensure the associated memory remains accessible throughout the lifetime of the pool.

maximumPoolSize specifies the maximum number of bytes of memory that could become available starting at theAddress.

initialPoolSize specifies the number of bytes of memory that are presently available starting at theAddress.

theGrowProc specifies the procedure to call when the pool becomes exhausted. This procedure may chose to increase the size of the pool, deallocate previously allocated items within the pool, or do nothing. See the section on <u>Growing Pools</u> below.

theOptions specifies optional properties of the pool.

> Note: No operation is necessary to delete pools, because CreatePool operates without allocating anything requiring deallocation.

Allocating Memory From Pools

```
Ref    PoolAllocate   (Ref         thePool,
                       ByteCount   byteSize,
                       Boolean     clear);
```

Allocates from the specified pool a chunk of memory byteSize in length. The memory address is returned as the result of the call. A nil result indicates that the GrowProc was called and the pool is exhausted.

thePool specifies the address of the memory pool. This must be the same value passed to CreatePool.

byteSize specifies the number of bytes of memory to allocate.

clear specifies whether the allocated memory is to be zeroed.

Returning Memory To Pools

```
OSStatus PoolDeallocate   (Ref         theAddress);
```

The chunk of memory at theAddress specified is returned to the pool from which it was allocated.

Obtaining Information About A Pool

```
enum
{
    poolInformationVersion  = 0
};

typedef struct PoolInformation
{
    GrowPoolProc   growProc;
    PoolOptions    options;
    ByteCount      currentSize;
```

```
    ByteCount       maximumSize;
    ByteCount       allocatedBytes;
    ByteCount       freeBytes;
    ByteCount       largestFreeChunk;
};

OSStatus GetPoolInformation  (Ref              thePool,
                              PBVersion        theVersion,
                              PoolInformation * theInfo);
```

GetPoolInformation returns information about the specified memory pool.

thePool specifies the logical address of the beginning of the pool.

theVersion specifies the version number of PoolInformation to be returned. This provides backwards compatibility. poolInformationVersion is the version of PoolInformation defined in the current interface.

theInfo specifies where to return the information.

The fields of a PoolInformation structure are:

- growPoolProc indicates the procedure to call when the pool becomes exhausted.

- options indicates the optional properties of the pool.

- currentSize indicates the number of bytes of memory, starting at thePool, that are currently part of the pool.

- maximumSize is the maximum pool size value specified when the pool was created.

- allocatedBytes indicates the number of bytes of memory which are currently allocated from the pool, including overhead.

- freeBytes is the total number of bytes of storage currently available for allocation within the Pool.

- largestFreeChunk is the size of the largest allocation which could be performed without extending the Pool.

Note that all of the information returned by GetPoolInformation indicates the current state of the pool. An allocation from the pool which is larger than largestFreeChunk may well succeed if the pool was created in a manner which allows it to grow.

Using The Kernel Pools

You can use the preallocated kernel pools when allocating your data. Two such kernel pools exist. One is always physically resident, the other is pageable. These pools may be used by specifying either of the following values for thePool parameter to PoolAllocate.

```
enum
{
    systemResidentPool   = 1,
    systemPageablePool   = 2
};
```

Growing A Pool

When PoolAllocate is called and thePool does not contain sufficient memory to satisfy the allocation, the GrowProc is called. The GrowProc is provided with information describing the current size of the pool, the size of the allocation, and the maximum size to which the pool is allowed to grow.

The GrowProc returns a ByteCount indicating the results of its efforts. The meaning of the ByteCount and the actions taken by the Pool Manager are as follows.

If the GrowProc returns a value of zero the PoolAllocate request fails and control returns to the caller of PoolAllocate.

If the GrowProc returns a value that is equal to the pool's current size (the same value provided to the GrowProc) the allocation is retried with the presumption that the GrowProc deallocated some of the pool's contents and that the allocation may now succeed. Should the subsequent allocation fail, the GrowProc will be called again.

If the GrowProc returns a value that is larger than the pool's current size (the value provided to the GrowProc) then the pool is grown to that new size and the allocation is retried with this new pool size. Should the subsequent allocation fail, theGrowProc will be called again.

The GrowProc should never return a value between zero and the current size of the pool. Similarly, it should never return a value that is greater than the maximum size of the pool. Finally, if the GrowProc cannot either grow the pool or free some of the contents of the pool, it must return a value of zero. Failure to return a value of zero will cause the allocation and the call to the GrowProc to repeat forever.

MESSAGING

For the purposes of discussion, the message system is decomposed into sections on the management of message ports, objects, filters, and finally, the messaging operations themselves, namely send, receive, reply, cancel, forward, and continue.

Message Port Management

Message ports are abstract entities used to receive messages. The kernel provides operations for the creation, deletion, and maintenance of message ports.

Ports, like other kernel objects are referenced by ID.

```
typedef KernelID  PortID;
```

Creating Message Ports

When a message port is created, it contains all kernel resources needed to receive and reply to messages that are sent synchronously. Additional resources are needed by the kernel for each asynchronous operation (sends and receives) that occur simultaneously.

The creator of the message port must specify how many concurrent asynchronous sends and concurrent asynchronous receive operations the port will be capable of handling. If these limits are exceeded during subsequent asynchronous send and receive operations, those operations will block until such time as the port's resources become available. Senders and receivers can request, at the time an asynchronous send or receive request is made, that if these limits are exceeded and they are about to be blocked, that an error is instead returned and the request not be fulfilled.

```
typedef   long   AsyncOperationCount;

OSStatus CreatePort (PortOptions          theOptions,
                     AsyncOperationCount  asyncReceiveLimit,
                     AsyncOperationCount  asyncSendLimit,
                     PortID *             thePort);
``` theOptions control the details of port creation. Currently no options are supported and a value of nilOptions should be specified.

asyncReceiveLimit specifies the maximum number of simultaneous asynchronous receive operations that can be handled by the port.

asyncSendLimit specifies the maximum number of simultaneous asynchronous send operations that can be handled by the port.

thePort is updated with the ID of the newly created message port.

Deleting Message Ports

Deletion of a message port deletes all associated message objects. As a result of deleting the associated objects, any outstanding send requests to those objects, and therefore the port, are completed with appropriate status. Further, any outstanding receive requests to the port are similarly completed with appropriate status.

After deletion, the port's ID becomes invalid and subsequent attempts to use it result in an error.

```
OSStatus DeletePort   (PortID thePort);
```

Changing The Asynchronous Operation Limits Of A Port

You can adjust the number of concurrent non-blocking asynchronous send and receive operations that a given port can handle. If this service is used to reduce the number of simultaneously available resources, and those resources are already in use, the caller is blocked until the resources are free and they can be deallocated.

```
OSStatus AdjustPortAsyncLimits   (PortID              thePort,
                                  AsyncOperationCount asyncReceiveLimit,
                                  AsyncOperationCount asyncSendLimit,
                                  Boolean             isAbsolute);
``` thePort specifies the port to adjust.

asyncReceiveLimit is either an absolute or relative number of asynchronous receive operations that the port is to become capable of handling.

asyncReceiveLimit is either an absolute or relative number of asynchronous send operations that the port is to become capable of handling.

isAbsolute controls whether the asyncReceiveCount and asyncSendLimit are absolute or relative values. If true, those values become the new limits. If false, those values are added to the present limit (negative values decrease the limits and positive values increase the limits).

Obtaining Information About A Port

You can request information about a given port. Various information regarding the current state of the message port and how it was created are returned.

```
typedef struct MessagePortInformation
{
    TeamID          owningTeam;
    ItemCount       objectCount;
```

```
    AsyncOperationCount   asyncReceiveLimit;
    AsyncOperationCount   asyncSendLimit;
    ItemCount             pendingReceives;
    ItemCount             pendingSends;
    ItemCount             pendingReplies;
    ItemCount             transactionCount;
    AsyncOperationCount   blockedAsyncSenders;
    AsyncOperationCount   blockedAsyncReceivers;
} MessagePortInformation;

OSStatus GetPortInformation   (PortID                 thePort,
                               PBVersion              theVersion,
                               MessagePortInformation theInfo);
``` thePort is the ID of a message port about which you want information.

theVersion specifies the version number of PortInformation to be returned. This provides backwards compatibility. portInfoVersion is the version of PortInformation defined in the current interface.

theInfo is the address of a MessagePortInformation record that will be filled in with information about the message port.

After a call to GetPortInformation, your MessagePortInformation is filled in with the following information:

- owningTeam is the ID of the team that created the message port.

- objectsCount is the number of message objects that are currently associated with the message port.

- asyncReceiveLimit is the number of simultaneous asynchronous receive operations that the port is capable of handling. This is the value that was specified when the port was created or by a subsequent call to AdjustPortAsyncLimits.

- asyncSendLimit is the number of simultaneous asynchronous send operations that the port is capable of handling. This is the value that was specified when the port was created or by a subsequent call to AdjustPortAsyncLimits.

- pendingReceives indicates the number of receive requests that have been made of the port but have not yet been matched with any message.

- pendingSends indicates the number of send requests that have been made to message objects associated with the port but have not yet been matched to any receive request.

- PendingReplies indicates the number of send requests that have been made to message objects associated with the port and have been received but to which no reply has been issued.

- transactionCount is the total number of send-receive-reply transactions that have taken place across this message port since the time it was created.

- blockedAsyncSenders indicates the number of asynchronous senders that have issued requests but been blocked because of the asyncSendLimit.

- blockedAsyncRecievers indicates the number of asynchronous receivers that have issues requests but been blocked because of the asyncReceiveLimit.

Iterating Over Message Ports

You can find all the message ports in the system by using the following function.

```
OSStatus GetPortsInSystem (ItemCount      theCount,
                           ItemCount      skipCount,
                           KernelIterator * thePorts);
``` theCount indicates the maximum number of message port IDs to return.

skipCount indicates the number of message port IDs to ignore prior to returning any message port IDs.

thePorts is filled in with the IDs of the ports specified by theCount and skipCount. This KernelIterator must be large enough to store at least theCount port IDs.

Message Object Management

Message objects are the abstract entities to which messages are sent. Objects are associated with exactly one port. This association may be changed. Messages sent to objects are received from the object's associated port.

Message objects contain a reference constant. This reference constant, typically a control block address, is copied from the object into the message at the time a message is sent through the object to a port.

Message objects may have a designated client team. Newly created message objects have no such client designated. Part of the processing performed by the kernel during team termination includes sending messages to any objects whose client is the terminating team  This ability allows servers to reclaim message objects whose clients have terminated.

The kernel provides services for the creation, deletion, and maintenance of message objects.

Like all kernel objects, message objects are referenced by ID.

```
typedef  KernelID  ObjectID;
```

Creating Message Objects

Creation of message objects requires that you specify a port with which the object is initially associated. You must also specify an initial value for the object's refcon. Once created, the message object is immediately eligible to be the target of send requests.

```
OSStatus CreateObject   (PortID          thePort,
                         ObjectRefcon    theRefcon,
                         ObjectOptions   theOptions,
                         ObjectID *      theObject);
``` thePort indicates the port with which the message object is to be associated. Messages sent to the object being created will appear at this port.

theRefcon indicates the value of the message object's refcon. This value will be copied from the object being created into messages at the time they are sent through the object and placed into the object's port.

theOptions is used to specify special object attributes. The following options are supported:

```
typedef OptionBits   ObjectOptions;
enum
{
    objectForbidsFilters = 0x00000001,
    objectIsFilter       = 0x00000002
};
``` theObject is updated with the newly created message object's ID.

objectForbidsFilters indicates that the object may not be the target of a filter.

objectIsFilter indicates that the object can be used as part of a filter (i.e. a preprocessor or postprocessor).

Deleting Message Objects

Deletion of a message object implies replying to any messages that have been sent to the object but have not as yet been received from the object's port. These send requests are made to complete with appropriate status. After deletion, the object's ID becomes invalid and subsequent attempts to use it are erroneous. Such attempts usually result in errors. Deletion of a message object also unlocks the object. Any tasks waiting for the lock are given an error result.

```
OSStatus DeleteObject    (ObjectID   theObject);
```

Locking Message Objects

Message objects can be locked. Once locked, messages sent to the object cannot be received until the object is unlocked. Multiple tasks may attempt to lock an object. However, only one task is granted the lock. Any other tasks are blocked in priority order awaiting the lock.

```
typedef OptionBits    ObjectLockOptions;
enum
{
    lockObjectWithOneMessage    = 0x00000001
};

OSStatus LockObject (ObjectID           theObject,
                     ObjectLockOptions  theOptions,
                     Duration           timeLimit);
``` theObject is the ID of the message object to be locked.

theOptions control the behavior of the request to lock the designated object. The lockObjectWithOneMessage option controls the number of messages that have been received but not replied when the lock request is satisfied. If this option is specified the number of such messages is exactly one; in the absence of this options the number of such messages is exactly zero.

timeLimit places a maximum waiting limit on the LockObject operation. If the timeLimit is exceeded, LockObject fails and returns an error.

Unlocking Message Objects

The UnLockObject service is used to release the lock on a message object.

```
OSStatus UnLockObject   (ObjectID    theObject);
``` theObject specifies the locked object that is to be unlocked.

Obtaining Information About An Object

Given the ID of a message object, you can obtain the ID of the port with which it is currently associated, the Team which is the Object's client, and the Refcon currently associated with the Object.

```
OSStatus GetObjectInformation    (ObjectID       theObject,
                                  TeamID  *      theClient,
                                  PortID  *      thePort,
                                  ObjectRefcon * theRefcon);
``` theObject is the ID of an object about which information is to be returned.

theClient is updated to indicate the current client team of the object.

thePort is update to indicate the ID of the Port to which this object belongs.

theRefcon is updated to indicate the object's current Refcon.

Changing Information About An Object

```
enum
{
   setObjectClient   = 0x00000001,
   setObjectPort     = 0x00000002,
   setObjectRefcon   = 0x00000004
};
typedef unsigned long SetObjectOptions;

OSStatus SetObjectInformation    (ObjectID          theObject,
                                  SetObjectOptions  theOptions,
                                  TeamID            theClient,
                                  PortID            thePort,
                                  ObjectRefcon      theRefcon);
``` theObject is the ID of an object about which information is to be returned.

theOptions controls which, if any, of the objects information is changed. This value is a mask formed by ORing together the values setObjectClient, setObjectPort, and setObjectRefcon.

theClient is the ID of a team to be associated with the object. A kernel message will be sent to the object when this team is terminated. This value is only used if theOptions includes the setObjectClient bit.

thePort is the ID of a port to which this object will be moved. This value is only used if theOptions includes the setObjectPort bit. Changing an object's port causes any un-received messages to be forwarded from the old to new port.

theRefcon is the Refcon value that will be associated with the object. This value is only used if theOptions includes the setObjectRefcon bit.

Iterating Over Objects

You can iterate over all of the message objects associated with a particular message port.

```
OSStatus GetObjectsInPort (PortID             thePort,
                           ItemCount          theCount,
```

```
ItemCount      skipCount,
KernelIterator *  thePorts);
``` thePort specifies the ID of the message port whose objects are to be returned.

theCount indicates the maximum number of message object IDs that are to be returned.

skipCount indicates the number of message object IDs to ignore prior to returning any message object IDs.

thePorts is filled in with the IDs of the object specified by theCount and skipCount. This KernelIterator must be large enough to store at least theCount object IDs.

Message Filter Management

Message filters screen an object's messages. An installed filter is designated by ID.

```
typedef  KernelID FilterID;
```

Installing Filters

The following *specification* is used to install a filter.

```
typedef OSType     FilterService;
typedef OSType     FilterSignature;

enum
{
   MatchAnyFilterService        = '****',
   MatchAnyFilterSignature      = '****',
   DoNotMatchAnyFilterService   = '----',
   DoNotMatchAnyFilterSignature = '----'
};

typedef struct FilterName
{
   FilterService      theService;
   FilterSignature    theSignature;
} FilterName;

typedef struct FilterOrder
{
   FilterName      aFilterBefore;
   FilterName      aFilterAfter;
} FilterOrder;

typedef struct FilterObjectPair
{
   ObjectID        thePreProcessor;
   ObjectID        thePostProcessor;
} FilterObjectPair;

typedef struct FilterSpecification
{
   FilterName        theName;
   MessageType       theTypesToFilter;
   FilterOrder       thePlacement;
   FilterObjectPair  theObjects;
} FilterSpecification;
```

Installation of filters requires that you provide a target object ID and a filter specification. Once installed, the message filter is immediately eligible to screen messages bound for the target. The result of a successful installation is a filter ID.

```
OSStatus InstallFilter  (ObjectID                  theTargetObject,
                         FilterOptions             theOptions,
                         FilterSpecification *     theFilter,
                         FilterID *                theFilterID);
``` theTargetObject indicates the object with which the message filter is to be associated.

theOptions indicates any special installation requirements. The following filter placement options are supported:

```
enum
{
    filterIsRightBefore  = 0x00000001,
    filterIsRightAfter   = 0x00000002
};
typedef OptionBits FilterOptions;
```

The option filterIsRightBefore causes the new filter to be installed directly adjacent and before the specified "aFilterBefore" filter.

The option filterIsRightAfter causes the new filter to be installed directly adjacent and after the specified "aFilterAfter" filter.

theFilter is the address of a filter specification.

theFilterID gets the resulting ID of the installed filter.

Removing Filters

The RemoveFilter service is used to eliminate an installed filter.

```
OSStatus RemoveFilter   (FilterID    theFilterID);
``` theFilterID specifies the filter to eliminate.

Obtaining Information About A Filter

Given the ID of a filter, you can obtain the ID of the target object and the specification used to install the filter.

```
OSStatus GetFilterInformation   (FilterID              theFilterID,
                                 ObjectID *            theTargetObject,
                                 FilterSpecification *theFilter);
``` theFilterID is the ID of a filter about which information is to be returned.

theTargetObject is updated to indicate the ID of the filter's target object.

theFilter is updated to contain the specification used during installation.

Iterating Over Filters

You can iterate over all of the filters associated with a message object. Filters are returned in the order they appear in the chain, not in the order of installation.

```
OSStatus LookupFilters    (ObjectID         theTargetObject,
                           ItemCount        theCount,
                           ItemCount        skipCount,
                           KernelIterator * theFilters);
``` theTargetObject specifies the ID of the message object whose filters are to be returned.

theCount indicates the maximum number of filter IDs that are to be returned.

skipCount indicates the number of filter IDs to ignore prior to returning any filter IDs.

theFilters is filled in with the IDs of the filter specified by theCount and skipCount. This KernelIterator must be large enough to store at least theCount filter IDs.

About Message Transactions

A message transaction is begun with a send. Once begun, the transaction is *in-progress* until it completes. Transactions are completed by either a reply or by cancellation of the send request.

At the time a reply is issued for a previously received message, the receiver supplied a status indication that is returned to the sender of the message. This status value is called the reply status.

Message IDs

All message transactions can be identified by a particular message ID. The ID of an individual message transaction is used to query or alter the state of a transaction. Every message system operation (with the exception of the synchronous send operation) either requires that you specify a message ID or returns a message ID.

```
typedef KernelID MessageID;
```

Message Types

Each message that is sent is accompanied by a message type. When a server makes receive requests it may indicate that it only wants to receive messages of a certain type. These message types help to classify the message in a manner agreed upon between the client and server. You can use message types to prioritize message importance, differentiate between kinds of requests, or other purposes.

Message types are 32-bit values which are interpreted as an array of 32 bits. A sender specifies the type of message being sent by passing a message type with one or more bits set. A receiver specifies the type of message it wishes to receive by specifying a message type with one or more bits set. A particular receive request will only be satisfied if the logical AND of the sender's message type and the receiver's message type is non-zero.

```
typedef unsigned long   MessageType;
```

Notice that a message sent with a message type value of zero, cannot match any receiver using the rules described above. However, a receive request that specifies a message type value of 0xFFFFFFFF will match any message, even those with a type value of zero.

Kernel Messages

NuKernel reserves the most significant bit of the message type parameter to indicate that the message is a *kernel message*. All messages sent by the kernel are of the kernel message type. These messages are used to perform various system management functions including the initialization and finalization of agents as well as canceling requests. The use of these messages is discussed in the Message Cancellation section of this chapter and the chapter on Agents.

> Note: Clients of the kernel should refrain from sending messages with the kernel message type.

```
enum
{
    kernelMessageType      = 0x80000000,
    allMessages            = 0xFFFFFFFF
};
```

Each kernel message begins with a common header that allows the various messages to be distinguished. Individual kernel messages are described throughout this document. Some definitions useful when handling kernel messages are:

```
typedef struct KernelMessageHeader
{
    unsigned long  messageCode;
} KernelMessageHeader;
```

Sending Messages

Clients request actions by sending messages to objects. For example, if you want to read ten bytes of data from serial port A you send a message to the object which represents serial port A. The message describes the nature of the actions you want the object to perform, in this case the message would indicate a read request with a byte count of ten.

Messages, from the perspective of the kernel, are simply a set of memory locations described by a single address/byte count pair. It is the responsibility of the sender to insure that, from the time the send is initiated until the time the send completes, the contents of those memory locations remain intact. This means, for example, that a message that is sent asynchronously should not be allocated on the stack of the sender unless the sender can guarantee that the contents of the stack frame will remain valid until a reply is received or the send is canceled.

The descriptive nature of messages form an agreement between client and server, they are not examined or interpreted by the kernel.

Send Options

When you send a message, you may control certain aspects of the message transmission through use of the SendOptions parameter. These options are described below:

```
typedef    OptionBits   SendOptions;
enum
{
    sendByReference      = 0x00000001,
    sendByValue          = 0x00000002,
    sendNonBlocking      = 0x00000004,
    sendIsPrivileged     = 0x00000008,
    sendIsAtomic         = 0x00000010
};
```

- The *sendByReference* option causes just the address of the sender's message to be placed into the receiver's buffer. If the message sender is in an address space different from that of the message receiver, this option causes the message to be mapped into the receivers address space. Such mappings are eliminated when the transaction, initiated by the send, completes, or the message is forwarded to a receiver in another address space. This option must be specified if the intent of the transaction is for the sender to receive data in the message buffer.

- The *sendByValue* option causes the kernel to copy the contents of the sender's buffer into the receiver's buffer.

- By default, asynchronous send operations will block if the limit on concurrent asynchronous sends is exceeded on the object's message port. If you specify the *sendNonBlocking* option on an asynchronous send and the message port to which the message will be queued has exceeded its concurrent asynchronous send limit, you will not be blocked but rather receive an immediate error indication.

- The *sendIsPrivileged* option bit is set by the kernel on behalf of a privileged sender task. If a non-privileged sender attempts to set this option bit, the kernel will clear it before passing the message to a receiver.

- The *sendIsAtomic* option bit causes the kernel to lock the object until a Reply or Forward is issued.

Synchronous Sends

Synchronous message sends behave like a subroutine call. An optional time-out value may be used by the sender to place an upper limit on the overall transaction. Synchronous sends cause the sending task context to block until the receiver has issued a reply or the request has timed out.

Should the time limit be exceeded, the message system will cancel the incomplete message transaction. If the message has not yet been received a . If the message has been received, the effect of the cancellation is up to the receiver. Cancellation is described in the Canceling Message Requests section of this chapter.

Synchronously sent messages are placed at the end of the message queue of the port associated with the object to which the message is sent. The message will be processed when it is matched to a receiver. This matching is controlled by message type and order within the queue.

Synchronous send requests cannot be explicitly canceled. They are only canceled implicitly as a result of a timeout.

The kernel may decide to map the sender's reply and contents buffers into the receiver's address space. Any such mapping is eliminated upon reply.

```
OSStatus SendMessage           (ObjectID      theObject,
                                MessageType   theType,
                                Ref           theMessage,
                                ByteCount     theMessageSize,
                                Ref           theReplyBuffer,
                                ByteCount   * theReplyBufferSize,
                                SendOptions   theOptions,
                                Duration      timeLimit);
``` theObject specifies the destination object.

theType specifies the type of message.

theMessage specifies the address of the outgoing message data. A Null value indicates no contents. The sender should not access this buffer until the transaction completes.

theMessageSize specifies the length of the outgoing message data.

theReplyBuffer specifies the address of a buffer to be used for the server's reply data. A Null value indicates no reply data is desired. The kernel may choose to map this buffer into the receiver's address space. The sender should not access this buffer until the transaction completes.

theReplyBufferSize specifies the size of the reply buffer. This parameter is both an in and out value. On input it specifies the size of the sender's reply buffer. Upon completion of the send, it holds the number of bytes transferred into the reply buffer.

theOptions specifies a bit mask of send options. These options are passed along to the server at the time it receives the message.

timeLimit specifies a time after which an automatic *cancellation* is performed by the message system. A time-out value of durationForever specifies no such automatic cancellation. A time-out value of durationImmediate specifies that a cancellation take place if the message cannot be immediately matched to a receiver; if such a match is possible then no further time constraint is placed upon the transaction. A complete description of the type Duration is given in the section Basic Types.

Asynchronous Sends

An asynchronous send allows the sending task context to continue execution while the transaction remains incomplete. You'll receive notification that the transaction has completed in a manner governed by the EventNotification you provide at the time you send the message.

Asynchronously sent messages are placed into the message queue of the port associated with the object to which the message is sent. The message will be processed when it is matched to a receiver. This matching is controlled by message type and order within the queue.

The kernel may decide to map the sender's reply buffer into the receiver's address space. Any such mapping is eliminated upon reply.

```
OSStatus SendMessageAsync (ObjectID            theObject,
                           MessageType         theType,
                           Ref                 theMessage,
                           ByteCount           theMessageLength,
                           Ref                 theReplyBuffer,
                           ByteCount           theReplyBufferSize,
                           SendOptions         theOptions,
                           EventNotification * theNotification,
                           MessageID *         theMessageID);
``` theObject specifies the destination object.

theType specifies the type of message.

theMessage specifies the address of the message data.

theMessageSize specifies the length of the message data.

theReplyBuffer specifies the address of a buffer to be used for the server's reply data. A Null value indicates no reply data is desired. The kernel may choose to map this buffer into the receiver's address space. The sender should not access this buffer until the transaction completes.

theReplyBufferSize specifies the size of the reply buffer. This parameter is both an in and out value. On input it specifies the size of the sender's reply buffer. Upon completion of the send, it holds the number of bytes transferred into the reply buffer.

theOptions specifies a bit mask of send options. These options are passed along to the server at the time it receives the message.

theNotification specifies an asynchronous event completion record. This event will be delivered when the transaction completes.

theMessageID specifies the address of a message id. The message system stores an ID for the transaction at this address. This ID may be used by the sender to cancel the transaction.

Receiving Messages

Servers must inform the message system that they want to receive messages. This is done in one of three ways: synchronous receives, asynchronous receives, or message acceptance functions.

Synchronous and asynchronous receives are requests for a single message of one or more message types. The receive request is satisfied if a message of suitable type is already present in the queue at the time the receive request is made or arrives in the queue within the time limit, if any. Once the match between sent message and receive request has been made, processing of the message happens in the context of the task that made the receive request. To receive subsequent messages the receiver must make additional receive requests.

Multiple receives, either synchronous or asynchronous, may be pending upon a single port simultaneously. These requests may be for separate message types or for the same message type. When new messages arrive at the port, receivers are matched in the order that their receive requests were made.

Message acceptance is quite different from either synchronous or asynchronous receive requests. When you register a message acceptance function with a message port, that function will be called for every message sent to that port so long as the message type specified by the sender matches the message type specified by the receiver. When you no longer want to accept messages from the port you must unregister your acceptance function.

> Note: Unlike synchronous or asynchronous receive requests, an acceptance function never sees messages which were in the port's message queue prior to the time the function was registered. For this reason it is strongly suggested that the server register any acceptance function just after creating the port and prior to creating any message objects. This will ensure that no messages are queued prior to the registration of the acceptance function.

Acceptance functions are always called in the task context of the sending or forwarding task. The function executes in supervisor mode on the kernel stack of the current task. Because of this, the acceptance function and everything it calls must reside within the kernel band so that it can be addressed successfully.

> Note: This may only be accomplished if the acceptance function is part of an Agent as agents are the only mechanism for loading code into the kernel band.

Receive Options

When you receive a message, you may control certain aspects of the message transmission through use of the ReceiveOptions parameter. These options are described below:

```
typedef  OptionBits ReceiveOptions;
enum
{
   receiveBufferNoBlock         = 0x00000001,
   receiveNoAddressTranslation  = 0x00000002,
   receivePeekOnly              = 0x00000004,
};
```

- By default, asynchronous receive operations will cause the receiver to block if the limit on concurrent asynchronous receives is exceeded on the message port. If the receiveNonBlocking option is specified on an asynchronous receive request and the message port has exceeded its concurrent asynchronous receive limit, the receiver will not be blocked but rather received an immediate error indication.

- By default, the message system makes the sender's message addressable by the receiver. This may involve either mapping or copying the message contents if the sender and receiver reside in different address spaces. To prevent either of these operations, the receiver can specify the receiveNoAddressTranslation option. In this case, the receiver must, prior to accessing the message, insure that its contents are addressable.

- By default, when a message is received it is removed from the queue of sent messages, will not be seen by subsequent receive operations, and must be replied to. When the receivePeekOnly option is specified, the message is not removed from the queue of sent messages, will be seen by subsequent receive operations and must not be replied to. Peeking at messages allows a receiver to determine whether messages of a certain type are present prior to actually receiving them. Note that the contents of the message is never returned when the receivePeekOnly option is specified. Only the MessageControlBlock is given to the receiver.

Message Control Blocks

When you actually receive a message, the message system provides you with a control block which describes the message you've received. This control block indicates both the address and length of the senders message and also provides additional information including the message type, options specified by the sender, etc.

The control block is built in different places depending on the kind of receive operation you make. Synchronous and asynchronous receives cause the control block to be constructed in a buffer you must supply when you make the receive request. Acceptance function receives cause the control block to be constructed within the kernel prior to calling your function.

```
typedef struct MessageControlBlock
{
    MessageID       theID;
    AddressSpaceID  theAddressSpaceID;
    AddressSpaceID  theTeamID;
    ObjectRefcon    theRefcon;
    SendOptions     theOptions;
    MessageType     theType;
    OSStatus        theCurrentResults;
    ByteCount       theSize;
    Ref             theMessageContents;
    ByteCount       theReplyBufferSize;
    Ref             theReplyBuffer;
    long            reserved;
} MessageControlBlock;
```

- theID is an ID that represents this send-receive-reply transaction. As the receiver of a message, you use this ID to reply to the message. If the message was sent asynchronously, this is the same ID returned to the sender at the time of the send. The sender can use the ID to cancel the send. As the receiver of a message you should be prepared to handle cancel requests for messages that you have received but to which you have not yet replied; you'll need this ID to process such cancel requests. Cancellation of messages is discussed later in this document. This ID may also be used to continue or forward the message.

- theAddressSpaceID is the ID of the sending task's address space. This is provided for servers wishing to map portions of the sender's address space.

- theTeamID is the ID of the sending task's team. This is provided for servers wishing to verify object permissions and clients.

- theRefcon is the refcon of the object to which the sender sent the message.

- theOptions are the send options as specified by the sender.

- theType is the message type as specified by the sender.

- theCurrentResults is the status supplied by a ReplyToMessage. Post-processing filters may use this field to distinguish a cancel from a reply.

- theSize is the message size, in bytes, as specified by the sender.

- theMessageContents is the address at which you can find the message. This will either point to the sender's original message or into the buffer you specified at the time you made the receive request.

- theReplyBufferSize is the size of the sender's reply buffer specified in the SendMessage service. A zero value indicates that the sender does not have a reply buffer.

- theReplyBuffer is the address at which you can find the sender's reply buffer. This will either point to the sender's original reply buffer or be nil. A nil value indicates that the sender either doesn't have a reply buffer, or the kernel chose not to map it. If the reply buffer exists (theReplyBufferSize is not zero), the server can use the ReplyToMessage service to copy back the reply data.

Receiving Messages Synchronously

Synchronous receives cause the receiving task to block until a message arrives at the specified port that can be matched to the receive request. An optional time-out value may be used to place an upper limit upon the time that the receive waits for incoming messages. Should this time limit be exceeded, the message system removes the request and unblocks the calling task. In this case, you'll receive an indication that no messages of suitable type arrived and that the request was terminated.

```
OSStatus ReceiveMessage   (PortID                  thePort,
                           MessageType             theType,
                           MessageControlBlock *   theBuffer,
                           ByteCount               theBufferSize,
                           ReceiveOptions          theOptions,
                           Duration                timeLimit);
``` thePort specifies the port from which you wish to receive messages.

theType specifies the type of message you wish to receive.

theBuffer specifies the address of a receive buffer. The message control block describing the message you've received will be built in this buffer when a suitable message is matched to your receive request. Additionally, if the message sender did not specified the sendContentsByReference option, the contents of the senders message may be copied into this buffer.

theBufferSize specifies the total size of the receive buffer. When the receive completes, the actual number of bytes received is placed in the message header. Note that the theBufferSize must be at least the size of a message control block and must be larger than a message control block to actually receive the message from the sender.

theOptions specifies a bit mask of available receive options.

timeLimit specifies a time after which an automatic *cancellation* is performed by the message system. A time-out value of durationForever specifies that no such automatic cancellation should take place. A time-out value of durationImmediate specifies that a cancellation should take place if the receive request cannot be immediately matched with a message already at the port. A complete description of the type Duration is given in the section Basic Types.

Receiving Messages Asynchronously

An asynchronous receive allows the receiving task context to continue execution while awaiting the arrival of a message. You'll receive notification of a suitable message in a manner governed by the EventNotification you provide at the time you make the request.

When you make asynchronous receive requests you'll receive an ID that may be used at a later time to cancel the request. This ID will remain valid until you either receive a message or cancel the receive request.

```
typedef KernelID  ReceiveID;

OSStatus ReceiveMessageAsync (PortID                  thePort,
                              MessageType             theType,
                              MessageControlBlock *   theBuffer,
                              ByteCount               theBufferSize,
                              ReceiveOptions          theOptions,
                              EventNotification *     theNotification,
                              ReceiveID *             theReceiveID);
``` thePort specifies the port from which you wish to receive messages.

theType specifies the type of message to you wish to receive.

theBuffer specifies the address of a receive buffer. The message control block describing the message you've received will be built in this buffer when a suitable message is matched to your receive request. Additionally, if the message sender did not specified the sendContentsByReference option, the contents of the senders message may be copied into this buffer.

theBufferSize specifies the total size of the receive buffer. When the receive completes, the actual number of bytes received is placed in the message header. Note that the TheBufferSize must be at least the size of a message control block and must be larger than a message control block to actually receive any of the message from the sender.

theOptions specifies a bit mask of available receive options.

theNotification specifies an EventNotification that will be delivered when the receive request completes.

theReceive specifies the address of receive ID. The message system stores the ID of the in-progress receive at this address. The receiver may use this ID to cancel the in-progress receive operation.

Accepting Messages

Accepting messages establishes an acceptance function as the recipient of all messages of a given type that are sent to a specific message port. At the time a message arrives at a port, the port is examined for eligible receivers. If an acceptance function has been registered and matches the type of the sent message it is called, in the context of the sending task, in lieu of any of other receivers which may be present. At most, one acceptance function may be registered with a given message port.

When the message acceptance function is called it is provided with a single parameter, a pointer to the message control block that describes the message. The function is called in supervisor mode and runs on the kernel mode stack of the sending or forwarding task. Therefore, such routines must be loaded into the kernel band of the logical address space. This is only possible if the subroutine is part of a NuKernel Agent.

Just like other message receivers, the message acceptor must reply to the sent message. Acceptance functions can use the ReplyToMessage kernel service to explicitly reply to the message (ReplyToMessage is described later).

Acceptance functions can cause an implicit reply to the message being processed by returning any OSStatus value other than kernelIncompleteErr. The status returned will be used by the kernel as if it were passed in an explicit call to ReplyToMessage.

If, at the time the acceptor function returns, no explicit reply has been generated and the status value returned is kernelIncompleteErr, then the sending task will be blocked if the send operation was synchronous. Under these conditions, the sending task will not become eligible for execution until either a reply is issued or the time limit specified by the sender is exhausted.

While an acceptance function is executing, the sending or forwarding task is still preemptable. This means that a separate task could perform another send operation which causes the acceptance function to be re-entered. Because of this, your acceptance function, and all other software it calls, must be reentrant.

When implementing lightweight services that must be serialized, it is frequently the case that upon accepting a message the acceptance function transfers control to secondary interrupt level to serialize requests. As a further optimization the message system allows you to specify that your acceptance function should be called at secondary interrupt level. This option is specified at the time that you register your acceptance function with the message port.

Whenever an acceptance function is registered for a particular port, an exception handler must also be registered. This exception handler will be invoked should an exception arise during the processing performed by the acceptance function. This handler receives control in lieu of the sending task's handler.

```
typedef OSStatus (*MessageAcceptor) (MessageControlBlock * theMessage);

enum
{
    acceptAsSecondaryInterruptHandler   = 0x00000001
};
typedef unsigned long AcceptOptions;
```

```
OSStatus AcceptMessage (PortID            thePort,
                        MessageType       theType,
                        MessageAcceptor   theProc,
                        ExceptionHandler  theHandler,
                        AcceptOptions     theOptions);
``` thePort specifies a port from which messages are to be accepted.

theType specifies a bit mask of acceptable message types.

theAcceptor specifies an acceptance function.

theHandler specifies an exception handling routine that will receive control should the acceptance function cause an exception.

theOptions specifies a bit mask of available accept options. The only supported option, acceptAsSecondaryInterruptHandler, causes your acceptance function to be called at secondary interrupt level.

Replying To Messages

After a message has been sent and received, the receiver performs the request implied by the message. When the request has been processed, or the receiver decides it cannot complete the request for whatever reasons, the receiver must inform the sender of the transaction's status. This is done by replying to the message. Replying to a message completes a message transaction.

You must identify the message to which you are replying; this is done by passing the message ID to reply. The message ID is provided to a receiver in the message control block.

In addition to the ID, the server must supply a status value. This status is not examined or interpreted by the message system. Rather, it is passed back to the sender.

As a result of a reply, the message system takes several actions. If the send was performed synchronously, the status value is stored in the requested location and the sending task is unblocked. If the send was performed asynchronously, then the requested notification is delivered. Finally, any message buffer mapping that was created is eliminated.

If a reply buffer was specified by the sender, the kernel may choose to supply its address and size in the MessageControlBlock. If the sender's reply buffer address is supplied by the kernel, the receiver may use it to directly transfer the result data. If the sender's reply buffer address is not supplied by the kernel, the receiver can use reply to copy the reply data back to the sender.

```
OSStatus ReplyToMessage         (MessageID      theMessage,
                                 OSStatus       theResults,
                                 Ref            theReplyBuffer,
                                 ByteCount      theReplyBufferSize);
``` theMessage specifies the ID of a message.

theStatus specifies the status value to return to the sender. If the message was sent synchronously, theStatus becomes the return value to SendMessage. If the message was sent asynchronously, theStatus is returned through the event notification record's status field.

theReplyBuffer specifies the address of the reply data. The kernel will copy the data from receiver to sender. A nil value indicates no reply data should be delivered to the sender.

theReplyBufferSize indicates the size of the reply data. If theReplyBufferSize is greater than the size of the sender's reply buffer, the reply data is truncated to the sender's size.

Replying To A Message And Receiving Another

A special purpose service combining reply with a synchronous receive is also provided. The reply is performed first, followed by the synchronous receive. All parameters behave as described in ReplyToMessage and ReceiveMessage sections of this document. A MessageID of nil will inform the kernel to skip the reply step.

```
OSStatus ReplyToMessageAndReceive(MessageID      theMessage,
                    OSStatus              theResults,
                    Ref                   theReplyBuffer,
                    ByteCount             theReplyBufferSize,
                    PortID                thePort,
                    MessageType           theType,
                    MessageControlBlock  *theBuffer,
                    ByteCount             theBufferSize,
                    ReceiveOptions        theOptions,
                    Duration              timeLimit);
```

Forwarding Messages

The process of passing the message along is called *forwarding* the message. Forwarding moves a message to another message object. Forwarding is primarily used as a dynamic message routing aid. In fact, the entire message filtering mechansim is built upon the forward operation.

There are no restrictions upon the number of times a message may be forwarded. No audit trail of forwarders is kept <u>unless remaining postprocessor filter objects require processing</u>. All remaining postprocessors are activated upon ReplyToMessage. The original sender of a message is not notified that the message has been forwarded.

Once a message has been forwarded no further actions should be performed upon that message by the receiver. Received messages should be either replied to or forwarded but not both. When a message is forwarded, any message buffer mapping that was performed for the receiver is eliminated.

```
OSStatus ForwardMessage    (MessageID    theMessage,
                   ObjectID     theObject);
                   SendOptions  theOptions);
``` theMessage specifies the message to forward.

theObject specifies the destination object to which the message should be forwarded.

theOptions specifies the new send options to use.

Continuing Messages

The process of passing a message along to the next object in a filter chain is called *continuing* the message. ContinueMessage acts as an *automatic* forward. However, the ContinueMessage service will issue a ReplyToMessage if all objects in the chain have processed the message.

```
OSStatus ContinueMessage        (MessageID    theMessage,
                                 SendOptions  theOptions,
                                 OSStatus     theResults,
                                 Ref          theReplyBuffer,
                                 ByteCount    theReplyBufferSize);
``` theMessage specifies the message to continue.

theOptions specifies the new send options to use when forwarding the message to the next object in the filter chain.

theStatus specifies the status value to return to the sender. If the message was sent synchronously, theStatus becomes the return value to SendMessage. If the message was sent asynchronously, theStatus is returned through the event notification record's status field.

theReplyBuffer specifies the address of the reply data. The kernel will <u>copy</u> the data from receiver to sender. A nil value indicates no reply data should be delivered to the sender.

theReplyBufferSize indicates the size of the reply data. If theReplyBufferSize is greater than the size of the sender's reply buffer, the reply data is truncated to the sender's size.

Canceling Message Requests

At times it becomes necessary to withdraw pending asynchronous send or receive requests. This is frequently done when a particular service is shutting down its operation. Withdrawing these requests is termed *Canceling* them.

Because you may have several pending requests simultaneously, you must indicate the particular request you wish to cancel. The ID returned at the time the request was made is used to cancel that particular request.

Cancellation of either a send or receive request causes the request to complete with an error indication. The error indication is supplied along with the ID. The kernel does not interpret the error indication.

Cancellation of any request causes an implicit race condition between the client and the server. It is possible that the server completes the request at the same time as the client attempts to cancel the request. It is also possible for servers to ignore cancellation requests and finish the original request. In either case, it is the responsibility of the client to correctly handle these race conditions and understand that cancellation may result in either normal or abnormal completion of the request being canceled.

Send and receive requests are canceled by the kernel as a side effect of some other operations. These are:

- Deletion of a message port causes all receive requests of that port to be canceled.

- Deletion of a message port causes all messages sent to objects associated with the port to be canceled.

- Deletion of a message object causes all unreceived messages sent to that object to be canceled.

- Termination of a task causes all messages sent by that task, that have not as yet been replied to, to be canceled

- Termination of a task causes all receive requests made by that task to be canceled.

- Timeout of a message send request causes that request to be canceled.

- Timeout of a message receive request causes that request to be canceled.

- Explicit cancellation requests cause the associated request to be canceled.

Send Cancellation

Cancellation of a send request proceeds in one of two different ways. If the message has not yet been matched to a receiver no special actions are taken. In this case, the message is removed from the port. The sender is notified that the send operation has completed with status that indicates the send was canceled.

If the message has been matched with a receiver but has not as yet been replied to, the cancellation process is quite different. In this case, a kernel message is sent. This kernel message is placed in the message queue of the port from which the message was received. The kernel message contains the ID of the message being canceled.

It is up to the receiver to process the kernel message appropriately. If the receiver has replied to the message being canceled prior to receiving the cancellation kernel message, the cancel message is removed from the queue and never seen by the receiver.

If, however, the cancellation message is received prior to the time the receiver replies to the message, every attempt should be made to abort whatever work is in progress on that message. Once processing has stopped for the message being canceled, replies must be issued for both the canceled message and the kernel message.

The status given when replying to a canceled message should convey that the request was canceled. The status given when replying to the kernel message should indicate that the cancellation was handled successfully. If desired, you can reply to only the kernel message with the status value kernelCanceledErr. This value causes the message system to reply to the canceled message with the kernelCanceledErr status value, saving you the effort of replying to both messages.

The kernel service that cancels a message send operation is synchronous. It does not return to the caller until that send operation has completed.

```
OSStatus CancelMessageSend   (MessageID   theMessage,
                              OSStatus    theReason);
``` theMessage is the ID of the send request that is to be canceled.

theReason is the status value with which the send is to complete. This is the value that the asynchronous notification, if any, will be delivered.

Receive Cancellation

Cancellation of a receive request simply removes that request from the port. The receive request, by definition, has not been matched with a message so no special actions are required. The receive request is completed with status that indicates the cancellation. The receiver must check the status to disambiguate the receive being canceled from receiving a message.

```
OSStatus CancelMessageReceive   (ReceiveID   theReceive);
``` theReceive is the ID of a pending receive operation to be canceled.

Client Initiated Cancellation Messages

Servers must be prepared to receive cancellation messages in case their client's decide to cancel requests. These messages are generated by the kernel in response to calls to CancelMessageSend NuKernel service. Cancellation messages, like any other kernel message, begin with a header that describes the kernel message. The remainder of the message contains the ID of the message being canceled and a reason for cancellation. The reason, a 32-bit value, is not used by the kernel. Its meaning is part of the client-server interface.

```
enum
{
    cancelMessageCode = 3
};

typedef struct CancelMessage
```

```
{
    KernelMessageHeader    theHeader;
    MessageID              theMessage;
    OSStatus               theReason;
} CancelMessage;
```

Client Termination Notification

In most cases, servers can benefit from knowing when the client of an object has terminated. At least, the object and underlying information can be reclaimed. The message system allows a given object to be associated with a client team; the team is said to be the object's client. When a team terminates, a kernel message is sent to every object whose client is that terminating team.

Registering An Object's Client

Newly created objects have no client team associated with them. Unless a client is associated with the object, no client termination message will be sent to the object. Use the SetObjectInformation service to associate a particular team with a given message object. Each message object is capable of having at most one client. Setting the client overrides any previous client association.

Client Termination Messages

Following are the type declarations associated with the kernel messages sent for client termination notification. These kernel messages are sent while the client team still exists but while it is in the process of terminating. In response to these messages the server should refrain from creating additional kernel resources in the client team. As with all messages, the server must reply to the client termination messages.

```
enum
{
    announceClientTermination  = 4
};

typedef struct ClientTerminationMessage
{
    kernelMessageHeader    theHeader;
    TeamID                 theTeam;
} ClientTerminationMessage;
```

AGENTS

Agents are extensions to the kernel. They are accessed through the message system. Agents reside within the kernel band and execute in supervisor mode.

Agents must be explicitly installed into the kernel. At the time they are installed you must specify attributes of the agent including the kind of agent (In-line or Server), whether or not the agent is memory resident, etc in addition to providing the agent's code. These attributes are collectively called the Agent Descriptor.

Once installed, the agent can send and receive messages. The agent will exist until it is explicitly removed.

Installing Agents

Installation of an agent yields two separate values: the ID of an object and the ID of the agent itself. The object is a newly created object attached to a newly created port which is being serviced by the agent. You send messages to this object to communicate with the agent. The agent's ID may be used to remove the agent at a later time.

When you call InstallAgent, many steps are undertaken by the kernel to load, register, and activate the agent. The installation process only succeeds if each of these steps is successful. Failure at any point causes the kernel to undo the previous steps and return the failure indication.

The agent loading process involves copying the agent's code into the kernel band and performing whatever relocation and static initialization are necessary. The code is described in a CPU dependent fashion. M68000 code is described as a set of code resources. Prior to installing an agent, you must load these resources into memory and lock them. Once the agent has been installed, you may unlock and release the resources; the installation copies the code so these resources won't be used by the agent's execution.

Once loaded, a message port and a message object on that port are created for the agent. The number of concurrent asynchronous sends and receives that this pre-created port can handle are controlled by the appropriate fields in the Agent Descriptor. The ID of this pre-created object is one of the results returned by the kernel to the installer of the agent. This message object is used to send messages to the agent; it is the only means of establishing communications with the agent when it is first loaded. The object's refcon is set to the object's own ID. The object's refcon may be changed with the SetObjectRefcon service described in the Object Management section of the Messaging chapter of this document.

Once the port and object have been created, the agent is activated. The activation of server agents is different than the activation of in-line agents. Activating a server agent implies creation of a task. The task's scheduling priority and stack size are both specified by the Agent Descriptor. The task is created with an initial parameter that is the ID of the port previously described. Server agents should begin receiving messages from this port soon after their creation.

The activation of an in-line agent simply registers its entry point as an acceptance function for the agent's pre-created message port. The options specified for this accept come from the Agent Descriptor.

Once activated, a kernel message is sent to the agent's pre-created object. The agent must receive this message and perform any required initialization; failure to process and reply to this kernel message will cause the installation system call to hang. The agent can create any necessary control block required for the pre-created object. The agent can find the object because the object's refcon, provided in the message control block during the receive, is the object's ID.

If the same agent is installed multiple times. only one copy of the agent's code is copied into the kernel band. Each installation results in a unique port-object pair. Each installation creates separate static data. The agents act in complete isolation from each other; only the code is shared.

Following are the kernel services and types associated with agent installation:

```
enum
{
    agentIsTask       = 0x00000001,
    agentIsResident   = 0x00000002
};

typedef struct AgentDescriptor
{
    PBVersion            version;
    Ref                  codeDescriptor,
    TaskName             theName,
    AsyncOperationCount  asyncReceiveLimit;
    AsyncOperationCount  asyncSendLimit;
    ByteCount            stackSize;
    OptionBits           acceptorTaskOptions;
    OptionBits           agentOptions;
} AgentDescriptor;
```

The fields of an AgentDescriptor are:

- version specifies the version number of AgentDescriptor being supplied. This provides backwards compatibility. agentDescriptorVersion is the version of AgentDescriptor defined in the current interface. You should always specify a value of agentDescriptorVersion.

- codeDescriptor is a code descriptor generated by the appropriate OS trap.

- taskName is passed to CreateTask as the task name (if the agent is a task).

- asyncReceiveLimit and asyncSendLimit are used as values for the parameters of the same names to the CreatePort call that is part of installing the agent.

- stackSize specifies the size, in bytes, of the stack for the task created for a server agent. This value is ignored for in-line agents and should be zero.

- acceptOrTaskOptions is interpreted differently for Server Agents than for In-Line Agents. For server agents, this value is passed as the options parameter to CreateTask when the server's task is being created. For in-line agents, this value is passed as the options parameter to AcceptMessage when the in-line agent is being registered with the message system.

- agentOptions specifies the kind of agent to be created as well as other attributes of the agent. Presently two options are supported. The first controls whether the agent is a server agent or an in-line agent. The second controls whether the agent's code, static data, and stack (for server agents only) will be created in pageable or non-pageable areas within the kernel band.

```
OSStatus InstallAgent   (AgentDescriptor * theDescriptor,
                         ObjectID *        theObject,
                         AgentID *         theAgent);
``` theDescriptor is a descriptor (see above) of the agent being installed. This descriptor controls the manner in which the agent is created and initialized.

theObject is updated with the ID of the agent's pre-created object.

theAgent is updated with the ID of the agent. This ID can be used to remove the agent.

```
enum
{
    initializeAgentCode  = 1
};

typedef struct AgentInitializationMessage
{
    KernelMessageHeader  theHeader;
} AgentInitializationMessage;
```

Removing Agents

The code and other kernel resources associated with an agent are reclaimed only through explicit requests to the kernel. You do this by using the agent's ID that was returned when the agent was installed. When the kernel removes an agent, it first sends that agent a kernel message so that the agent can clean up and deallocate any resources prior to its removal. This kernel message is sent to the agent's pre-created object. In addition to internal cleanup, the agent must perform the following actions: First, any asynchronous receive operations must be canceled. Second, the acceptance function, if any, must be removed. Third, all objects must be deleted, fourth, the port must be deleted. Finally, the agent should reply to the system removal message and then, in the case of a server agent, terminate.

The agent must always be ready for a removal message. Failure to receive and reply to removal messages causes the remove request to hang. If the agent is not ready to terminate it may reply to the removal request with an error status indicating the reason for its refusal to terminate. This status is not interpreted by the kernel but is part of the interface between client and server.

Should the pre-created object have been previously deleted. the removal request will fail. This may indicate that the agent has already been removed. In any case, if the pre-created object is not available, agent deletion cannot succeed.

Following are the kernel services and types associated with agent removal

```
OSStatus RemoveAgent (AgentID theAgent);

enum
{
    finalizeAgentCode = 2
};

typedef struct FinalizeAgentMessage
{
    KernelMessageHeader   theHeader;
} FinalizeAgentMessage;
```

REGISTRY

A registry is a naming service for kernel resources. It solves the problem of how to locate a resource whose kernelID is unknown. IDs are not generally known because they are created dynamically and their values are unpredictable.

The NuKernel registry is implemented by a server outside the kernel and accessed through library routines that send messages to the registry server. The kernel supplies two calls so that the registry library can find the registry server. These calls are meant for use only by the registry software; no other software should call these routines.

Setting the Registry Object ID

SetRegistryObjectID causes the kernel to remember the ID passed as an argument and return it when GetRegistryObjectID is called. It's like a registry that can remember exactly one thing, and it's meant to be used to remember the ID of a more flexible registry. If it is called multiple times it remembers the most recent value; no errors are possible.

```
void   SetRegistryObjectID   (ObjectID newRegistryID);
```

Getting the Registry Object ID

GetRegistryObjectID returns the most recent value passed to SetRegistryObjectID

```
ObjectID GetRegistryObjectID ();
```

RESTRICTIONS ON USING KERNEL SERVICES

NuKernel provides three separate execution levels: task level, hardware interrupt level, and secondary interrupt level. Additionally, task level execution may be decomposed into execution of privileged tasks and non-privileged tasks. Various restrictions are placed on which kernel services can be called from each of these execution levels. The following sections define which services are available from each execution level.

Services That Can Be Called From Task Level

All NuKernel services may be called from task level. However, not all kernel services are available to non-privileged tasks. These services are listed in the following section.

Services That CANNOT Be Called By Non-Privileged Tasks

- PoolAllocatePageable
- PoolAllocateResident
- CallSecondaryInterruptHandler0
- CallSecondaryInterruptHandler1
- CallSecondaryInterruptHandler2
- CallSecondaryInterruptHandler3
- CallSecondaryInterruptHandler4
- QueueSecondaryInterruptHandler
- InstallInterruptHandler
- RemoveInterruptHandler
- UnmapMemory
- AcceptMessage

Services That Can Be Called From Secondary Interrupt Handlers

- PoolAllocate
- PoolAllocateResident

- PoolDeallocate
- GetPoolInformation
- SetEvents
- ClearEvents
- ReadEvents
- StackSpace
- GetTaskInformation
- SetPriority
- CreateSoftwareInterrupt
- SendSoftwareInterrupt
- DeleteSoftwareInterrupt
- CallSecondaryInterruptHandler0
- CallSecondaryInterruptHandler1
- CallSecondaryInterruptHandler2
- CallSecondaryInterruptHandler3
- CallSecondaryInterruptHandler4
- QueueSecondaryInterruptHandler
- UpTime
- SetInterruptTimer
- CancelTimer
- TimeBase
- CheckpointIO
- UnmapMemory
- UnLockObject
- GetRegistryObjectID March 29, 1994    Copyright 1992 Apple Computer, Inc.    C

- SetRegistryObjectID
- ReplyToMessage

Services That Can Be Called From Hardware Interrupt Level

- SendSoftwareInterrupt
- QueueSecondaryInterruptHandler
- UpTime
- SetInterruptTimer
- TimeBase

What is claimed is:

1. A computer-implemented message passing method for a computer system having a processing trait and a memory wherein a plurality of client tasks, a plurality of server tasks and a message passing unit reside, each client task comprising a sequence of program instructions that require a service, each server task comprising a sequence of program instructions capable of providing a service, the message passing unit comprising a sequence of program instructions that manages the transfer of messages between client tasks and server tasks, each client task, each server task, and the message passing unit executable by the processing unit, the message passing method comprising the steps of:

creating a plurality of message object data structures with the message passing unit, each message object data structure corresponding to a type of service provided by at least one server task within the plurality of server tasks, each message object data structure serving as a message destination from the perspective of a client task within the plurality of client tasks and to which a client task within the plurality of client tasks issues a send message request for the purpose of requesting a particular type of service be performed upon a message;

creating a port object data structure with the message passing unit, the port object data structure associated with the plurality of message data structures, the port object data structure corresponding to a receptacle for messages directed to each message object data structure within the plurality of message object data structures and to which each server task within the plurality of server tasks issues a receive message request for the purpose of polling for a message;

issuing a send message request with a first client task within the plurality of client tasks, the send message request including a reference to a first message and a reference to a message object data structure within the plurality of message object data structures;

receiving the send message request with the message passing unit;

transferring the first message to the port object data structure with the message passing unit;

polling the port object data structure with a first server task within the plurality of server tasks; and transferring the first message to the first server task with the message passing unit.

2. The method of claim 1, wherein the step of transferring the first message to the port object comprises the steps of:

generating a unique message identification signal with the message passing unit;

creating a send message control block with the message passing unit, the send message control block corresponding to the message identification signal, the send message control block storing the reference to the first message; and storing a reference to the send message control block in a data field of the port object with the message passing unit.

3. The method of claim 2, further comprising the steps of:

determining with the message passing unit whether the send message request specifies that execution of the first client task by the processing unit is to be temporarily prevented; and preventing execution of the first client task with the message passing unit until the first server task has issued a reply corresponding to the message identification signal.

4. The method of claim 2, wherein the step of transferring the first message to the first server task comprises the steps of:

determining with the message passing unit whether the first server task has issued a receive message request that matches the send message control block; and issuing a signal to the first server task with the message passing unit to initiate a service corresponding to the send message request in the event that the receive message request matches the send message control block.

5. The method of claim 4, further comprising the steps of:

creating a receive message control block associated with the receive message request with the message passing unit if the receive message request does not match the send message control block; and storing a reference to the receive message control block in a data field of the port object with the message passing unit.

6. The method of claim 5, further comprising the steps of:

determining with the message passing unit whether the receive message request specifies that execution of the first server task by the processing unit is to be temporarily prevented; and preventing execution of the first sever task with the message passing unit until a send message control block that matches the receive message request has been created.

7. The method of claim 4, further comprising the step of transferring reply information to the first client task with the message passing unit in response to the first server task issuing a reply corresponding to the message identification signal.

8. The method of claim 2, further comprising the steps of:

storing a reference to an acceptance function in a data field of the port object with the message passing unit, the acceptance function comprising a sequence of program instructions capable of providing a service within a memory address space associated with at least one client task within the plurality of client tasks;

determining with the message passing unit whether the send message control block matches the acceptance function; and if the send message control block matches the acceptance function, issuing a signal to the acceptance function with the message passing unit to initiate a service corresponding to the send message request.

9. A computer-implemented means for passing messages between a plurality of server tasks and a plurality of client tasks within a computer system having a processing unit and a memory, the means for passing messages comprising:

means for creating a plurality of message object data structures, each message object data structure corresponding to a type of service provided by at least one server task within the plurality of server tasks, each message object data structure serving as a unique message destination from the perspective of a client task within the plurality of client tasks and to which a client task within the plurality of client tasks issues a send message request for the purpose of requesting a particular type of service be performed upon a message;

means for creating a port object data structure associated with the plurality of message data structures, the port object data structure corresponding to a receptacle for messages directed to each of its associated message object data structures and to which each server task within the plurality of server tasks issues a receive message request for the purpose of polling for a message;

means for transferring a first message associated with a first client task within the plurality of client tasks to the port object data structure; and means for transferring the first message from the port object data structure to a first server task within the plurality of server tasks.

10. The system of claim 9, further comprising:

means for generating a unique message identification signal in response to the generation of a send message request by the first client task;

means for creating a send message control block corresponding to the message identification signal, the send message control block storing a reference to the first message;

means for determining whether a receive message request generated by the first server task matches the send message control block; and means for issuing a signal to the first server task to initiate a service corresponding to the send message request.

11. The system of claim 9, further comprising a means for issuing a signal to an acceptance function associated with the port object to initiate the performance of a service within a memory address space associated with the first client task.

12. The system of claim 9, further comprising a means for transferring reply information to the first client task in response to a reply issued by the first server task.

13. An object oriented message passing system for passing messages between a plurality of client tasks and a plurality of server tasks, the object oriented message passing system comprising:

a memory having an input and an output for storing data and commands, the memory including an object management unit for creating a port object data structure and a plurality of message object data structures associated with the port object data structure, the port object data structure corresponding to a message receptacle to which a sever task within the plurality of server tasks issues a receive message request for the purpose of polling for a message, each message object data structure corresponding to a type of service provided by the server task, each message object data structure serving as a message destination from the perspective of a client task within the plurality of client tasks and to which a client task within the plurality of client tasks issues a send message request for the purpose of requesting a particular type of service be performed upon a message, the memory additionally including an object database for storing the port object data structure and each message object data structure, and a message transaction unit for matching a send message request issued by a client task within the plurality of client tasks with a receive message request issued by a server task within the plurality of server tasks, each of the object management unit and the message transaction unit comprising program instructions that form a portion of a computer operating system; and a processing unit having an input and an output, for processing data and executing commands under control of program instructions stored in the memory, the input of the processing unit coupled to the output of the memory, and the output of the processing unit coupled to the input of the memory.

14. The method of claim 1, wherein the object oriented message passing unit forms a portion of a microkernel operating system.

15. A computer-readable medium storing program instructions for performing the steps of:

creating a plurality of message object data structures with a message passing unit, each message object data structure corresponding to a type of service provided by at least one server task within a plurality of server tasks, each message object data structure serving as a message destination from the perspective of a client task within the plurality of client tasks and to which a client task within a plurality of client tasks issues a send message request for the purpose of requesting a particular service be performed upon a message;

creating a port object data structure with the message passing unit, the port object data structure associated with the plurality of message data structures, the port object data structure corresponding to a receptacle for messages directed to each message object data structure within the plurality of message object data structures and to which each server task within the plurality of server tasks issues a receive message request for the purpose of polling for a message;

receiving a send message request issued by a first client task, the send message request including a reference to a first message and a reference to a message object data structure within the plurality of message object data structures;

transferring the first message to the port object data structure with the message passing unit; and transferring the first message to a first server task with the message passing unit in response to the first server task polling the port object data structure.

* * * * *